Nov. 24, 1959  H. D. ROSS ET AL  2,914,248
PROGRAM CONTROL FOR A DATA PROCESSING MACHINE
Original Filed Nov. 24, 1954  47 Sheets-Sheet 1
FIG. 1
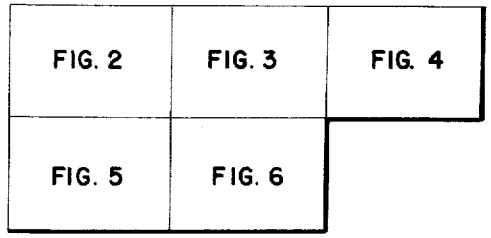
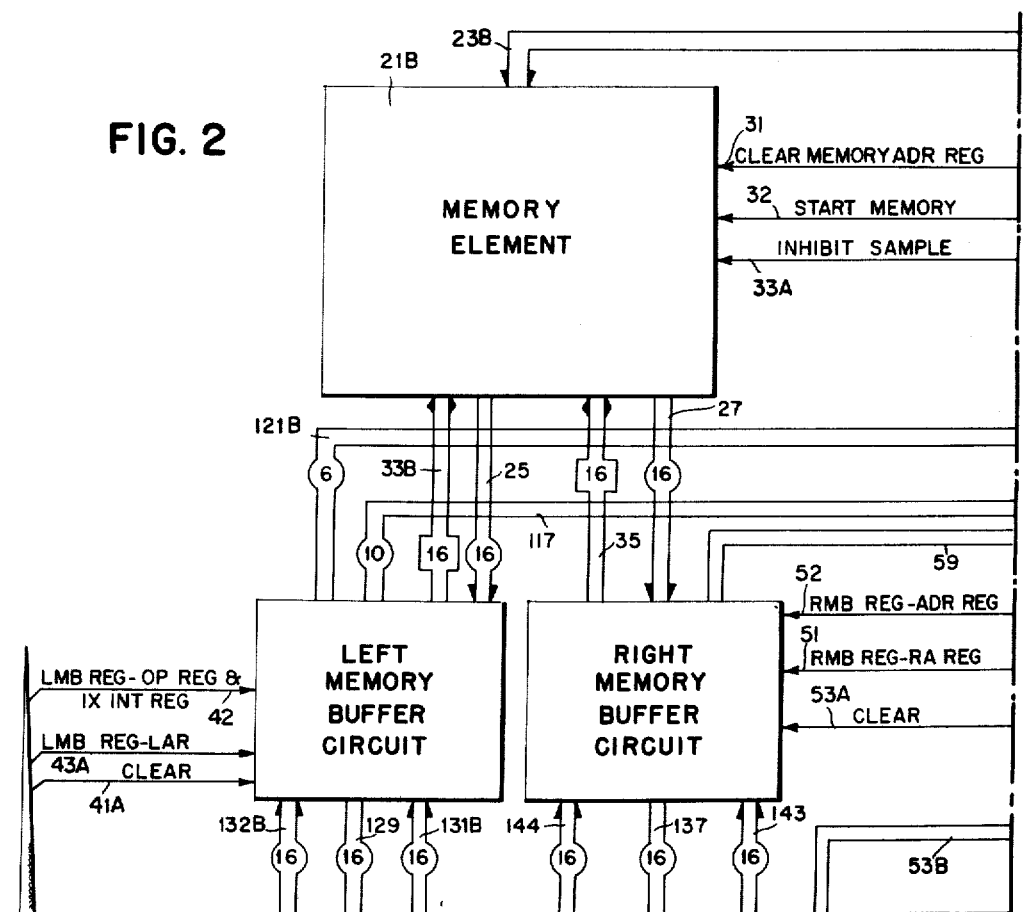
FIG. 2
INVENTORS
HAROLD D. ROSS, BERNARD L. SARAHAN
MORTON M. ASTRAHAN, BENNETT HOUSMAN
WALKER H. THOMAS
Theodore C. Wood
AGENT

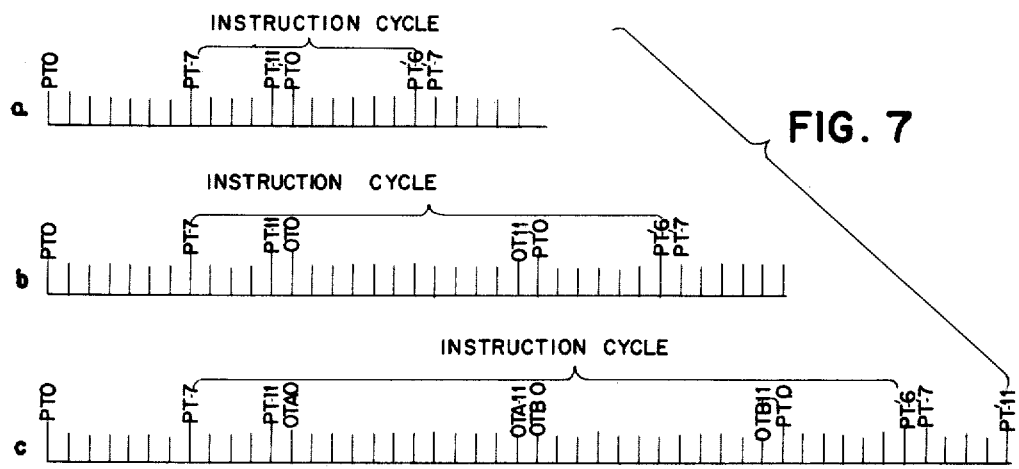
FIG. 7
FIG. 8
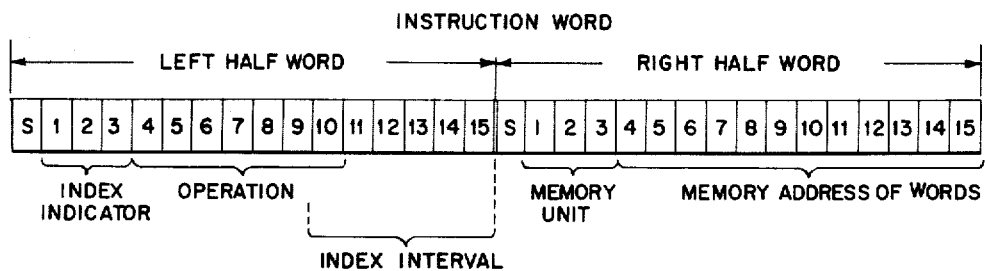
FIG. 9

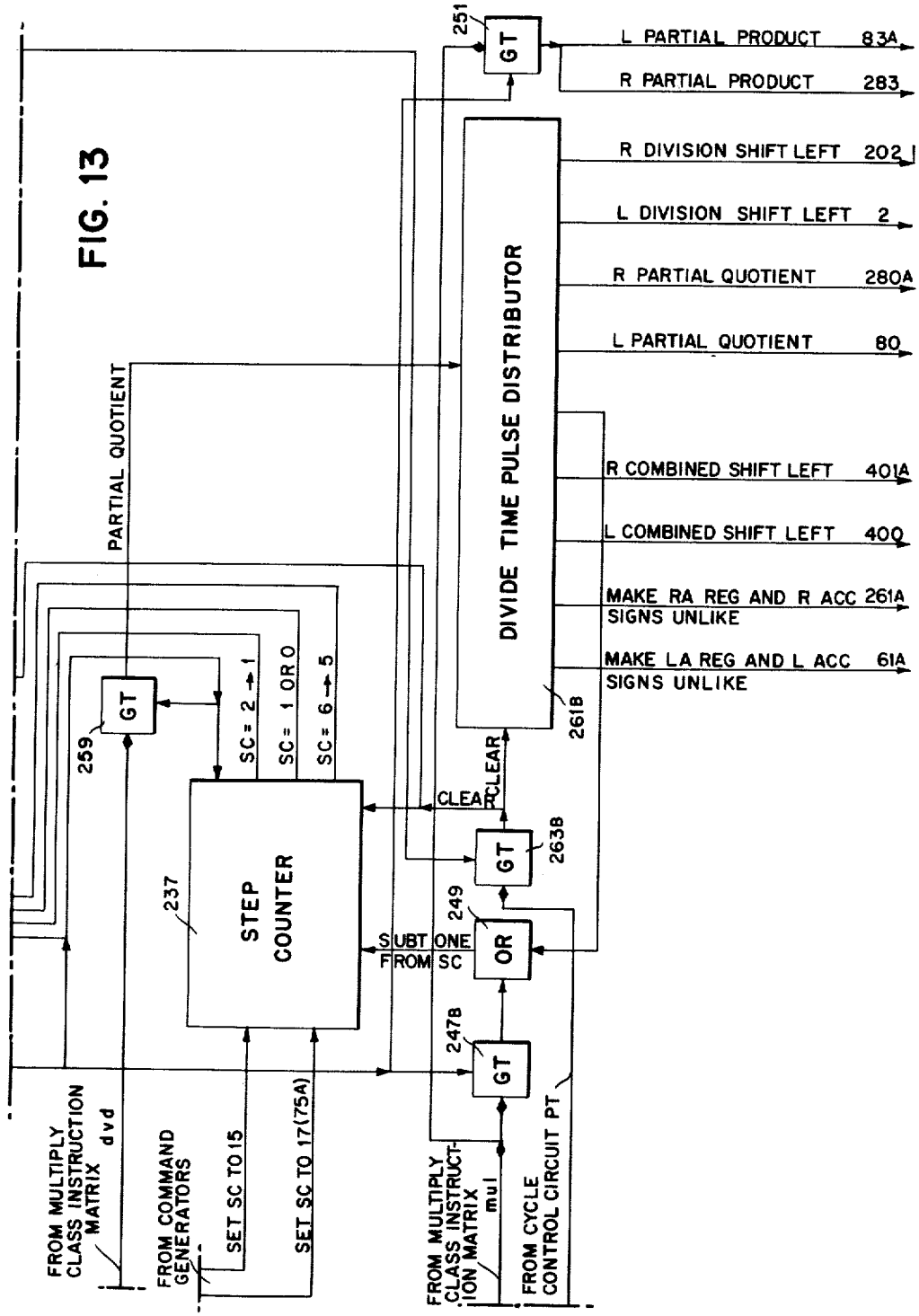

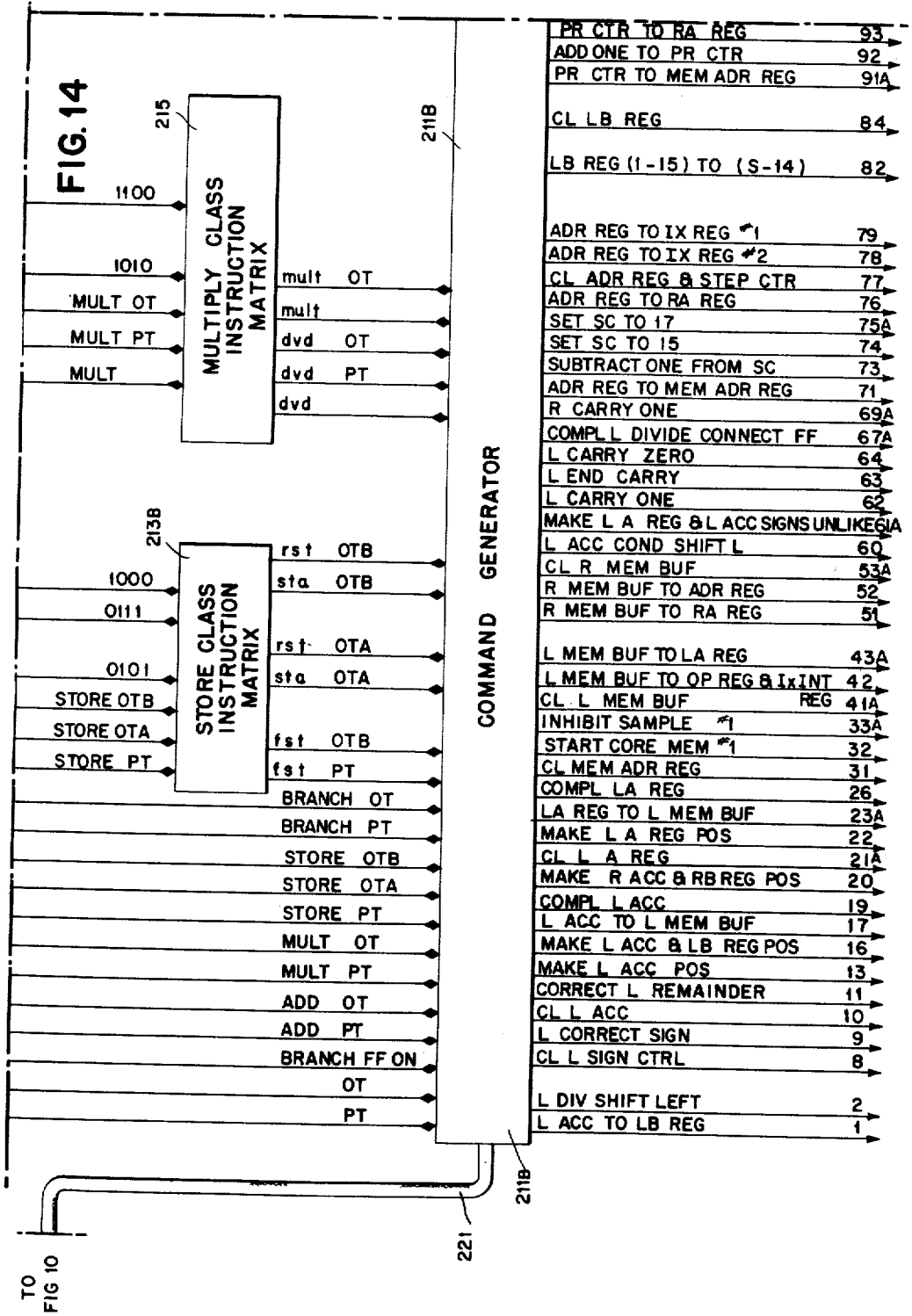

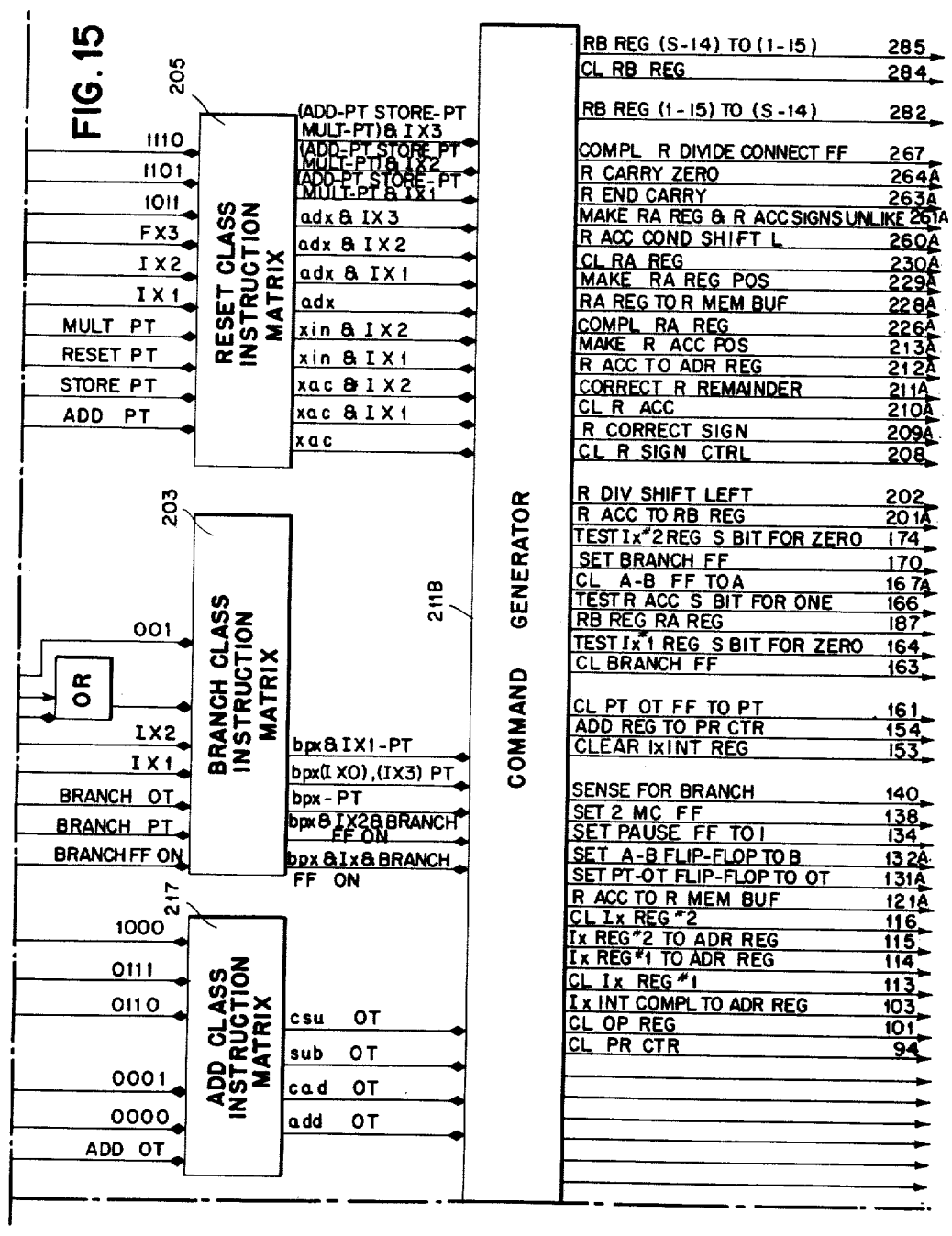

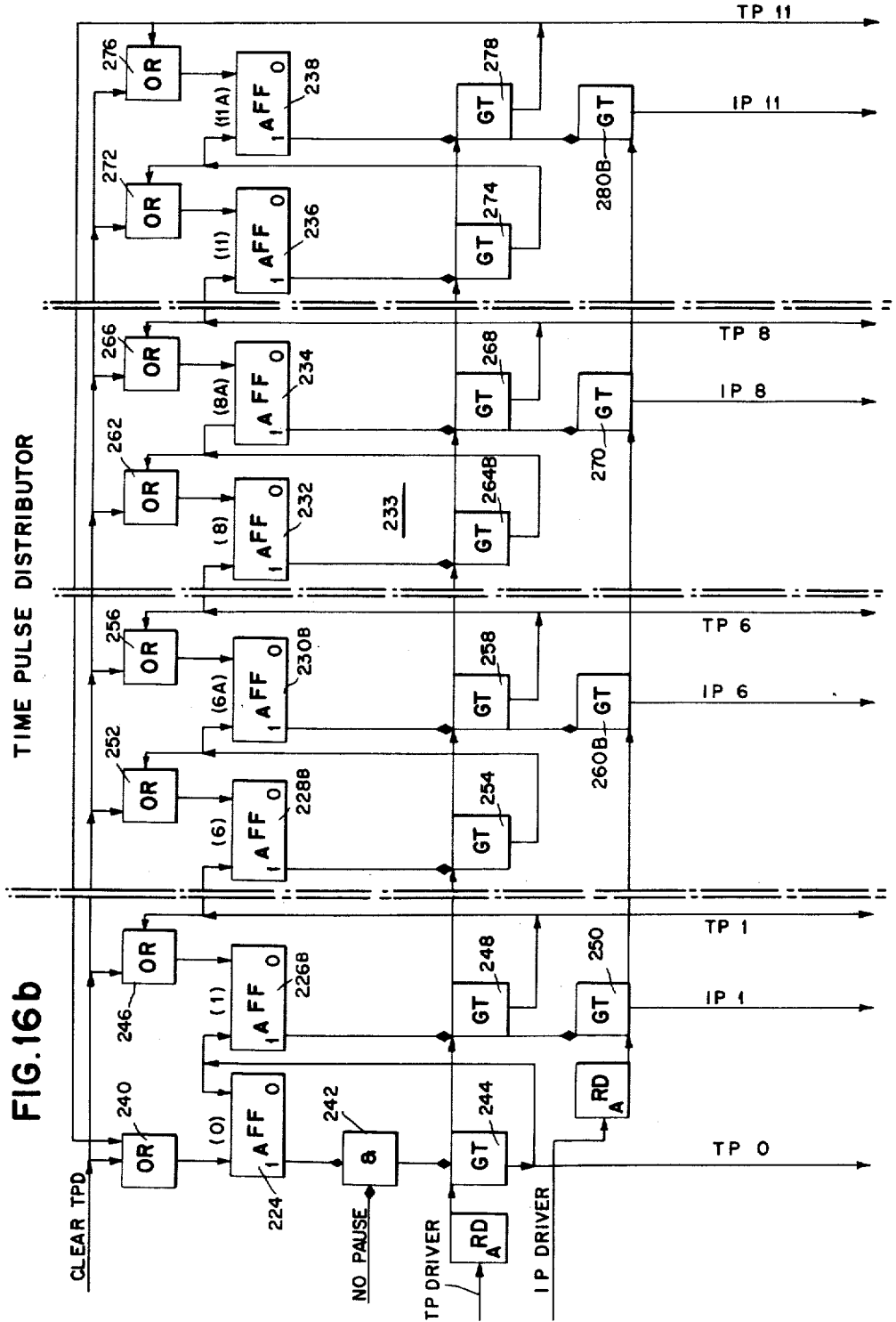

Nov. 24, 1959   H. D. ROSS ET AL   2,914,248
PROGRAM CONTROL FOR A DATA PROCESSING MACHINE
Original Filed Nov. 24, 1954   47 Sheets-Sheet 17

FIG.19a

| | PT₁ | | | | | OT | | | | | | | | | | | PT₂ | | | | | | |
|---|---|---|---|---|---|---|---|---|---|---|---|---|---|---|---|---|---|---|---|---|---|---|---|
| | 7 | 8 | 9 | 10 | 11 | 0 | 1 | 2 | 3 | 4 | 5 | 6 | 7 | 8 | 9 | 10 | 11 | 0 | 1 | 2 | 3 | 4 | 5 | 6 |
| CLEAR & ADD (CAD) | 42 52 92 | | 114 115 212A | | 131A | 31 | 21A 230A 41A 53A 71 | 32 | | | | | 10 210A | 43A 51 | | | 64 264A | 161 | 31 | 2 202 21A 230A 41A 53A 91A | 63 263A 32 | | | 60 260A | 77 101 |

FIG.19b

| | PT₁ | | | | | OT | | | | | | | | | | | PT₂ | | | | | | |
|---|---|---|---|---|---|---|---|---|---|---|---|---|---|---|---|---|---|---|---|---|---|---|---|
| | 7 | 8 | 9 | 10 | 11 | 0 | 1 | 2 | 3 | 4 | 5 | 6 | 7 | 8 | 9 | 10 | 11 | 0 | 1 | 2 | 3 | 4 | 5 | 6 |
| ADD (ADD) | 42 52 92 | | 114 115 212A | | 131A | 31 | 21A 230A 41A 53A 71 | 32 | | | | | | 43A 51 | | | 64 264A | 161 | 31 | 2 202 21A 230A 41A 53A 91A | 63 263A 32 | | | 60 230A | 77 101 |

FIG.19c

| | PT₁ | | | | | OT | | | | | | | | | | | PT₂ | | | | | | |
|---|---|---|---|---|---|---|---|---|---|---|---|---|---|---|---|---|---|---|---|---|---|---|---|
| | 7 | 8 | 9 | 10 | 11 | 0 | 1 | 2 | 3 | 4 | 5 | 6 | 7 | 8 | 9 | 10 | 11 | 0 | 1 | 2 | 3 | 4 | 5 | 6 |
| CLEAR & SUBTRACT (CSU) | 42 52 92 | | 114 115 212A | | 131A | 31 | 21A 230A 41A 53A 71 | 32 | | | | | 10 210A | 43A 51 | | | 26 226A 264A | 64 161 | 31 | 2 202 21A 230A 41A 53A 91A | 63 263A 32 | | | 60 260A | 77 101 |

FIG.19d

| | PT₁ | | | | | OT | | | | | | | | | | | PT₂ | | | | | | |
|---|---|---|---|---|---|---|---|---|---|---|---|---|---|---|---|---|---|---|---|---|---|---|---|
| | 7 | 8 | 9 | 10 | 11 | 0 | 1 | 2 | 3 | 4 | 5 | 6 | 7 | 8 | 9 | 10 | 11 | 0 | 1 | 2 | 3 | 4 | 5 | 6 |
| SUBTRACT (SUB) | 42 52 92 | | 114 115 212A | | 131A | 31 | 21A 230A 41A 53A 71 | 32 | | | | | | 43A 51 | | | 26 226A 264A | 64 161 | 31 | 2 202 21A 230A 41A 53A 91A | 63 263A 32 | | | 60 260A | 77 101 |

Nov. 24, 1959    H. D. ROSS ET AL    2,914,248
PROGRAM CONTROL FOR A DATA PROCESSING MACHINE
Original Filed Nov. 24, 1954    47 Sheets-Sheet 18

FIG. 19e MULTIPLY (MUL)

FIG. 19f DIVIDE (DVD)

FIG. 19g STORE (FST)

FIG. 19h RIGHT STORE (RST)

FIG. 19j STORE ADDRESS (STA)

Nov. 24, 1959  H. D. ROSS ET AL  2,914,248
PROGRAM CONTROL FOR A DATA PROCESSING MACHINE
Original Filed Nov. 24, 1954  47 Sheets-Sheet 19

FIG.19k

| | PT1 | | | | | OT | PT2 | | | | | | |
|---|---|---|---|---|---|---|---|---|---|---|---|---|---|
| | 7 | 8 | 9 | 10 | 11 | | 0 | 1 | 2 | 3 | 4 | 5 | 6 |
| BRANCH & INDEX (BPX) | 42 52 92 | | 21A 230A 164 170 174 | | 93 94 | — NO OT — | 31 77 154 | 103 41A 53A 91A | 114 115 32 | | 113 116 | | 77 101 78 79 163A |

FIG.19 l

| | PT1 | | | | | OT | PT2 | | | | | | |
|---|---|---|---|---|---|---|---|---|---|---|---|---|---|
| | 7 | 8 | 9 | 10 | 11 | | 0 | 1 | 2 | 3 | 4 | 5 | 6 |
| BRANCH ON RIGHT MINUS (BRM) | 42 52 92 | | 166 21A 230A | | 93 94 | — NO OT — | 31 154 | 41A 53A 91A | 32 | | | | 163A 77 101 |

FIG.19m

| | PT1 | | | | | OT | PT2 | | | | | | |
|---|---|---|---|---|---|---|---|---|---|---|---|---|---|
| | 7 | 8 | 9 | 10 | 11 | | 0 | 1 | 2 | 3 | 4 | 5 | 6 |
| RESET INDEX REGISTER (XIN) | 42 52 92 | | | | | — NO OT — | 31 | 41A 53A 91A | 32 | | 113 116 | | 78 79 77 101 |

FIG.19n

| | PT1 | | | | | OT | PT2 | | | | | | |
|---|---|---|---|---|---|---|---|---|---|---|---|---|---|
| | 7 | 8 | 9 | 10 | 11 | | 0 | 1 | 2 | 3 | 4 | 5 | 6 |
| RESET INDEX REGISTER FROM RIGHT ACC (XAC) | 42 52 92 | | 77 212A | | | — NO OT — | 31 | 41A 53A 91A | 32 | | 113 116 | | 78 79 77 101 |

FIG.19 o

| | PT1 | | | | | OT | PT2 | | | | | | |
|---|---|---|---|---|---|---|---|---|---|---|---|---|---|
| | 7 | 8 | 9 | 10 | 11 | | 0 | 1 | 2 | 3 | 4 | 5 | 6 |
| ADD INDEX REGISTER (ADX) | 42 52 92 | | 114 115 212A | | | — NO OT — | 31 | 41A 53A 91A | 32 | 230A | | 76 | 77 101 |

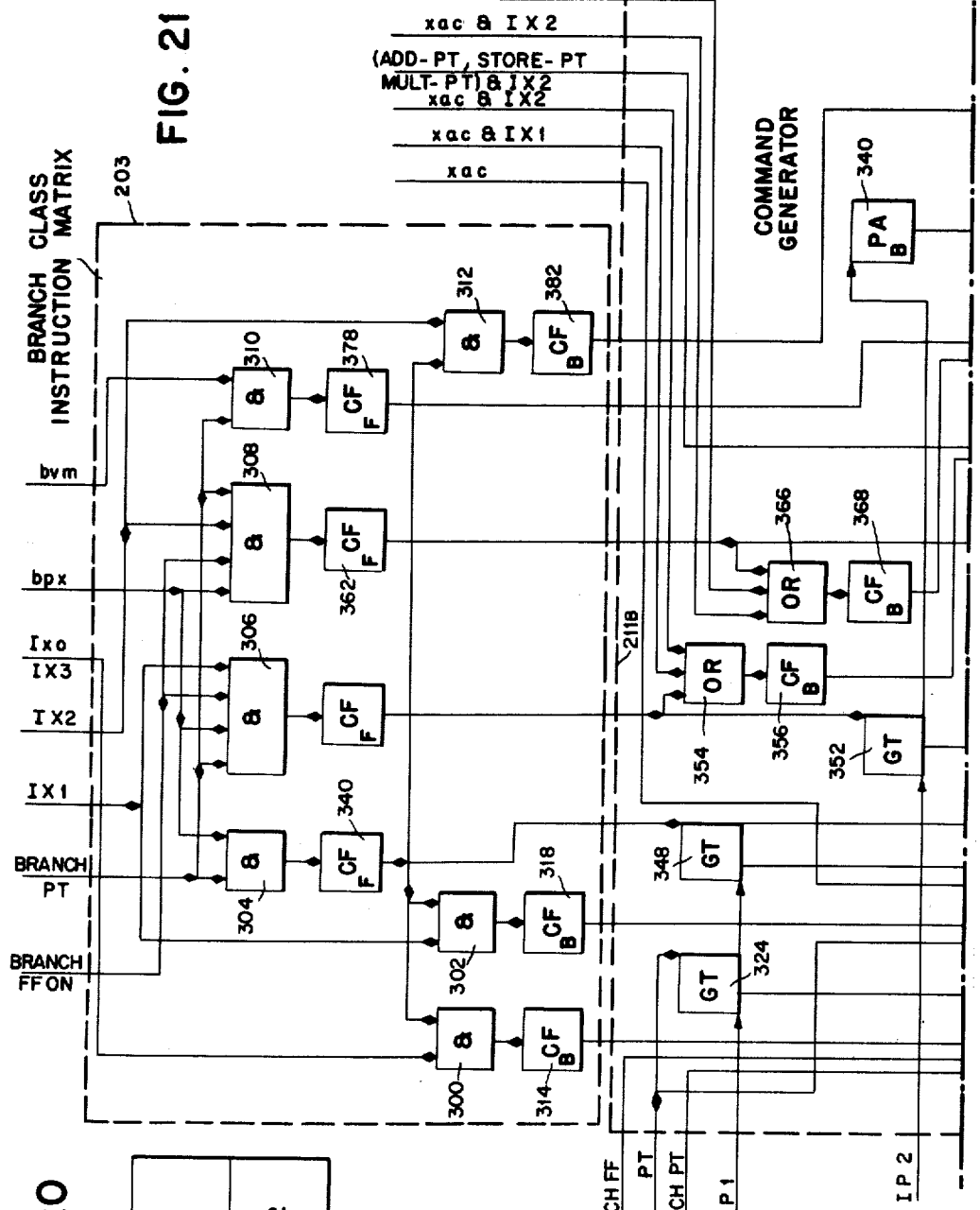

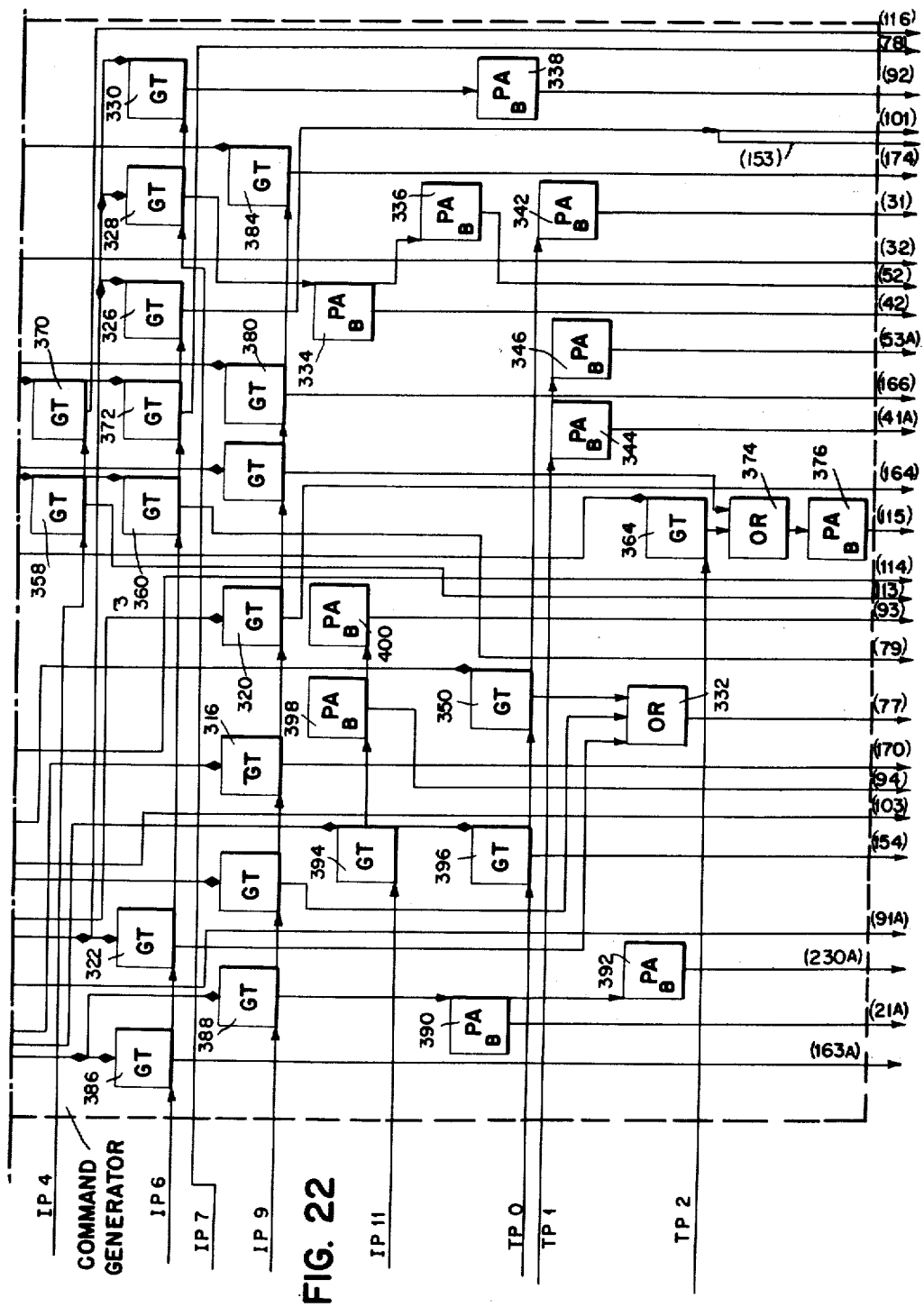

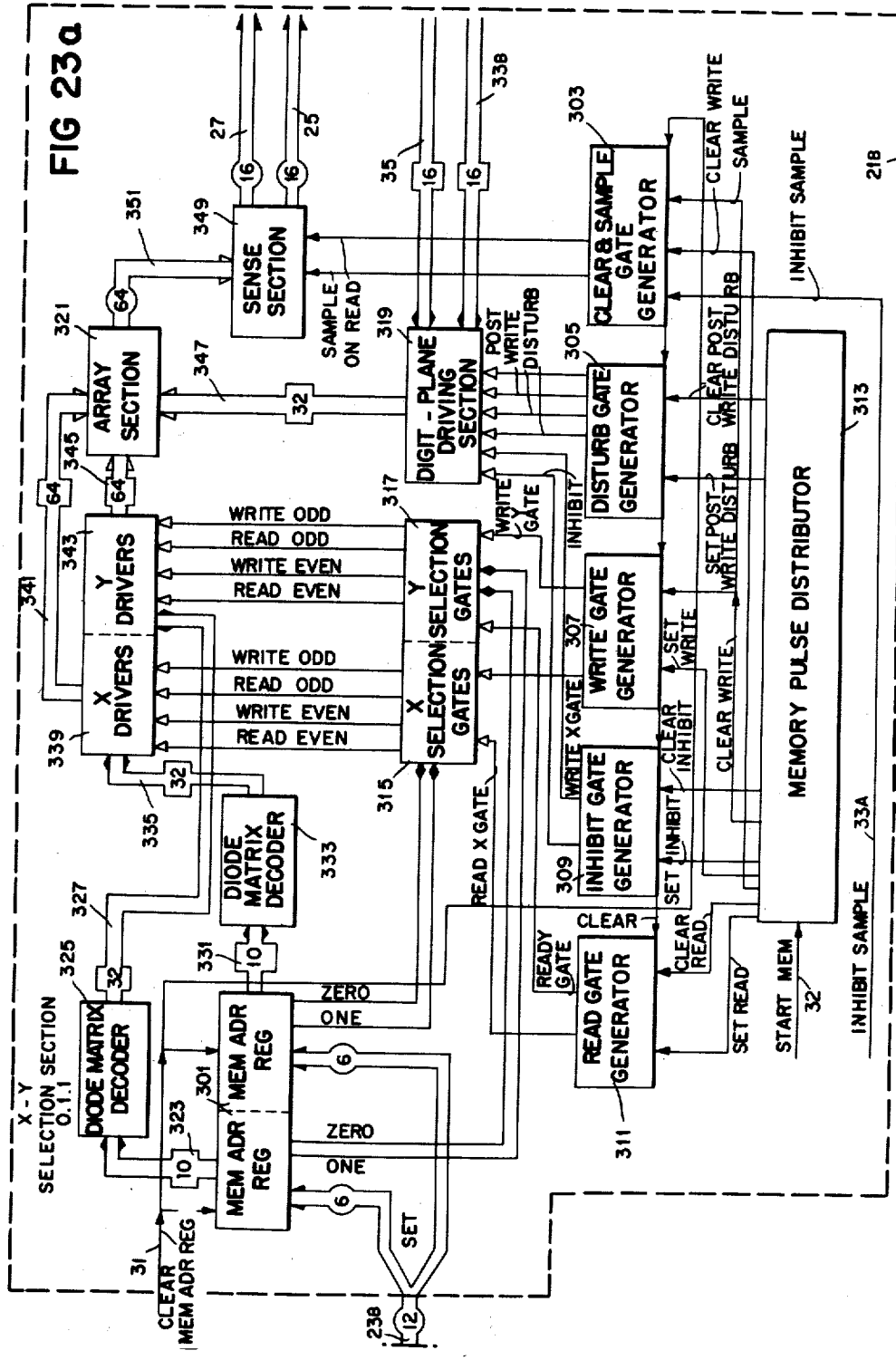

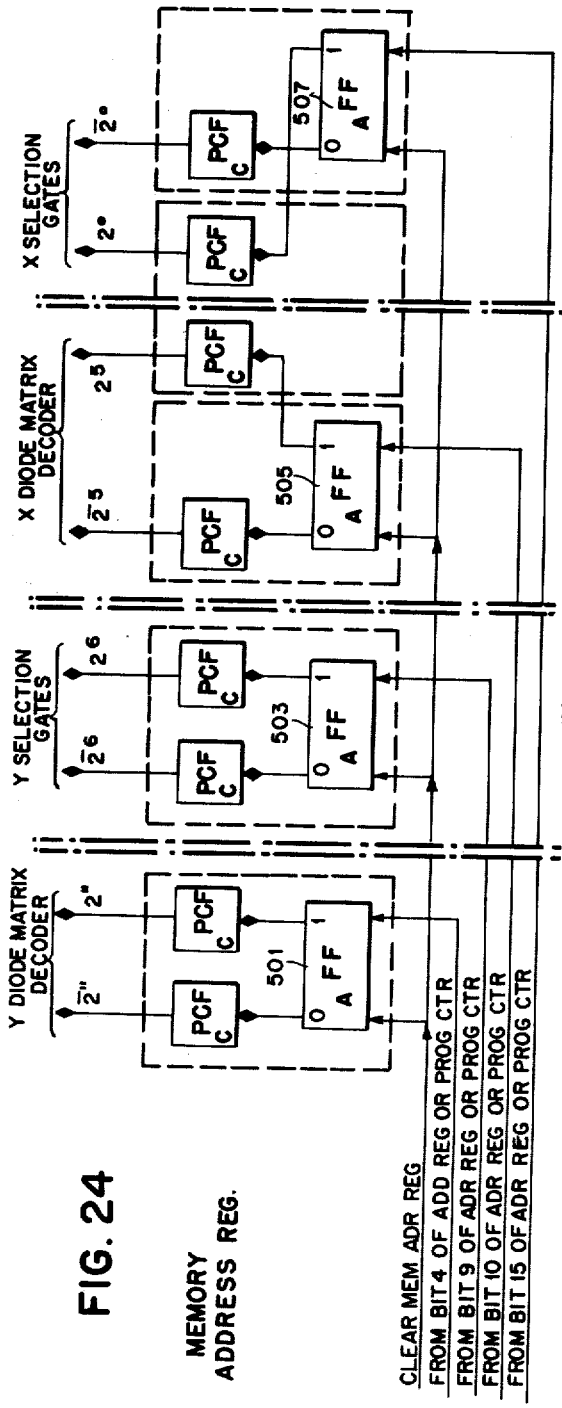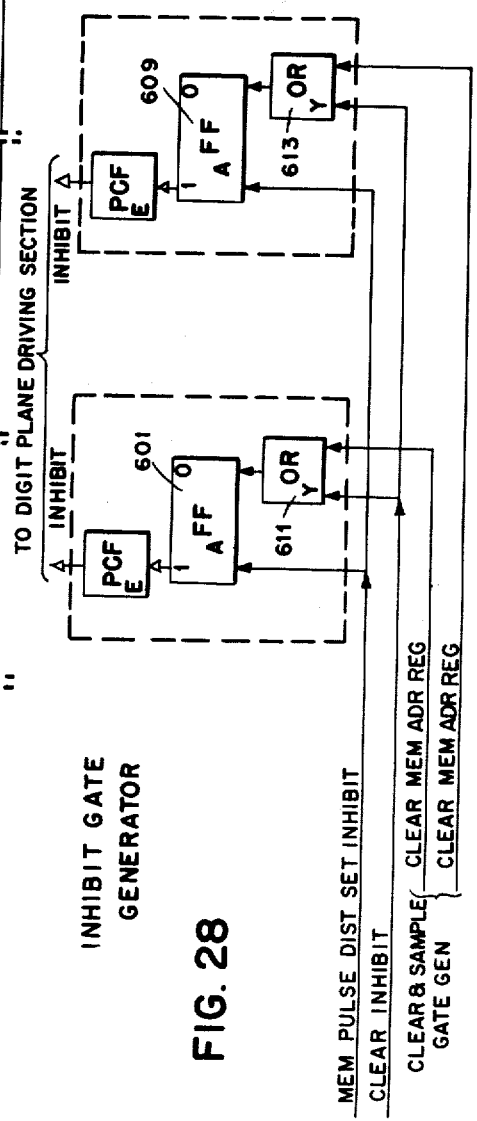

Nov. 24, 1959   H. D. ROSS ET AL   2,914,248
PROGRAM CONTROL FOR A DATA PROCESSING MACHINE
Original Filed Nov. 24, 1954   47 Sheets-Sheet 26
FIG. 26
READ GATE GENERATOR
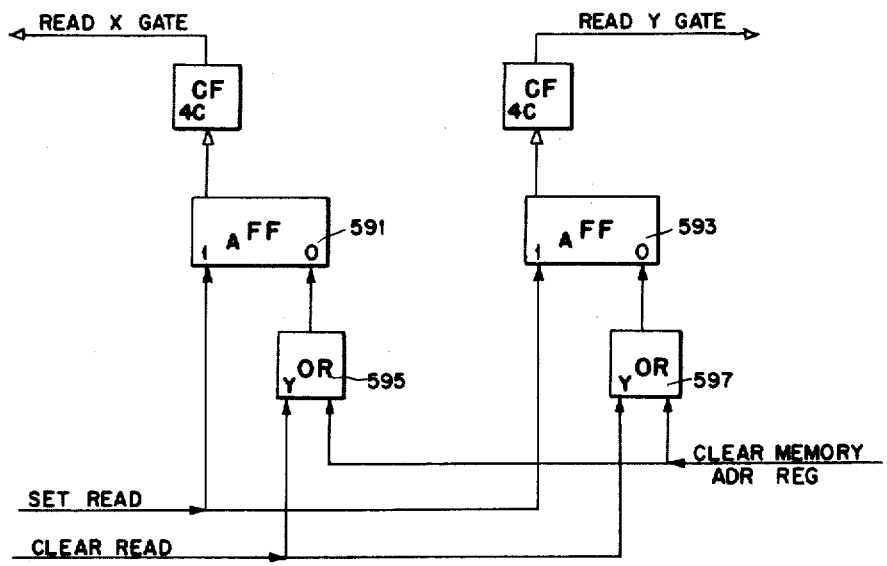
WRITE GATE GENERATOR
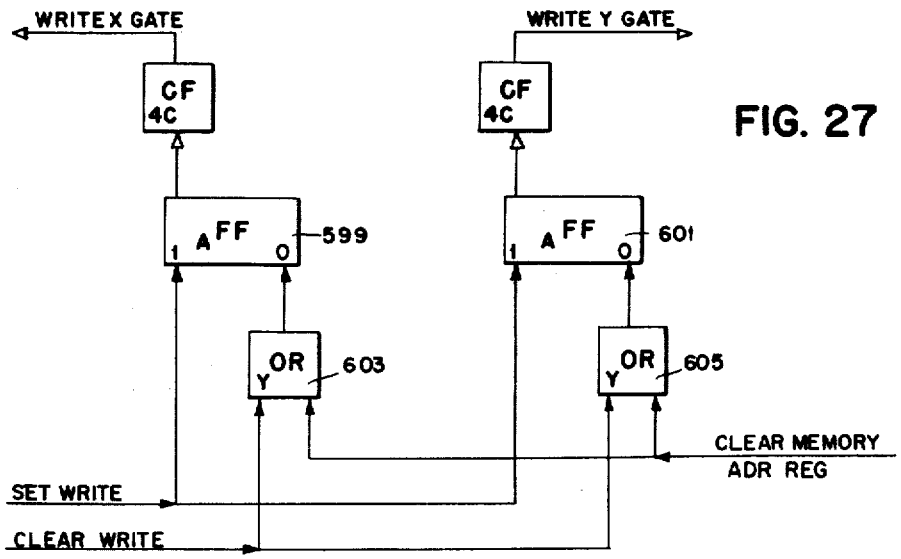
FIG. 27

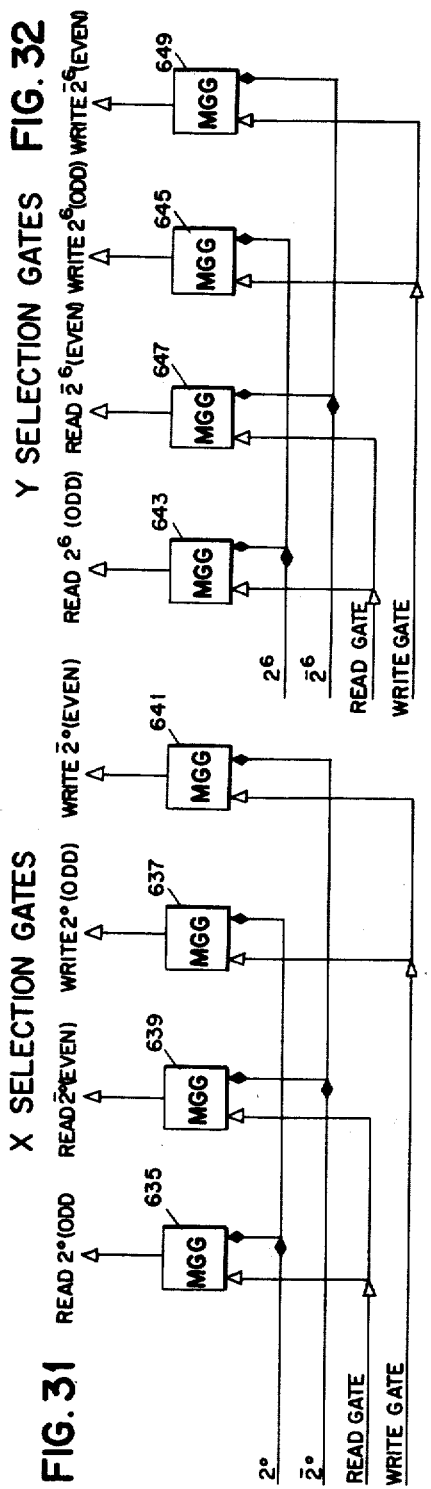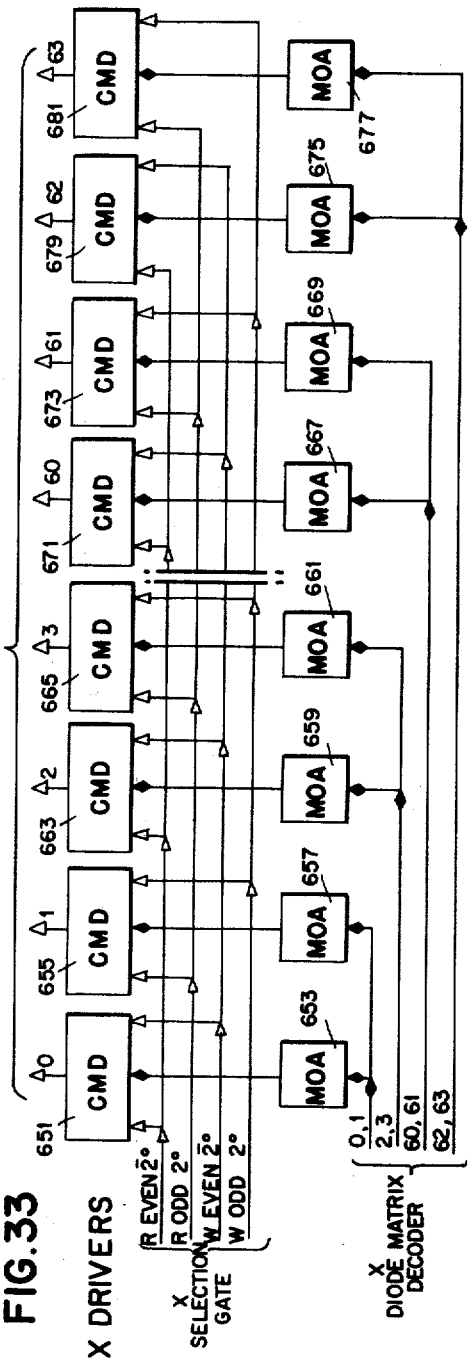

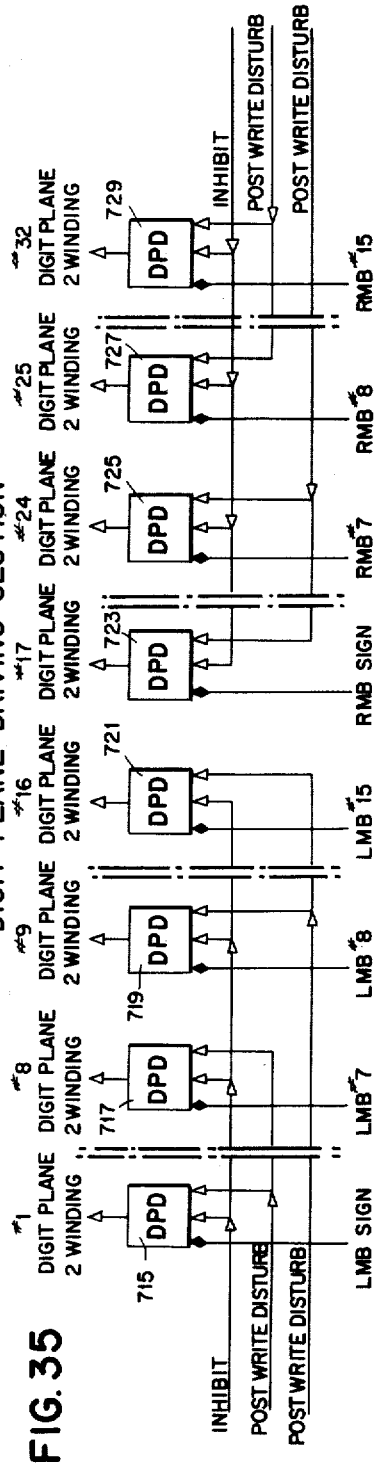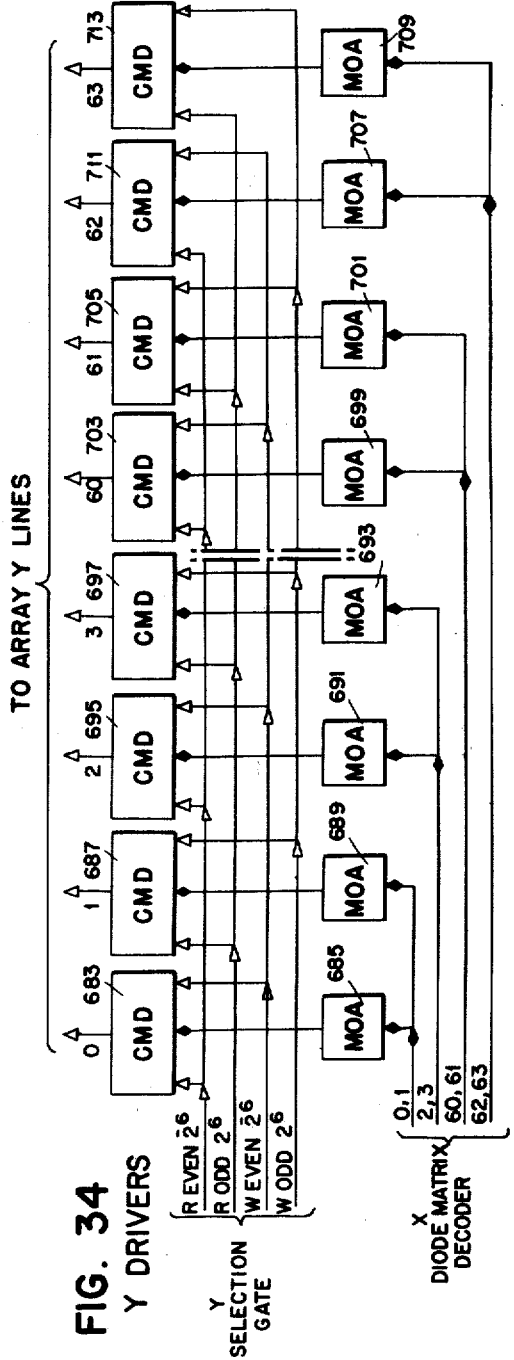

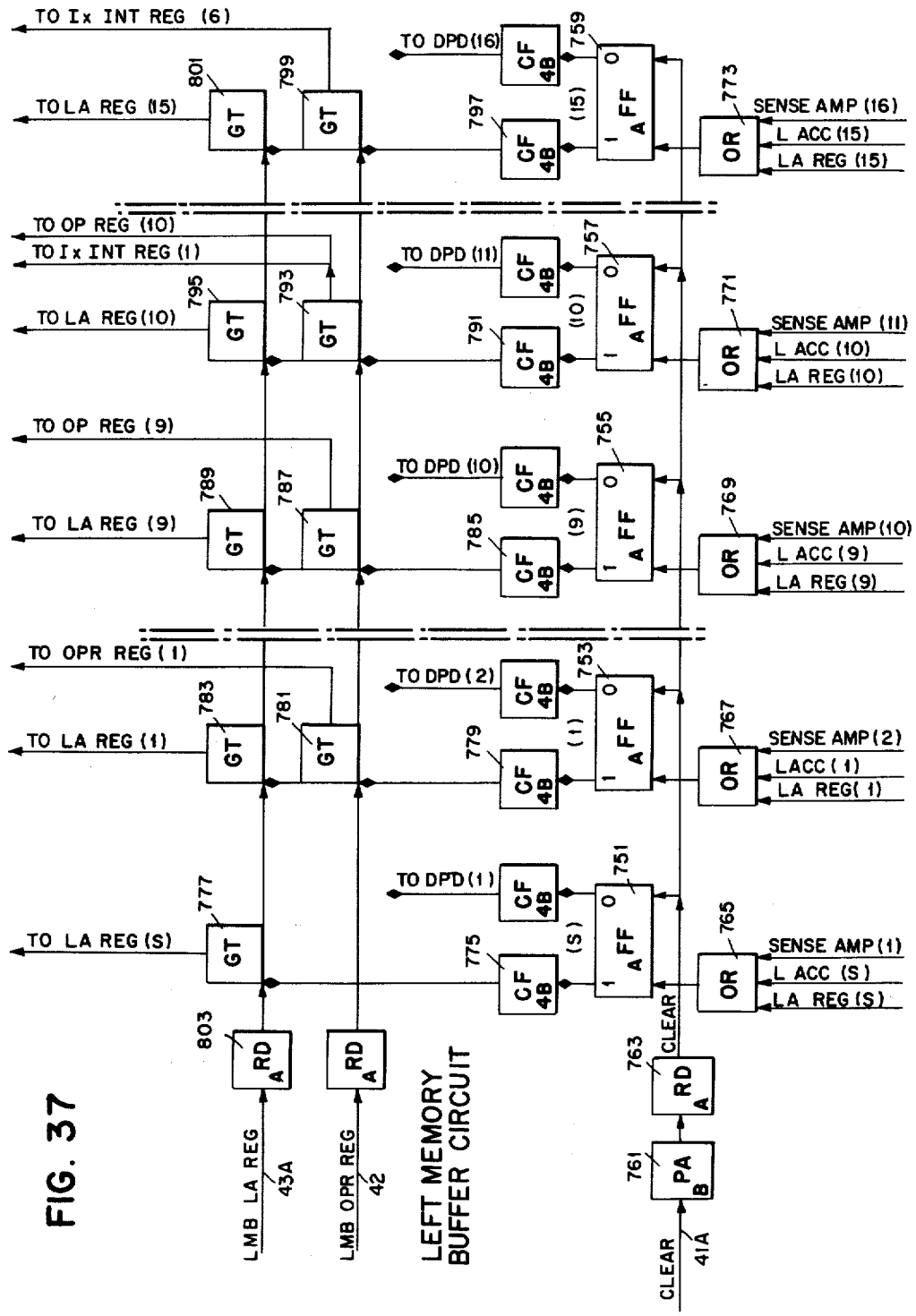

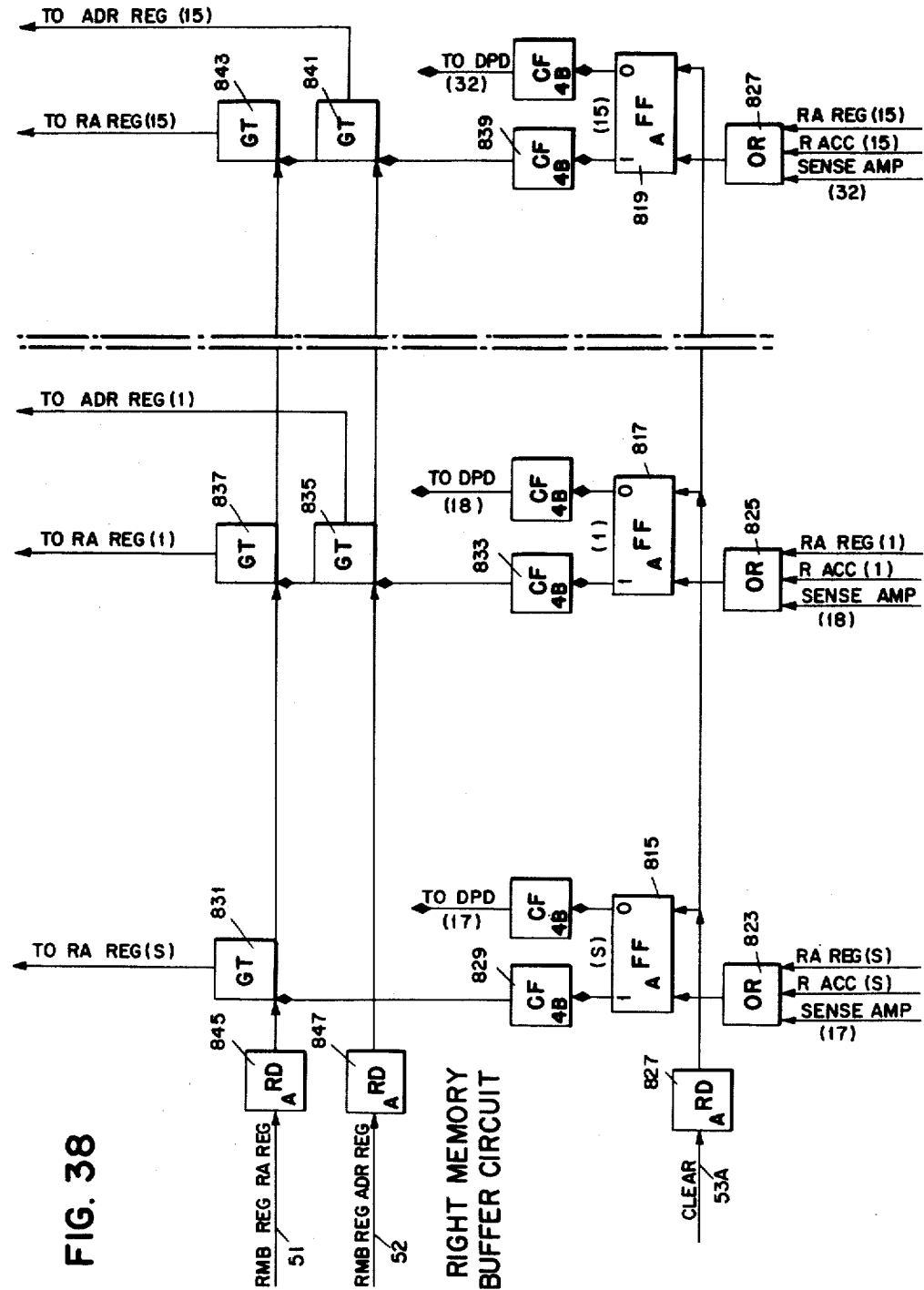

FIG. 36 SENSE SECTION
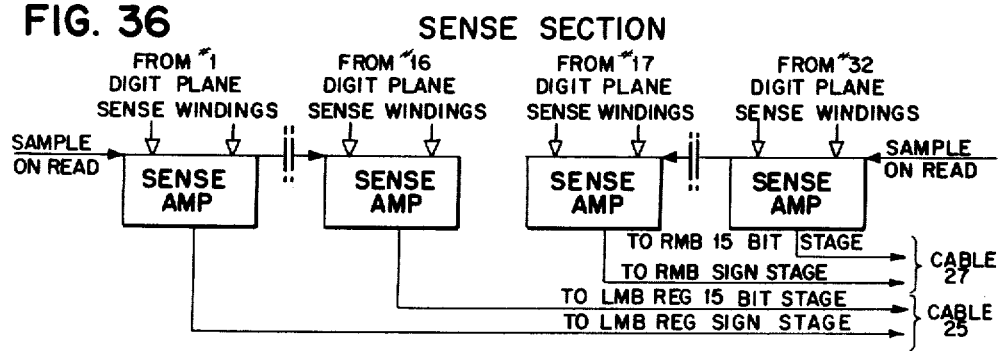
OPERATION REGISTER
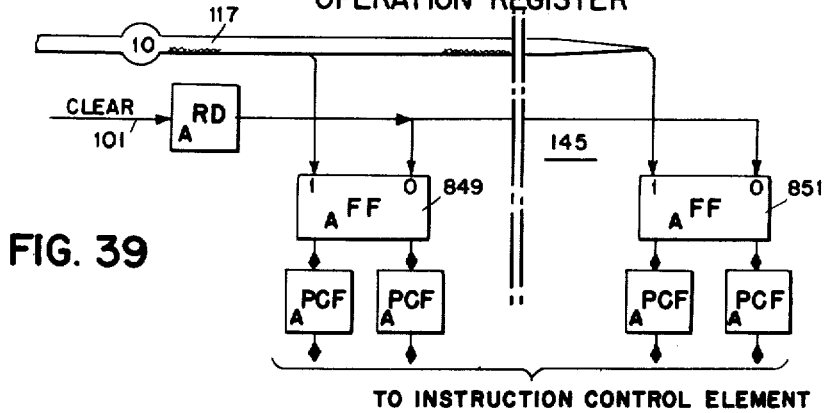
FIG. 39
INDEX REGISTER 1
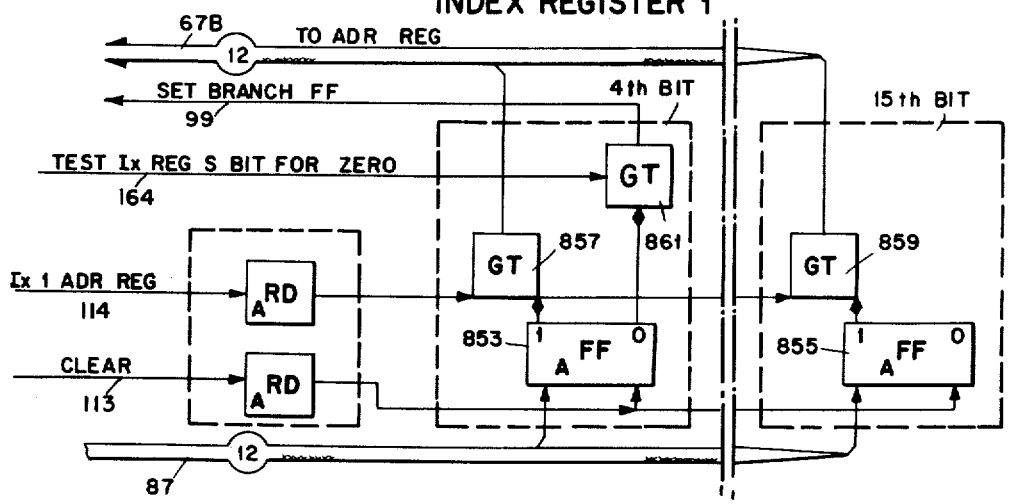
FIG. 40

Nov. 24, 1959    H. D. ROSS ET AL    2,914,248
PROGRAM CONTROL FOR A DATA PROCESSING MACHINE
Original Filed Nov. 24, 1954    47 Sheets—Sheet 34
FIG. 42
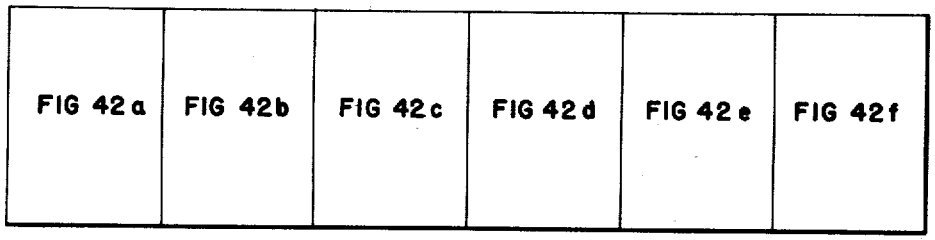
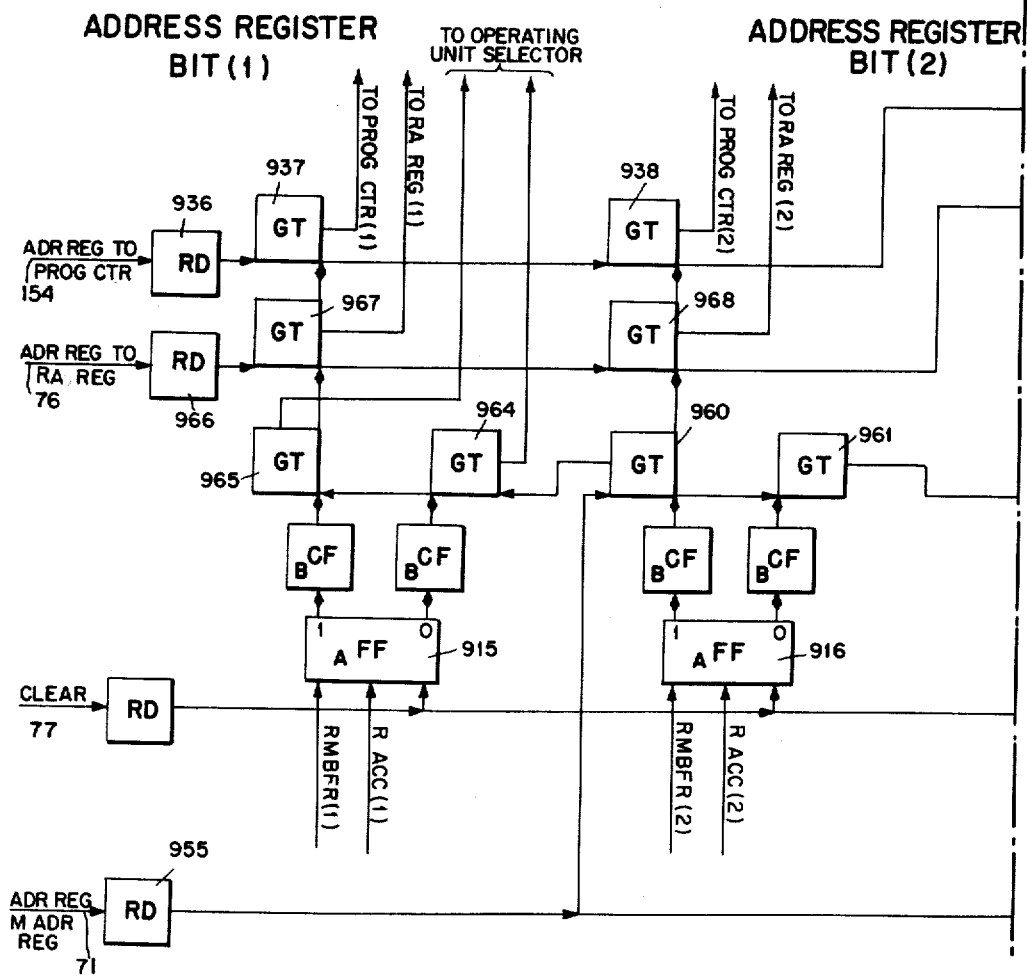
FIG. 42 a

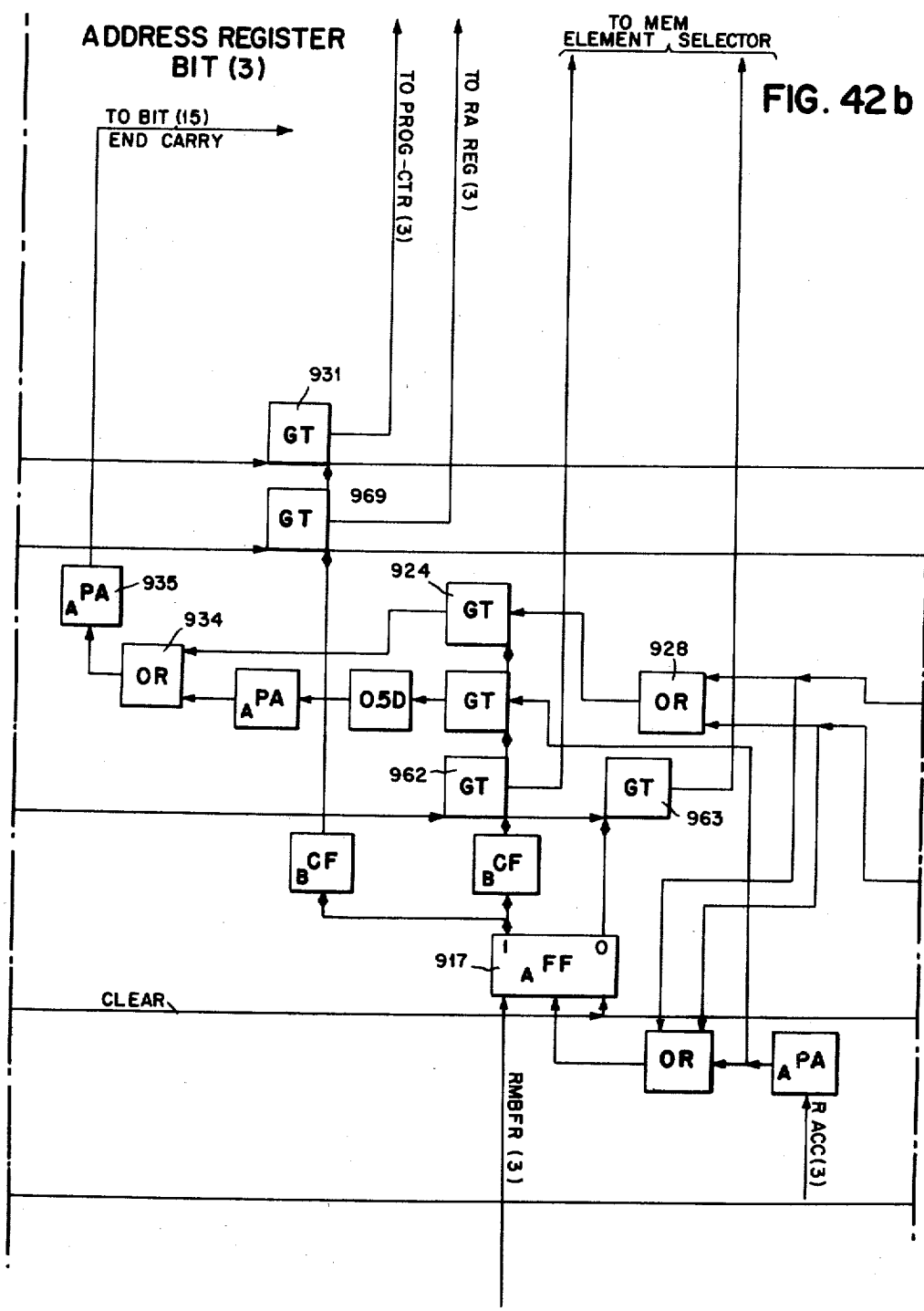

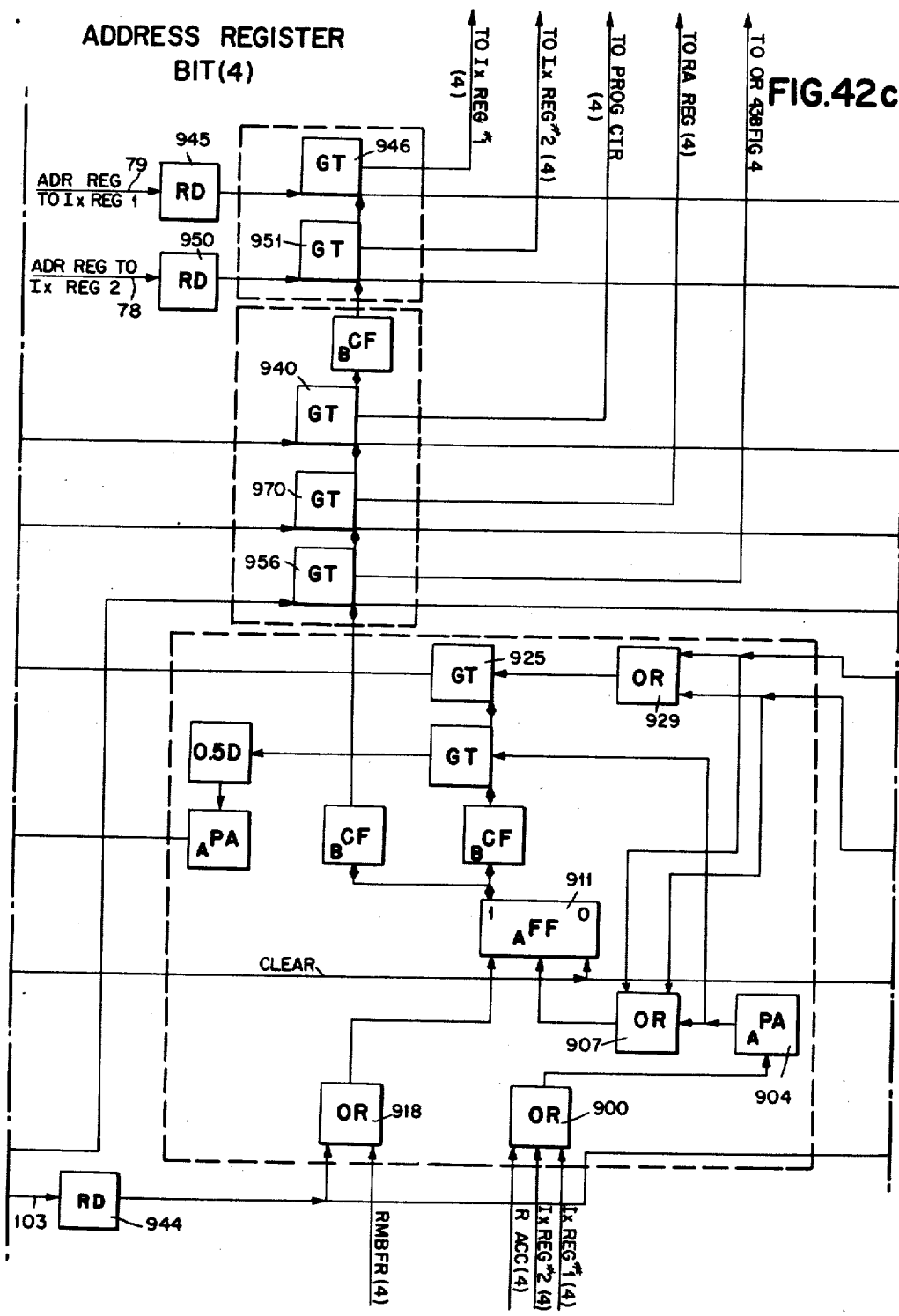

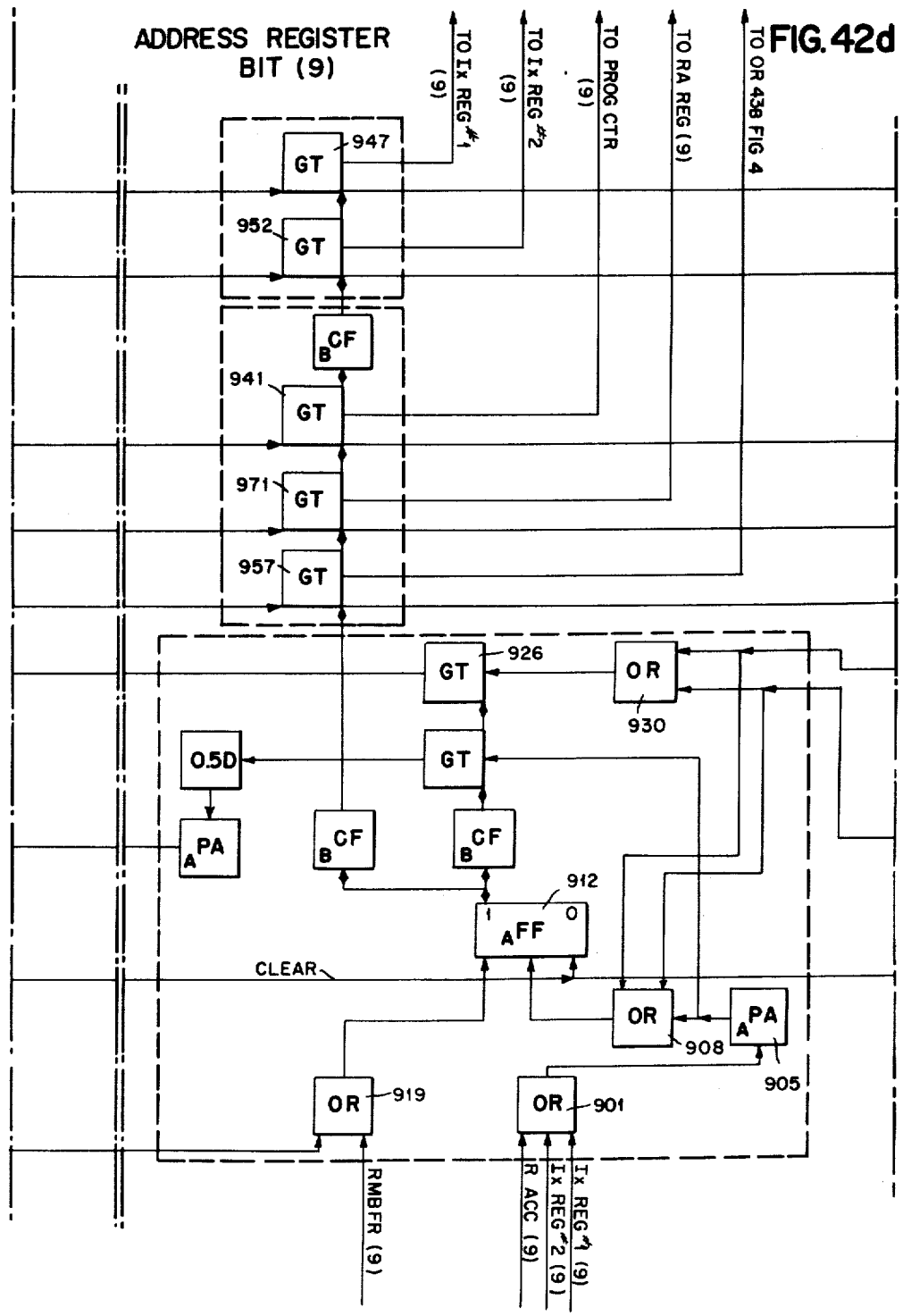

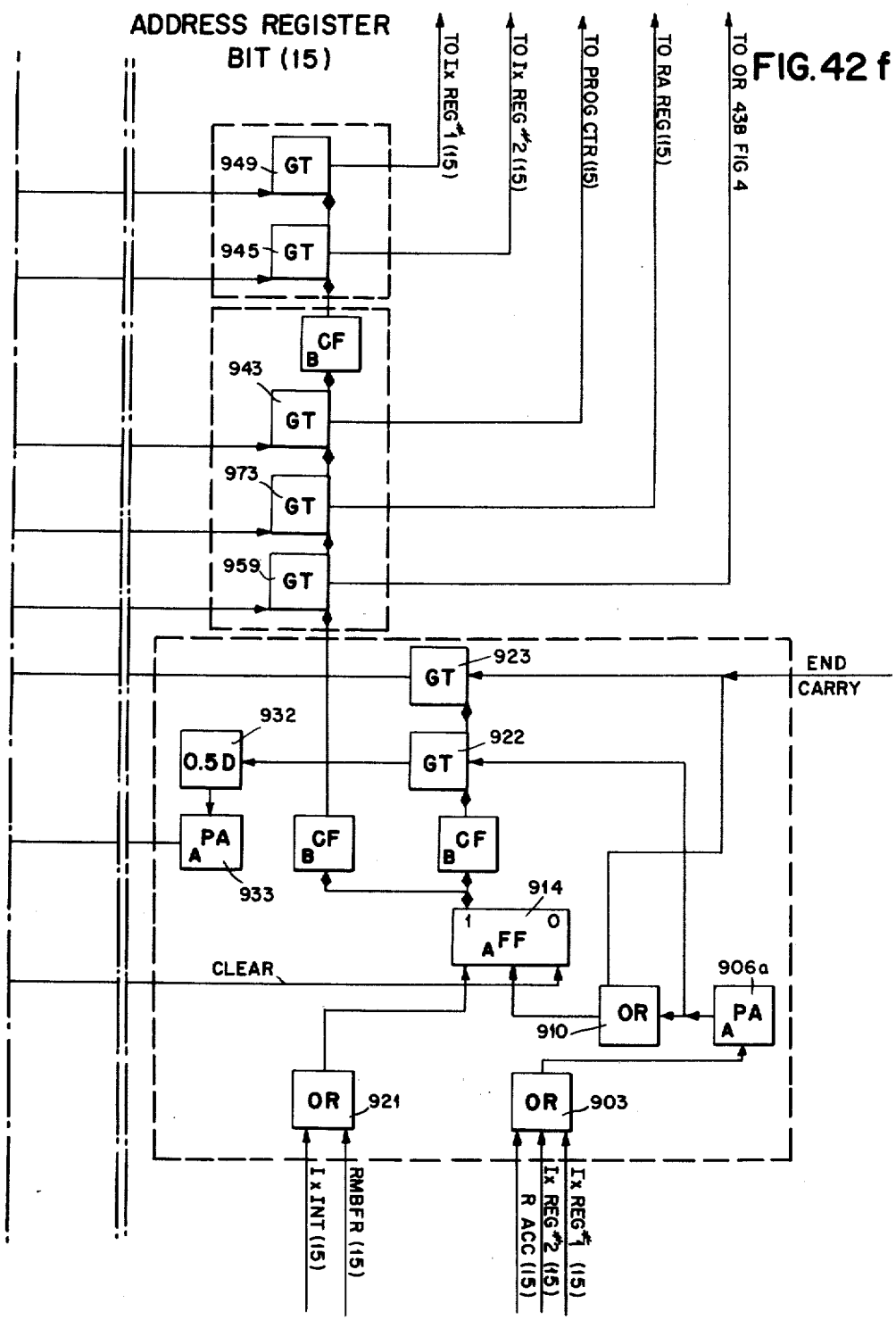

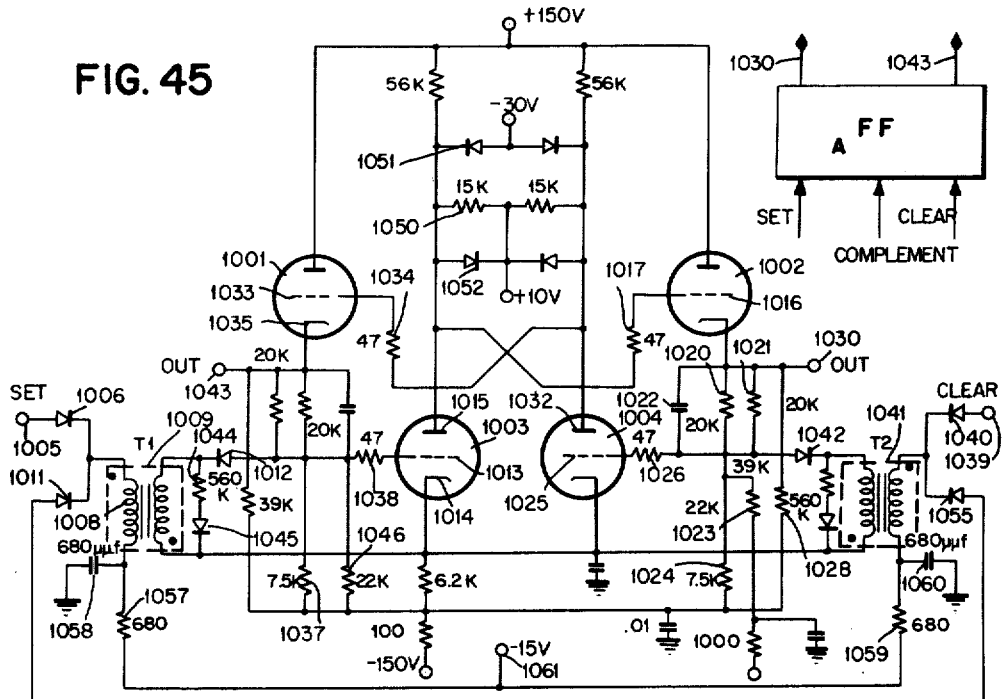
FIG. 45
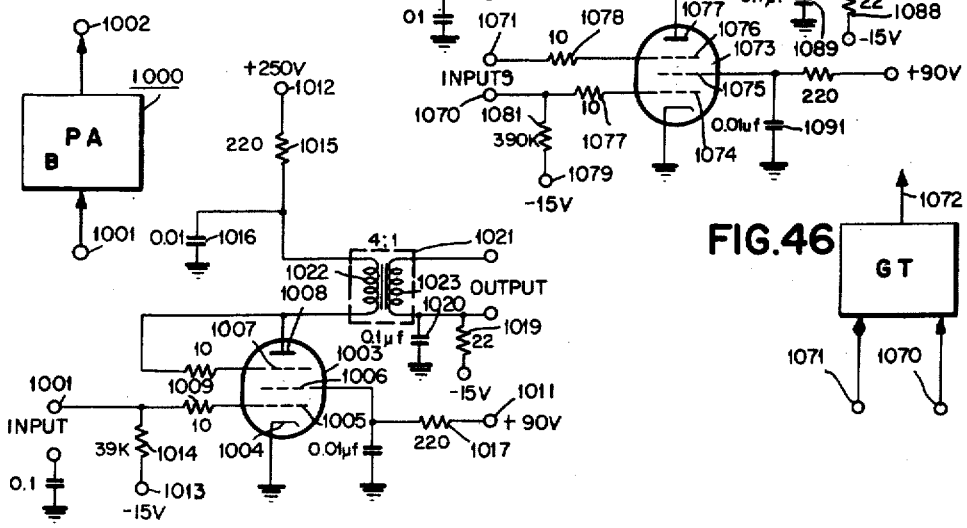
FIG. 47
FIG. 46

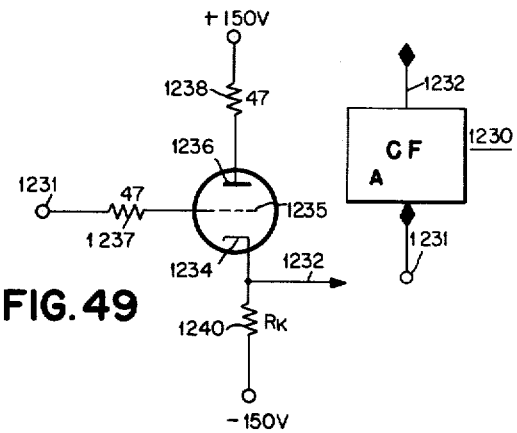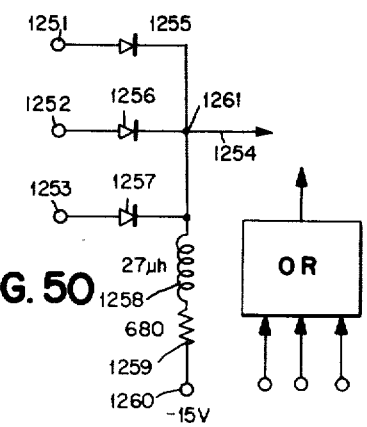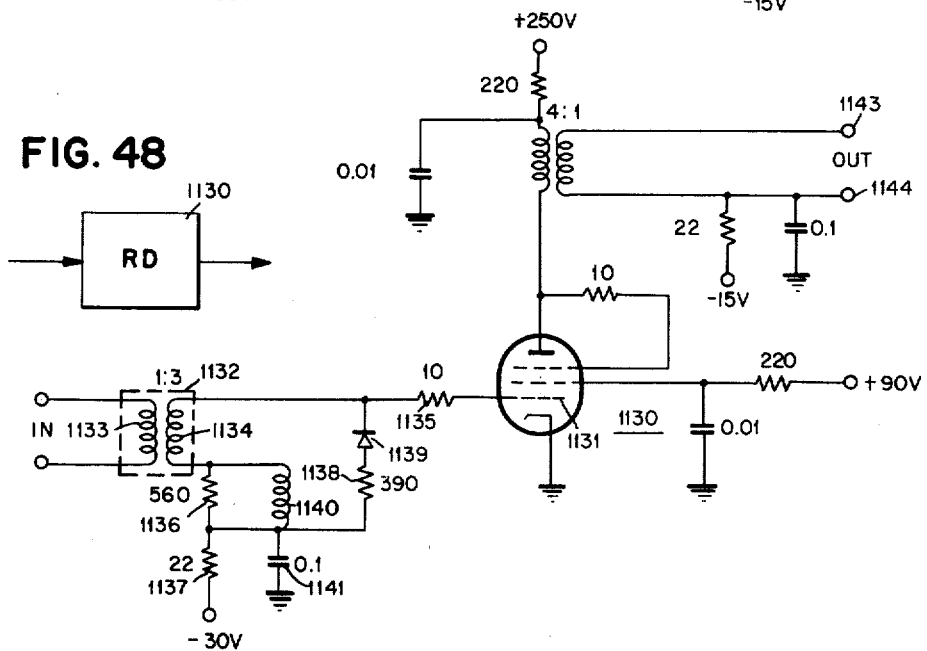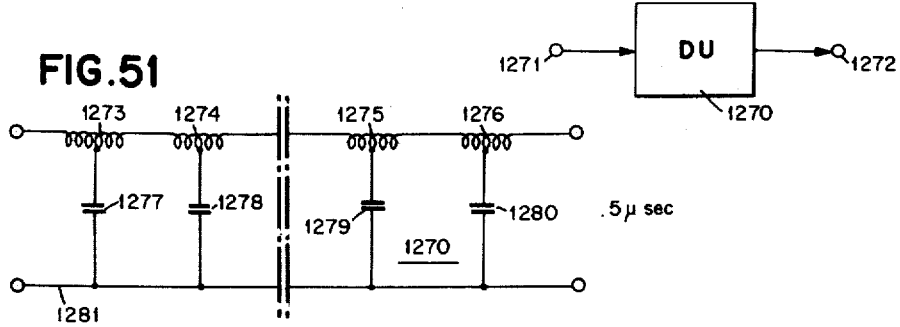

Nov. 24, 1959 — H. D. ROSS ET AL — 2,914,248
PROGRAM CONTROL FOR A DATA PROCESSING MACHINE
Original Filed Nov. 24, 1954 — 47 Sheets-Sheet 43
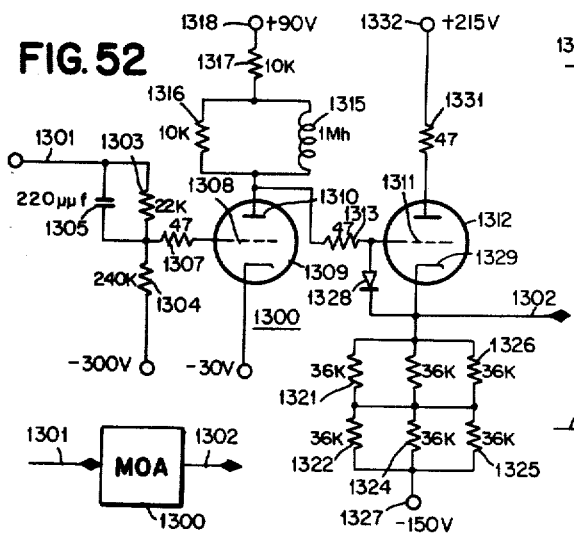
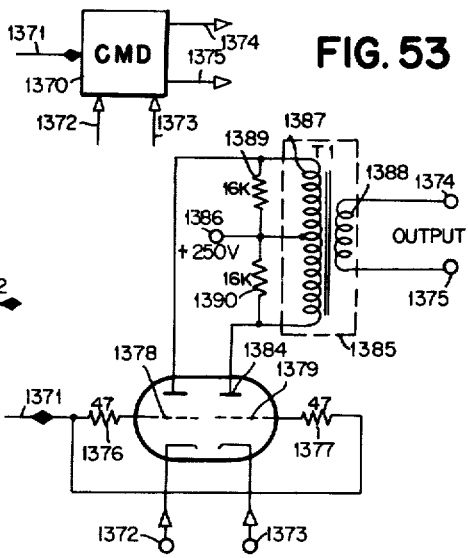
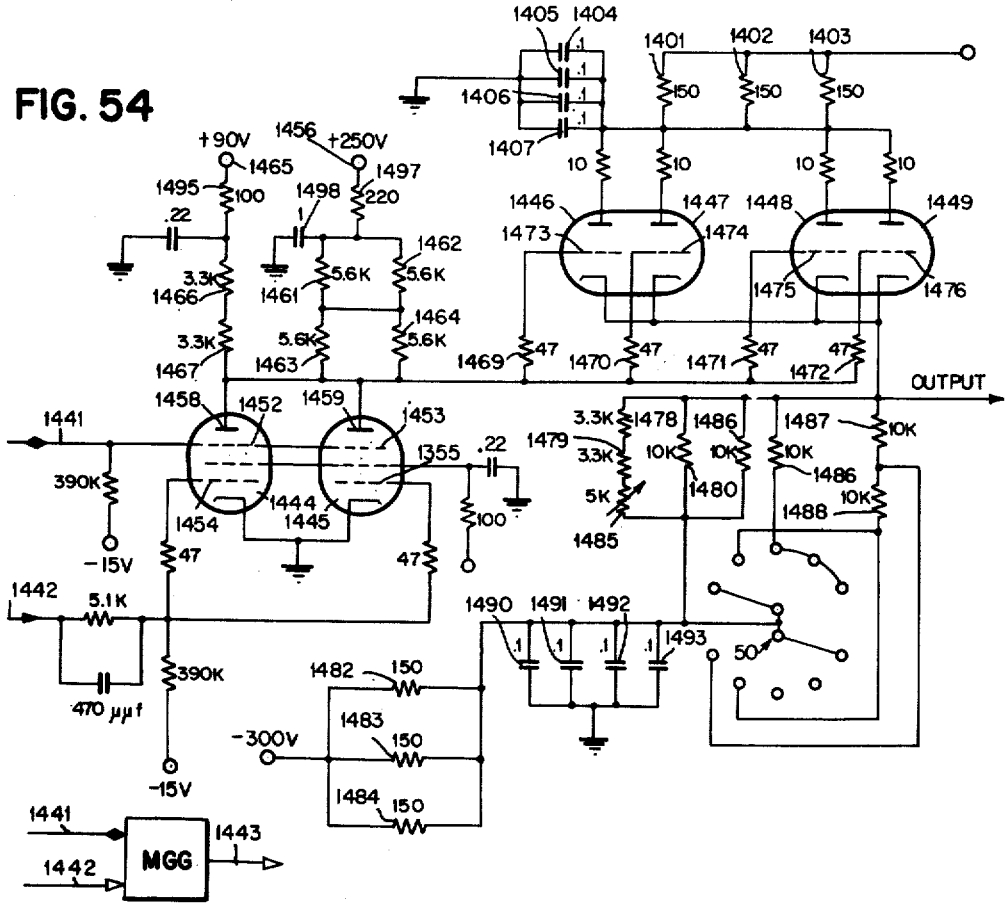

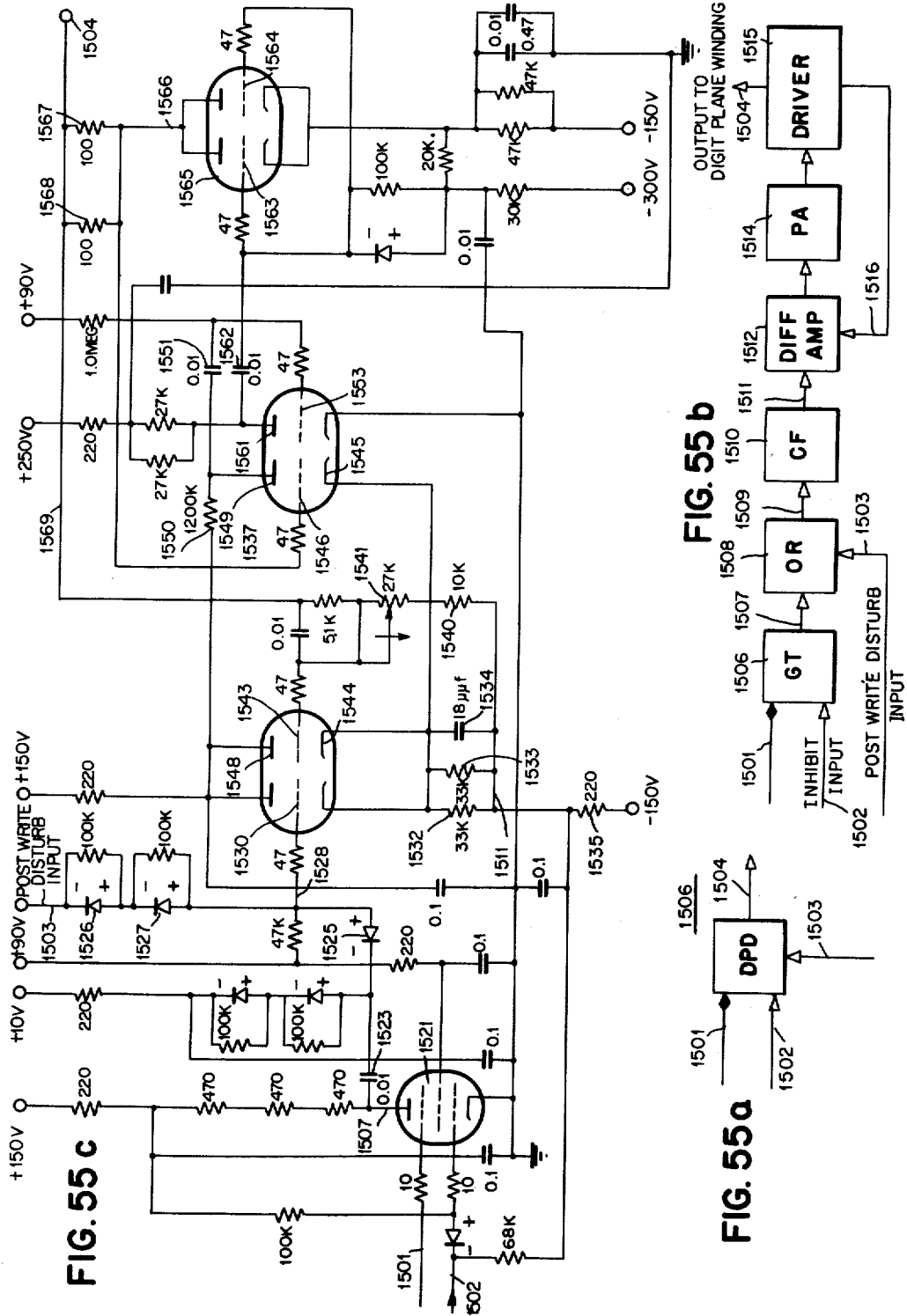

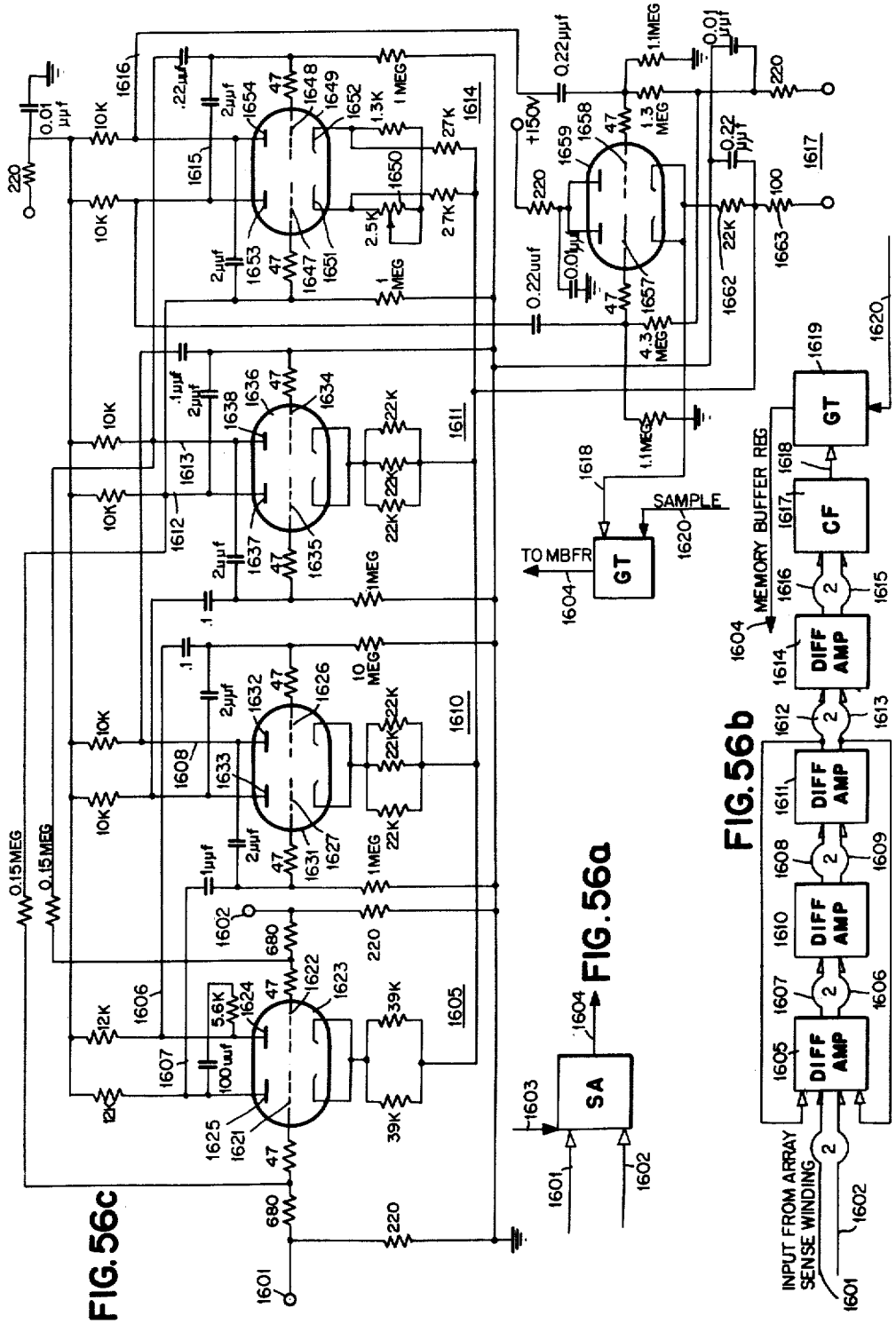

United States Patent Office 2,914,248
Patented Nov. 24, 1959

2,914,248

PROGRAM CONTROL FOR A DATA PROCESSING MACHINE

Harold D. Ross, Poughkeepsie, N.Y., Bernard L. Sarahan, Bellwood, Ill., and Morton M. Astrahan, Bennett Housman, and Walker H. Thomas, Poughkeepsie, N.Y., assignors to International Business Machines Corporation, New York, N.Y., a corporation of New York Continuation of abandoned application Serial No. 471,002, November 24, 1954. This application March 7, 1956, Serial No. 570,199

5 Claims. (Cl. 235—157)

This invention relates to electronic data processing machines and more particularly to high speed electronic digital data processing machines of the stored program type.

This application is a continuation of patent application Serial Number 471,002, entitled "Electronic Data Processing Machine," filed by H. D. Ross et al. on November 24, 1954, now abandoned.

In a computer designed for parallel operation, the instruction word includes a plurality of binary bits in which some of those bits are known as the operation part of the instruction and some others of those bits are known as the address part of the instruction. The operation part of the instruction word identifies some particular operation such as Add, Multiply, Subtract, Divide and so forth, which the computer is to perform. In certain instruction words, the address part of the instruction identifies the address of the operand in memory upon which the specified operation is to be performed whereas in certain other instruction words, for example Branch instructions, the address part identifies the address in memory of another instruction. In high speed digital computers of the stored program type a plurality of instruction words is stored in specified memory registers while the operands upon which these instructions are to be performed are stored in still other memory registers. A plurality of instruction words arranged in sequence is called a program and many programs are run in loop fashion in the sense that the same instructions are performed over and over again in the same sequence, the only variation being that the operands upon which these instructions operate are changed.

When an instruction in a stored program has its address modified by some given amount, the operation is known as indexing. In certain types of stored program data processing machines, the machine includes the necessary apparatus so that after an instruction word has been decoded and prior to the time at which the operand identified by the address part of the instruction is obtained, the address part of the instruction is modified to specify the address of the desired operand. In this way the sequentially performed instructions need be written by a programmer only once and each time the sequence of instructions is repeated, the effective address part of each instruction is changed.

Briefly stated, in accordance with the principles of this invention while the operation part of an instruction is being decoded, the address part of the instruction is first delivered to an Address Register which is in the form of an accumulator whereby the address part of the instruction can be modified by adding to or subtracting from it the contents of any one of several (Index) Registers. When the operation part of the decoded instruction specifies a particular Branch instruction, i.e. Branch and Index, in the event that the Branch is executed, then the address part of that instruction is used directly to obtain the next word from the memory element. Prior to the time at which the next word is obtained from the memory element, the contents of a selected one of the several (Index) Registers has added to it or subtracted from it a specified quantity.

An object of the present invention is to provide an improved indexing system for digital data processing machines.

A further object of the invention is to provide an improved indexing apparatus wherein, when a Branch instruction is performed to thereby effect a loop operation, the number used to modify the address part of the instruction is itself modified by a predetermined amount.

A still further object of this invention is to provide an improved apparatus for modifying the address part of one or more instruction in a loop of instructions, wherein each instruction has an operation part, indicating the particular operation to be performed by this instruction, and an address part, indicating the location in memory of the operand upon which this operation is to be performed.

Another object of this invention is to provide an improved apparatus which automatically stops repeating a series of programmed instructions when all of the data, upon which the series of instructions is to be performed, have been processed.

Other objects of the invention will be pointed out in the following description and claims and illustrated in the accompanying drawings, which disclose, by way of example, the principle of the invention and the best mode, which has been contemplated, of applying that principle.

In the drawings:

Fig. 1 illustrates the manner in which Figs. 2 through 6 are mechanically arranged to illustrate in block schematic form an electronic data processing machine constructed in accordance with the principles of this invention.

Figs. 2 through 6 comprise a block schematic diagram of an electronic data processing machine constructed in accordance with the principles of this invention.

Fig. 7 is a chart illustrating the timing relationship for the basic cycles of machine operation.

Fig. 8 is a diagram illustrating bits of an instruction word.

Fig. 9 illustrates the manner in which Figs. 10 through 15 are mechanically arranged to illustrate in block schematic form the Instruction Control Element 189 of Fig. 6.

Figure 6:
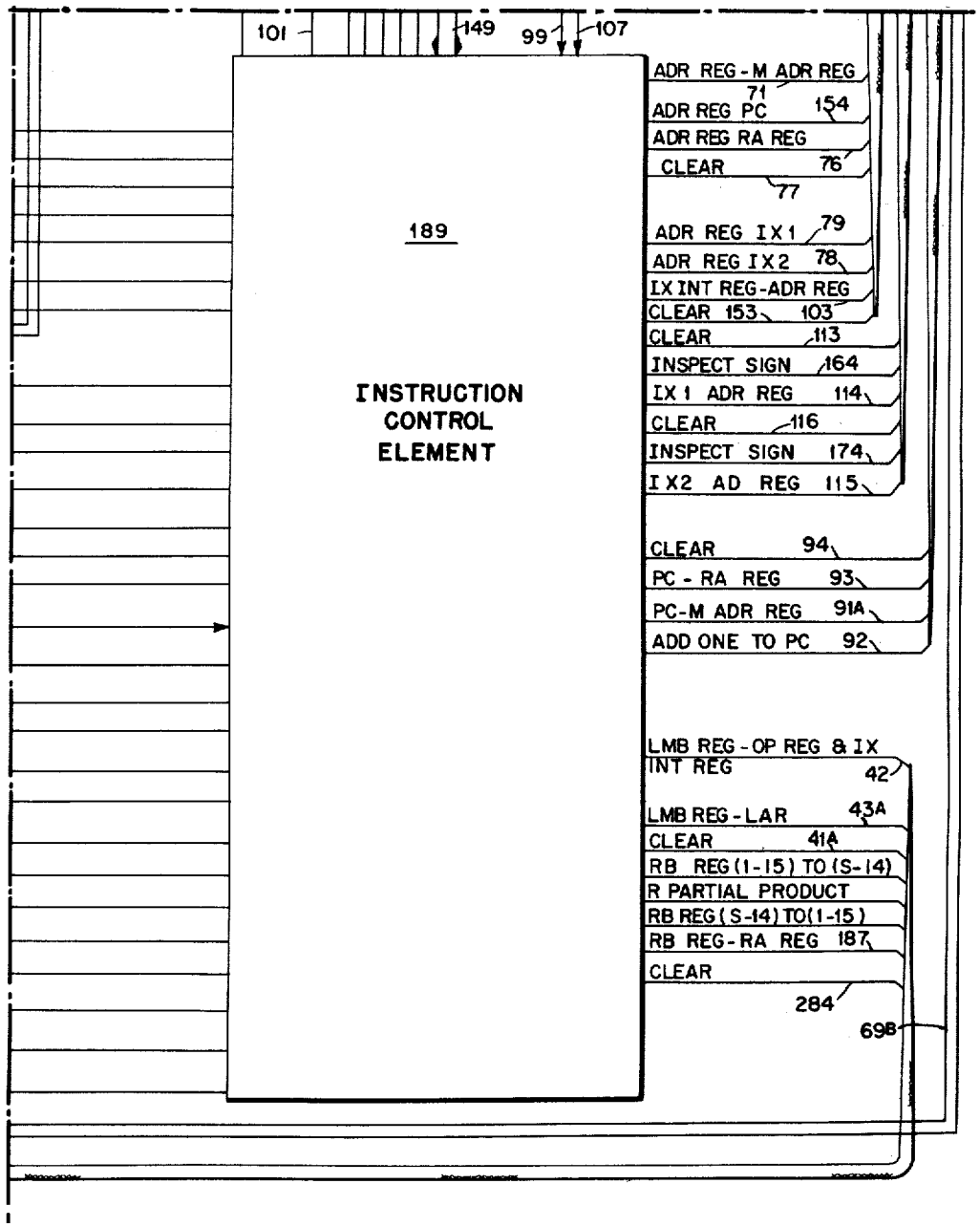

Figs. 10 through 15 comprise a block schematic diagram of the Instruction Control Element which is shown as block 189 in Fig. 6.

Figure 11:
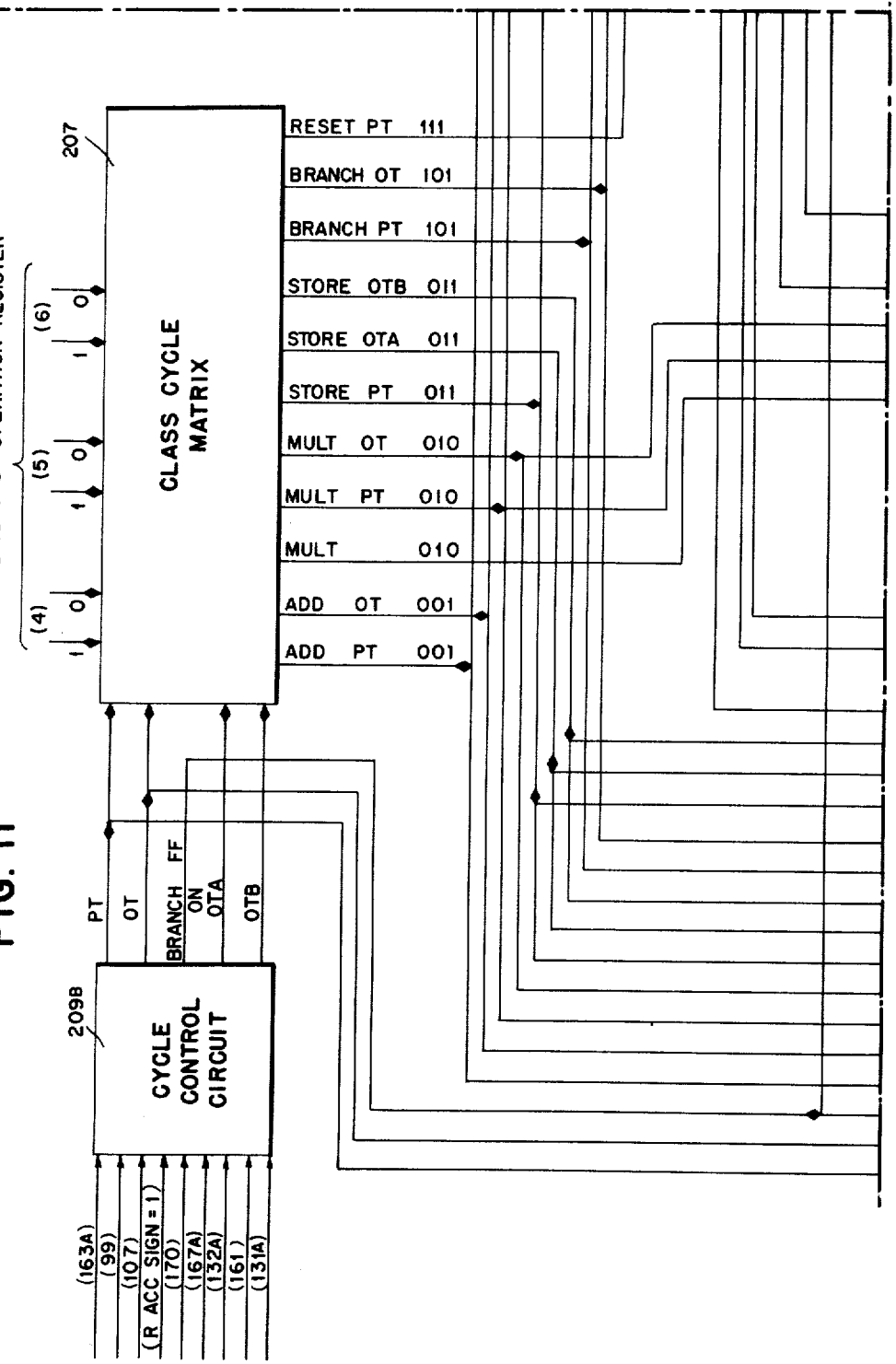
Figure 16A:
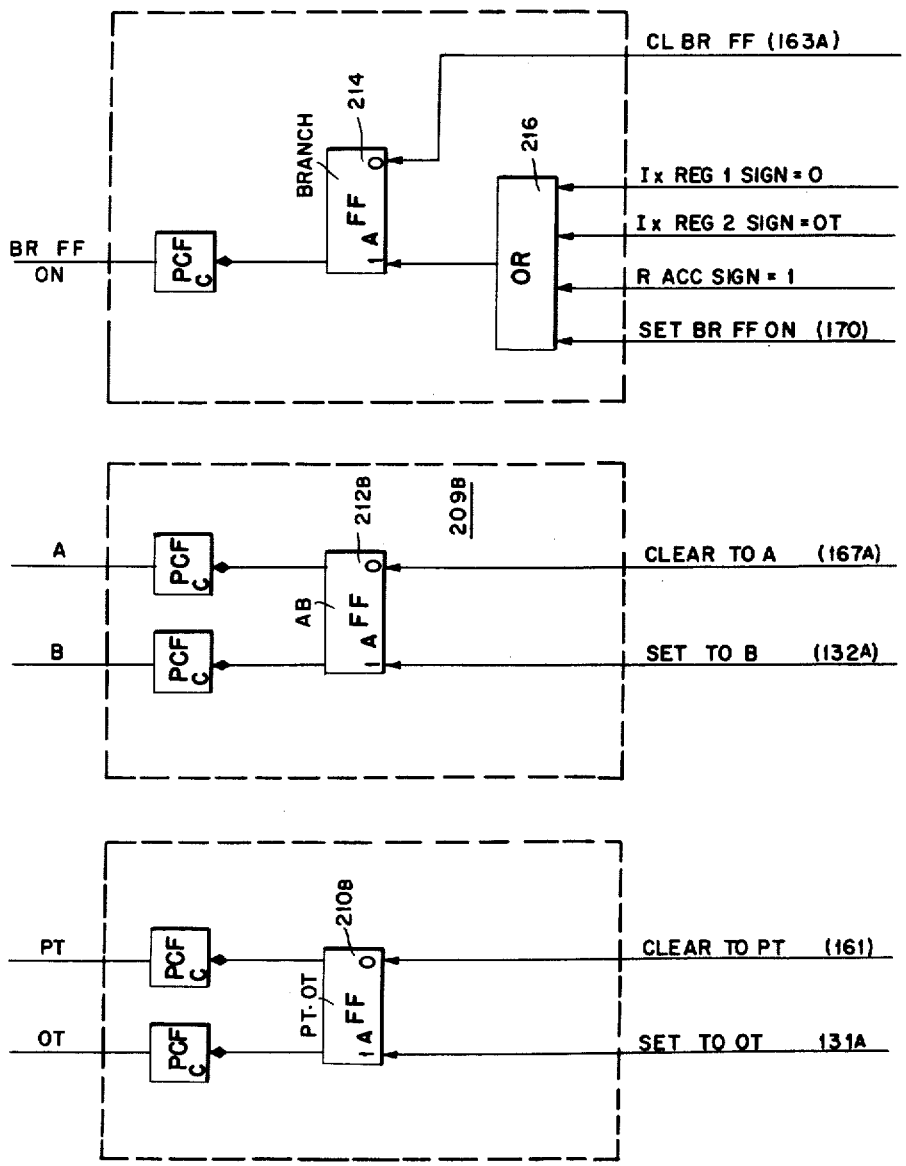

Fig. 16a is a logical diagram of the Cycle Control Circuit indicated as block 209B in Fig. 11.

Figure 10:
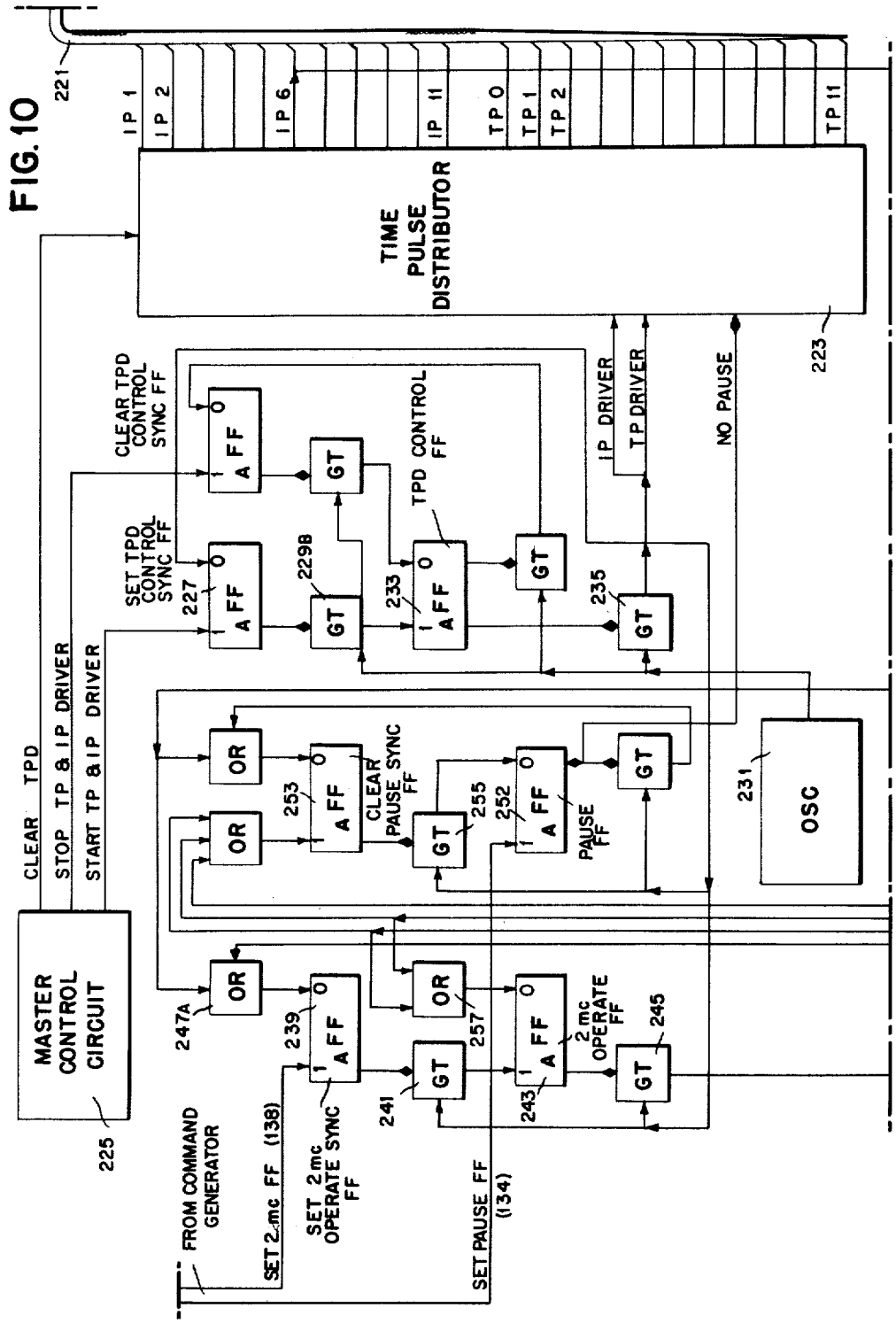

Fig. 16b is a logical diagram of the Time Pulse Distributor which is indicated as block 223 in Fig. 10.

Figure 17:
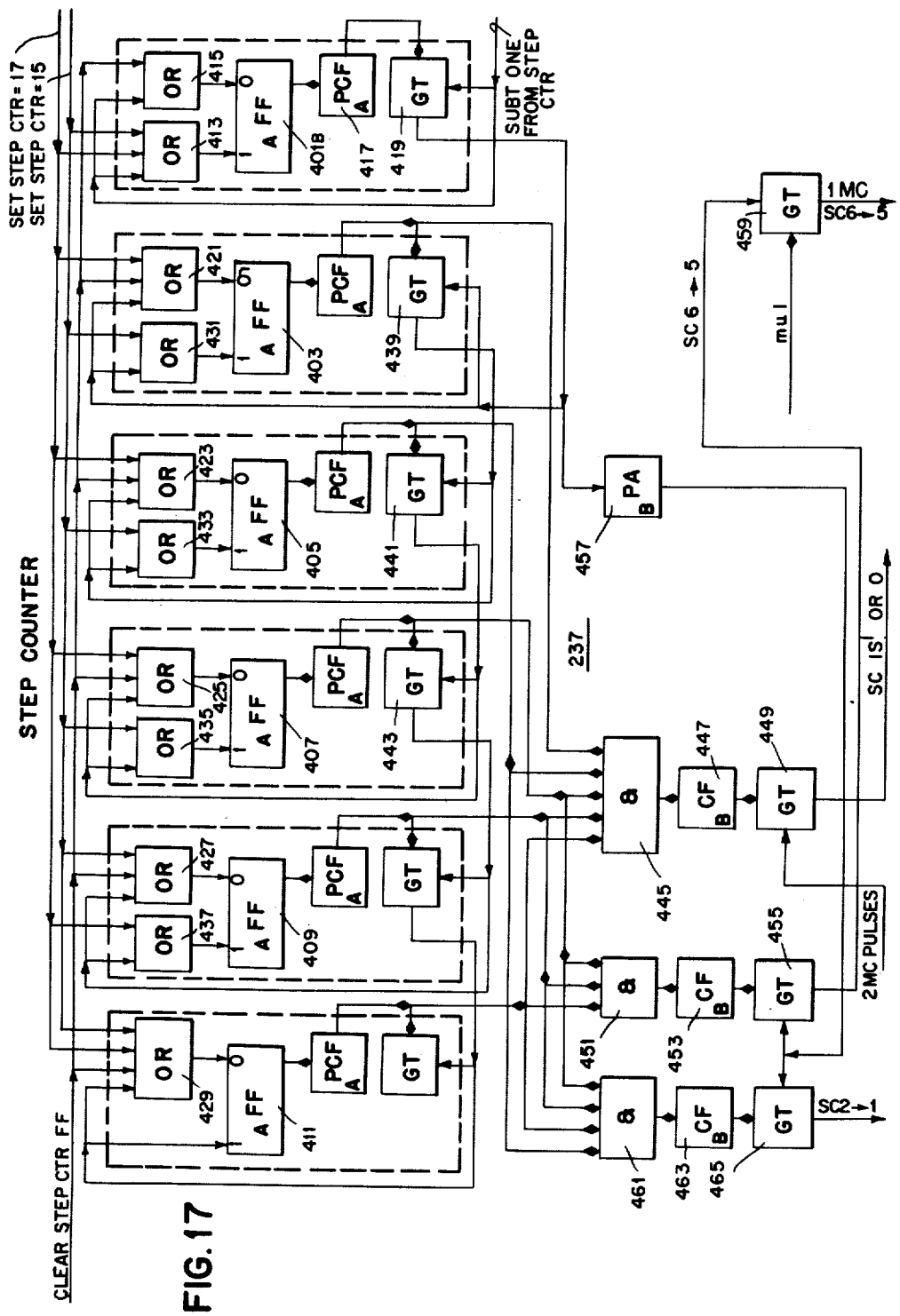

Fig. 17 is a logical diagram of the Step Counter which is shown as block 237 in Fig. 13.

Figure 18:
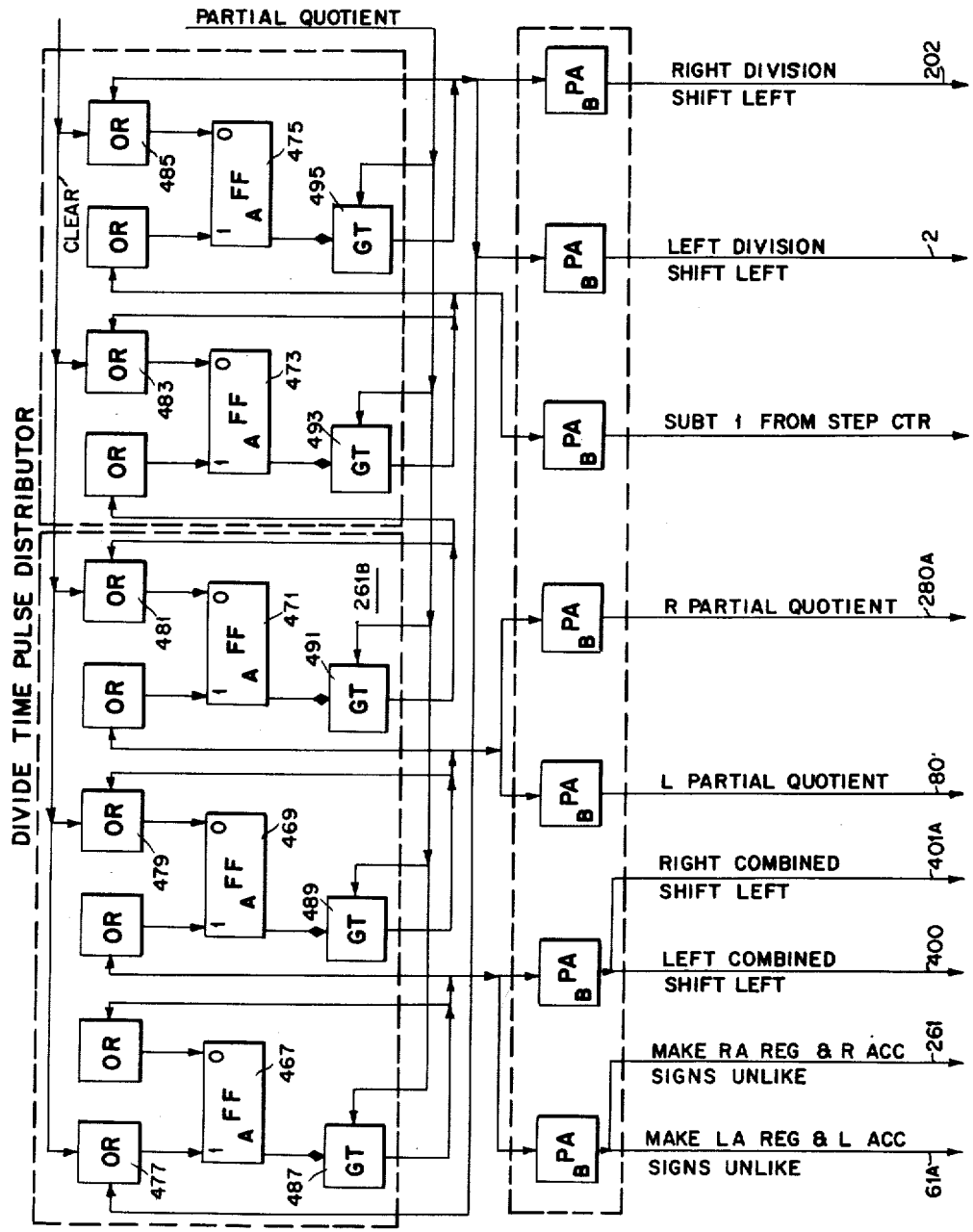

Fig. 18 is a logical diagram of the Divide Time Pulse Distributor which is illustrated as block 261 in Fig. 13.

Figs. 19a through 19h and 19j through 19o are timing charts which indicate the times at which various commands are generated for performing the various instructions herein described.

Fig. 20 illustrates the manner in which Figs. 21 and 22 are mechanically arranged to illustrate in logical diagram form the Branch Class Instruction Matrix and the Command Generators employed to perform the commands which are executed during a Branch and Index instruction.

Fig. 23a is a block schematic diagram of the Memory Element which is illustrated as block 21B of Fig. 2.

Figure 23B:
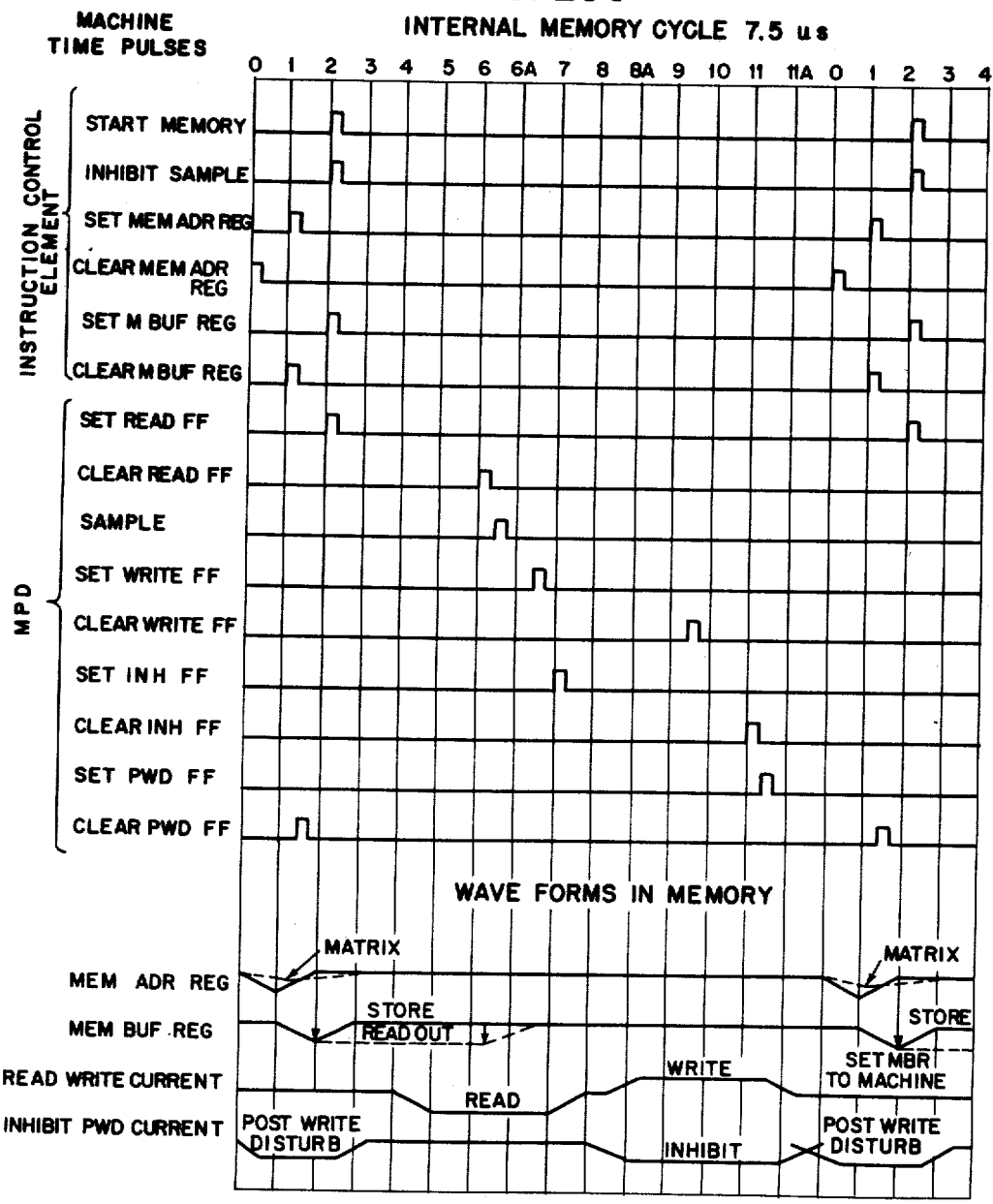

Fig. 23b is a timing chart which illustrates the timing operations within the Memory Element 21B of Fig. 2 as well as the waveforms which occur at certain points within the Memory Element.

Fig. 24 is a logical diagram illustrating the Memory Address Register which is shown as block 301 in Fig. 23a.

Figure 25:
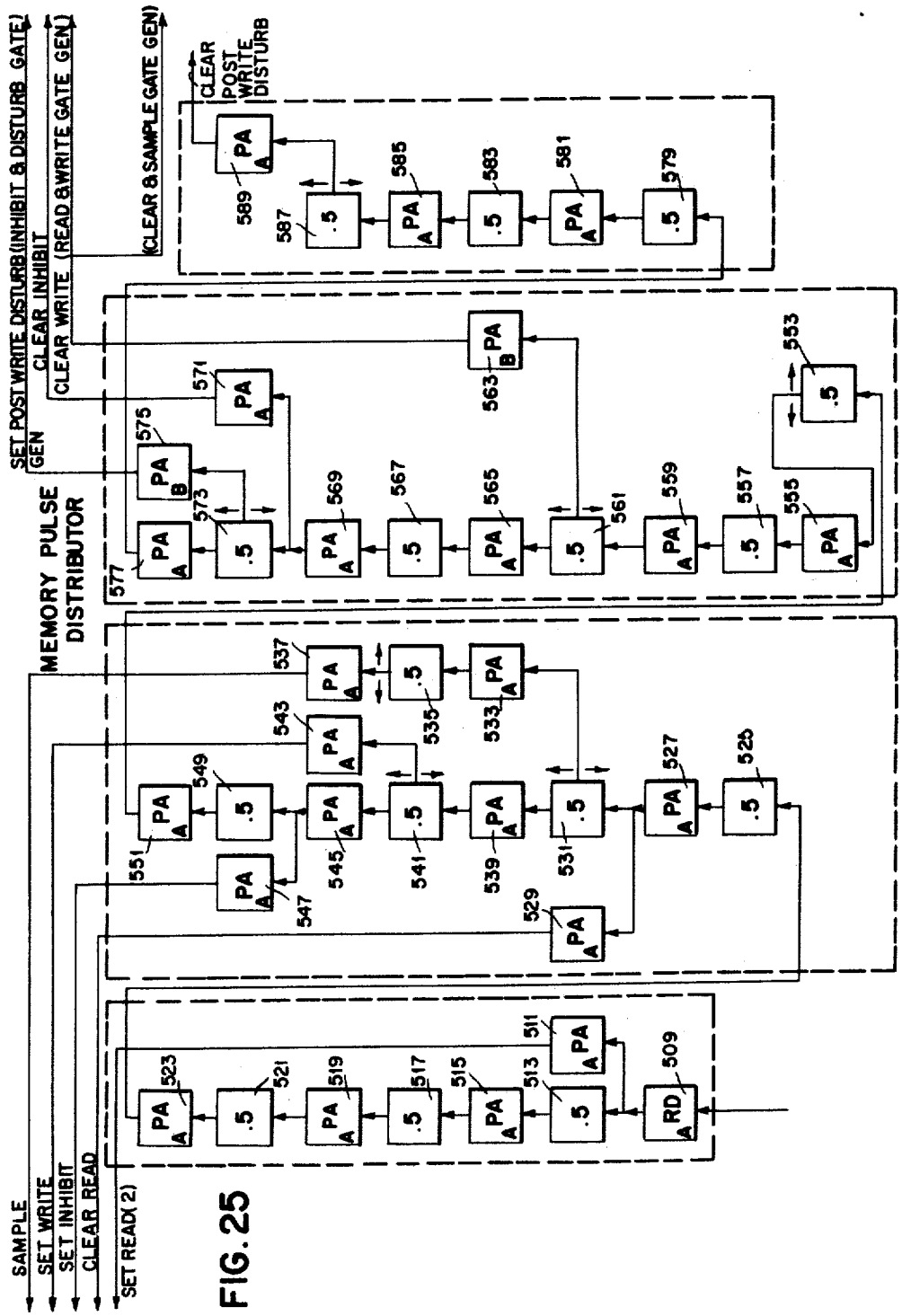

Fig. 25 is a logical diagram of the Memory Pulse Distributor which is shown as block 313 in Fig. 23a.

Fig. 26 is a logical diagram of the Read Gate Generator which is shown as block 311 in Fig. 23a.

Fig. 27 is a logical diagram of the Write Gate Generator which is illustrated as block 307 in Fig. 23a.

Fig. 28 is a logical diagram of the Inhibit Gate Generator which is illustrated as block 309 in Fig. 23a.

Figure 29:
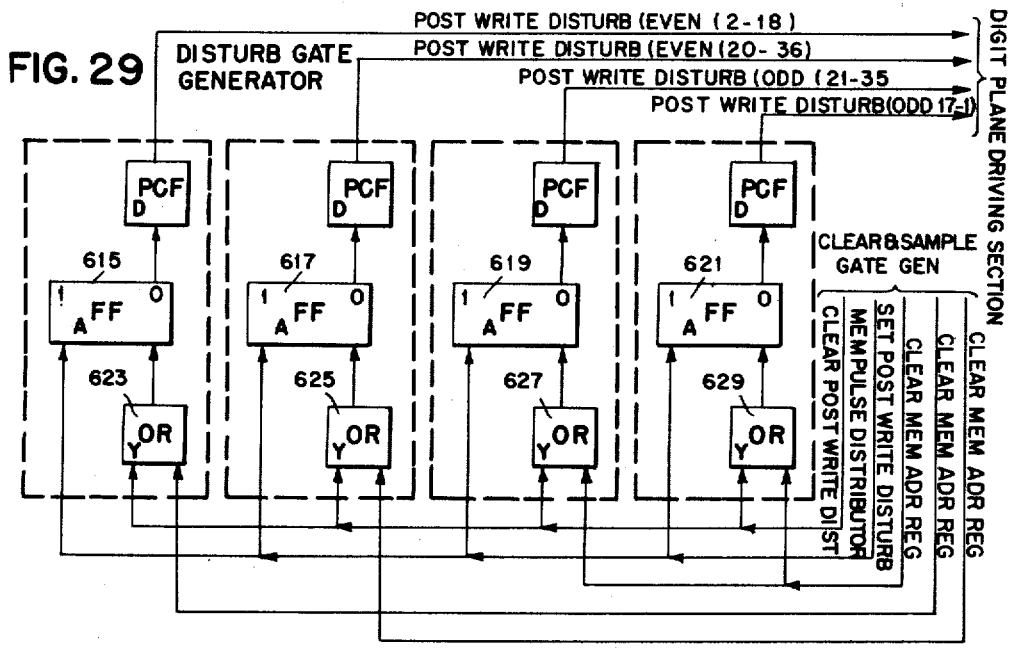

Fig. 29 is a logical diagram of the Disturb Gate Generator which is illustrated as block 305 in Fig. 23a.

Figure 30:
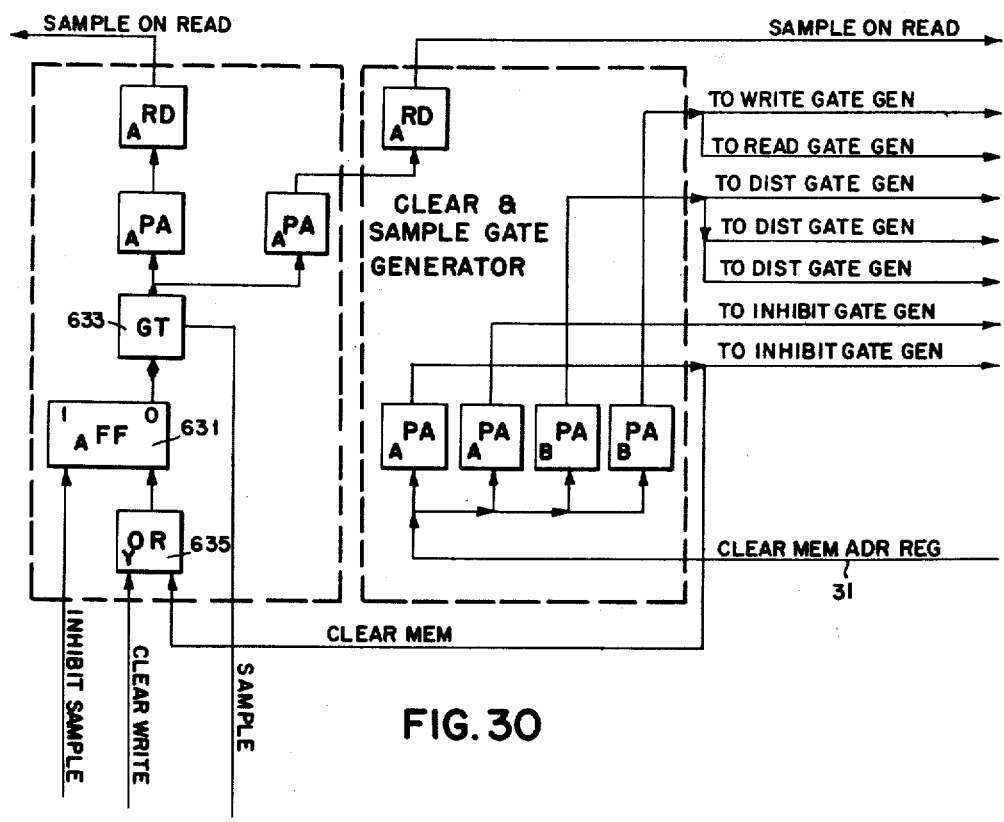

Fig. 30 is a logical diagram of the Clear and Sample Gate Generator which is illustrated as block 303 in Fig. 23a.

Fig. 31 is a logical diagram of the X Selection Gates which are illustrated as block 315 in Fig. 23a.

Fig. 32 is a logical diagram of the Y Selection Gates illustrated as block 317 in Fig. 23a.

Fig. 33 is a logical diagram of the X Drivers which are shown as block 339 in Fig. 23a.

Fig. 34 is a logical diagram of the Y Drivers which are shown as block 343 in Fig. 23a.

Fig. 35 is a logical diagram of the Digit Plane Driving Section shown as block 319 in Fig. 23a.

Fig. 36 is a logical diagram of the Sense Section shown as block 349 in Fig. 23a.

Fig. 37 is a logical diagram of the Left Memory Buffer Circuit shown as a block, accordingly labeled, in Fig. 2.

Fig. 38 is a logical diagram of the Right Memory Buffer Circuit shown as a block, accordingly labeled, in Fig. 2.

Figure 3:
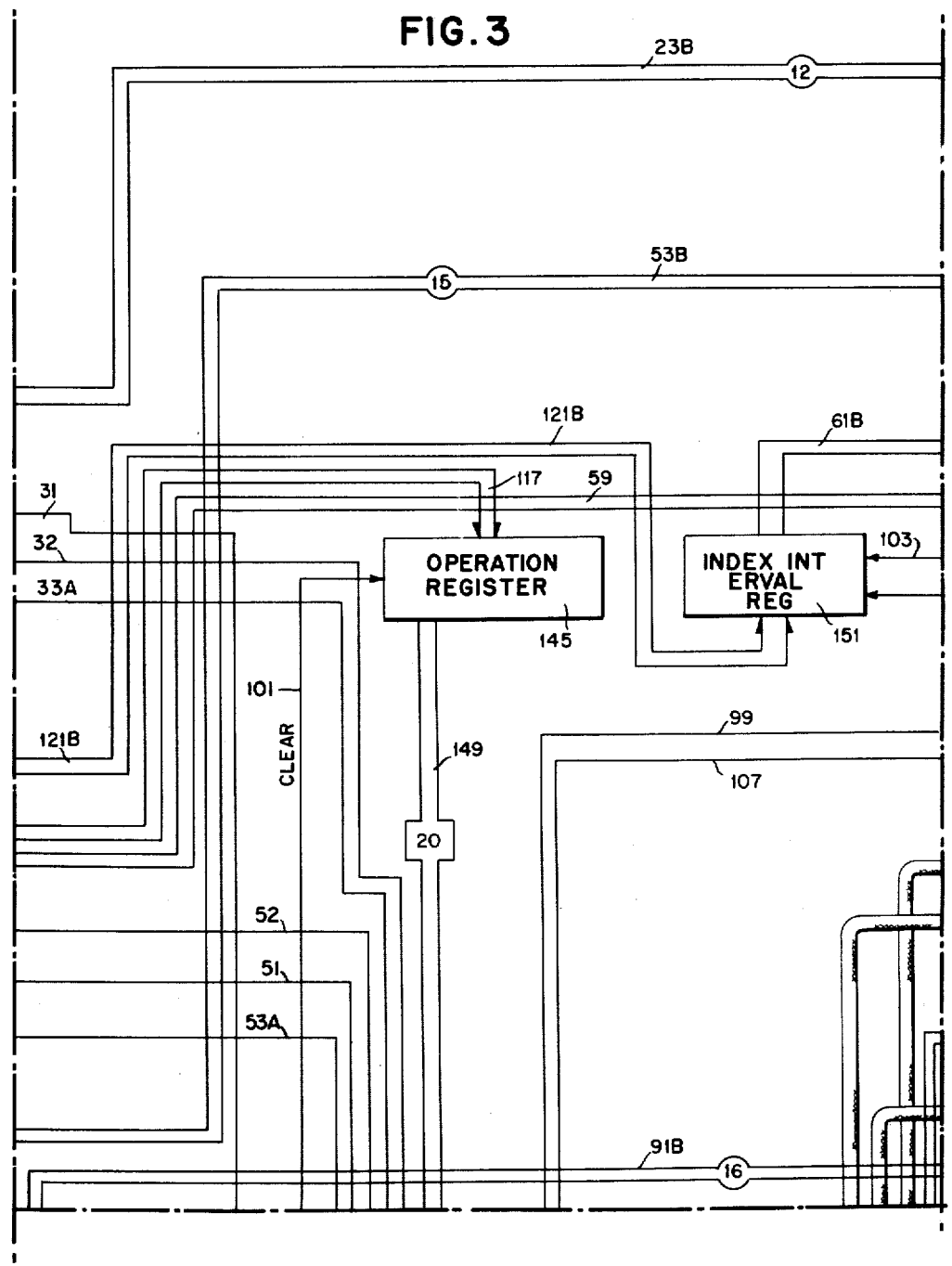

Fig. 39 is a logical diagram of the Operation Register shown as block 145 in Fig. 3.

Figure 4:
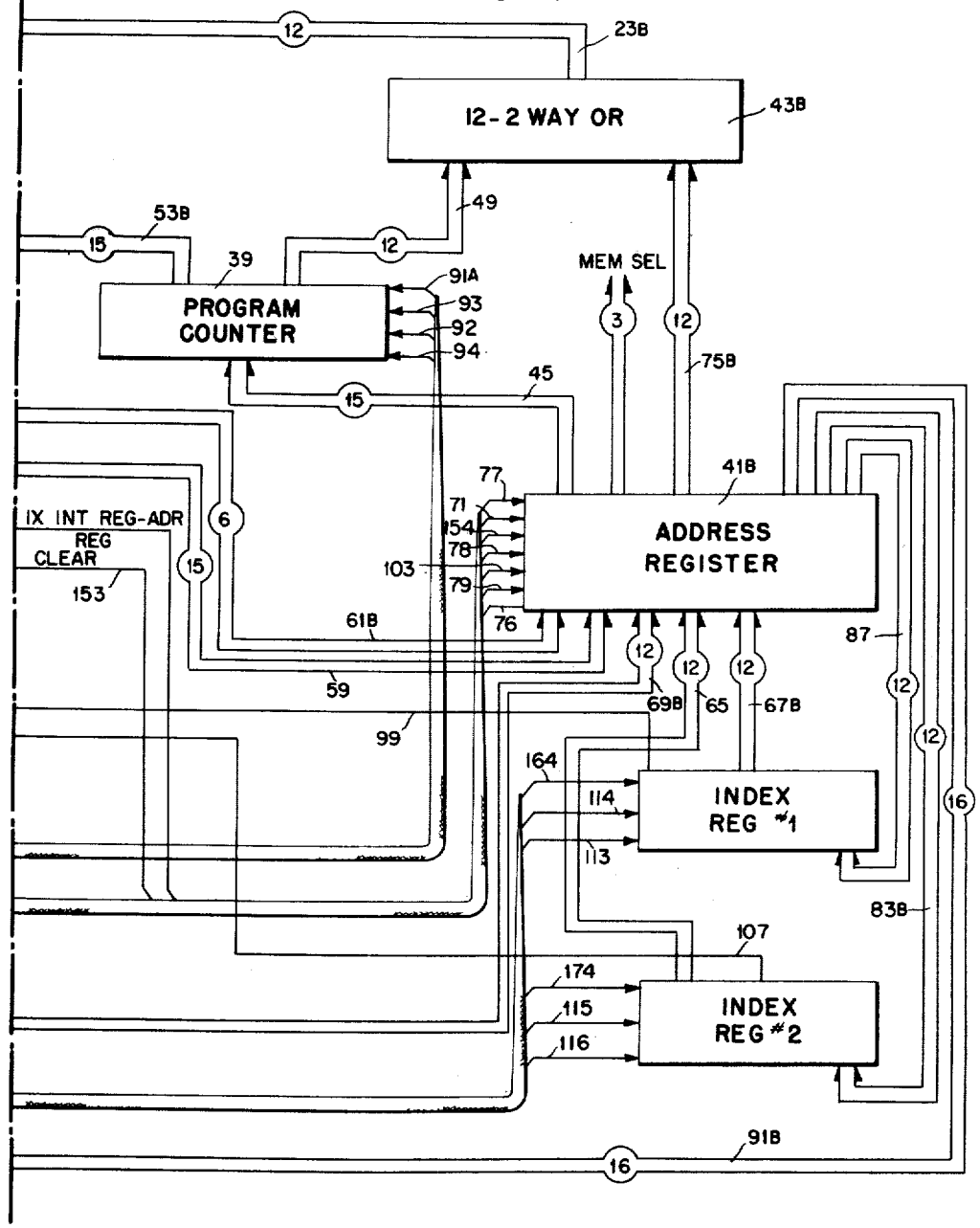

Fig. 40 is a logical diagram of the Index Register 1 shown as a block in Fig. 4.

Figure 41:
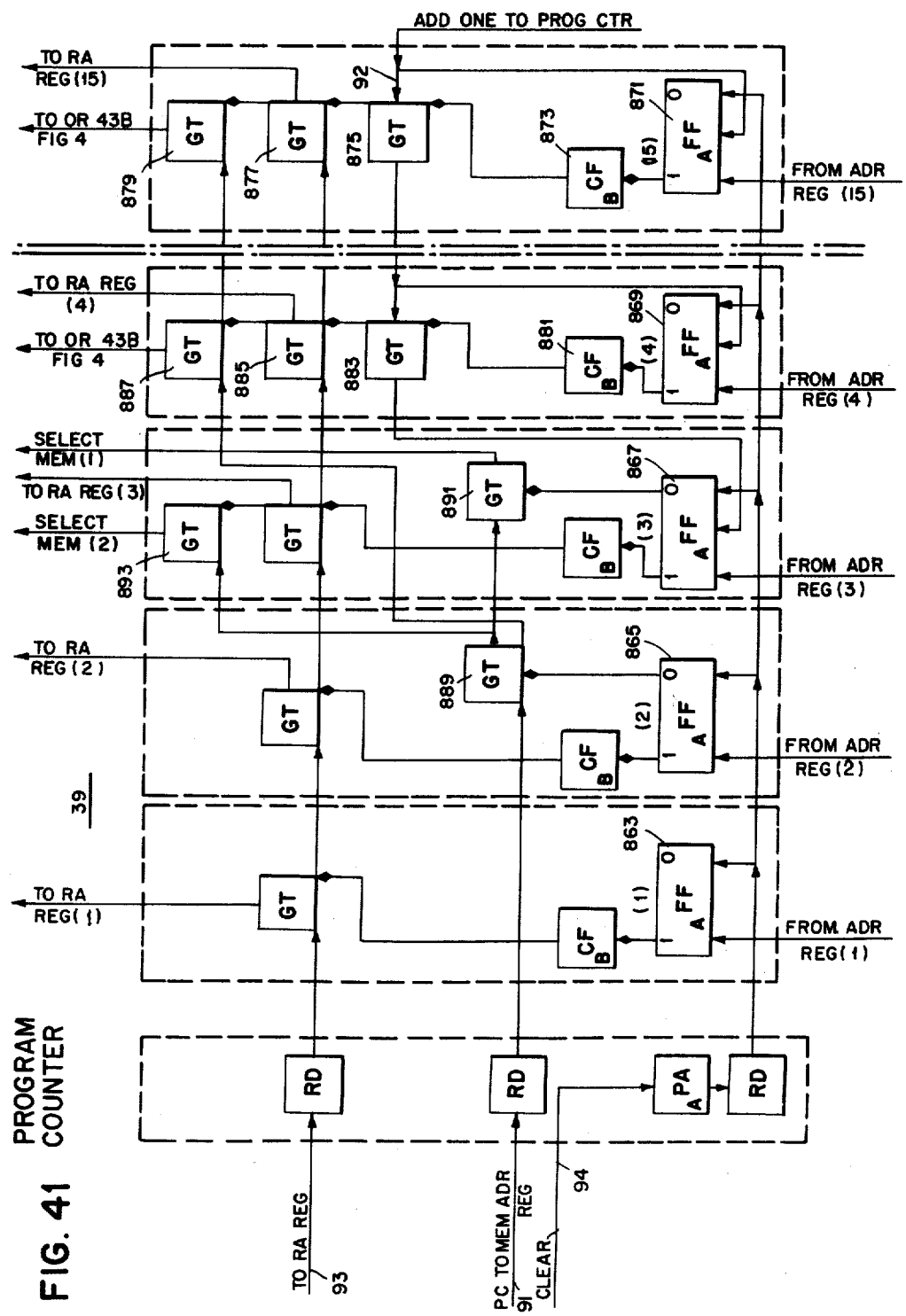

Fig. 41 is a logical diagram of the Program Counter shown as block 39 in Fig. 4.

Figure 42E:
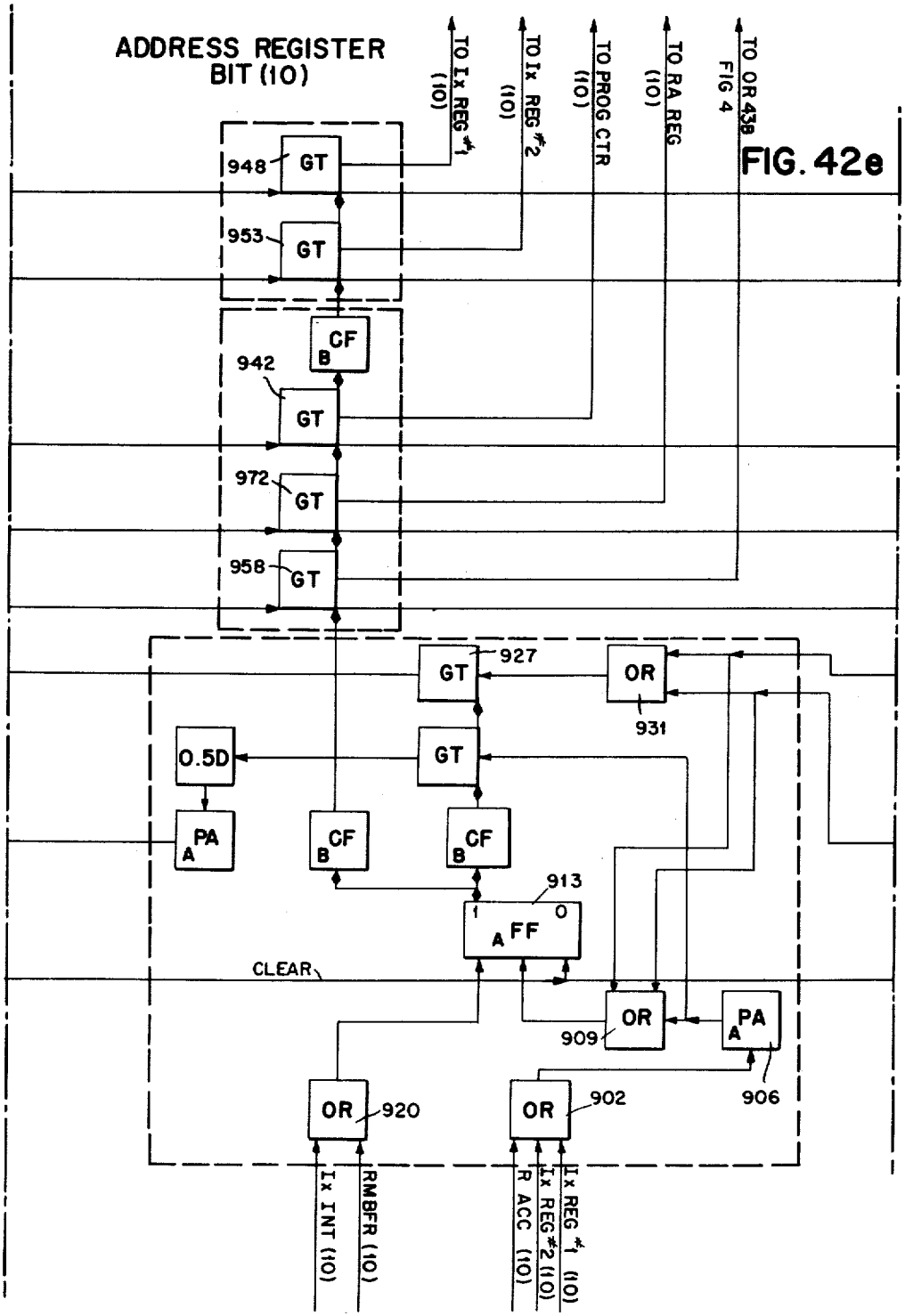

Fig. 42 illustrates the manner in which Figs. 42a through 42f are mechanically arranged to illustrate in logical form the Address Register which is shown as block 41B in Fig. 4.

Figure 43:
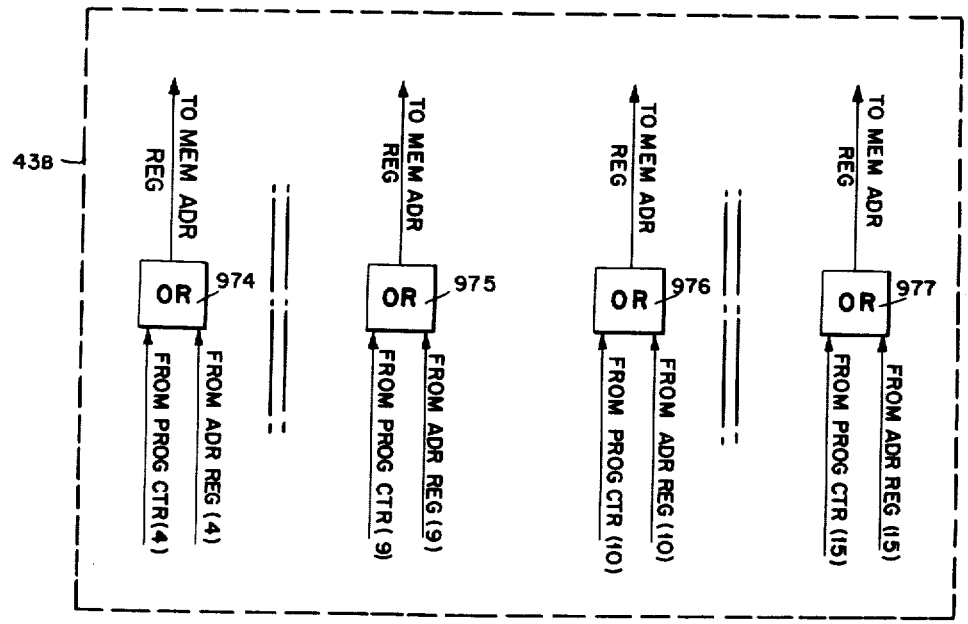

Fig. 43 is a logical diagram of the 12 two-way Or Circuits shown as block 43B in Fig. 4.

Figure 44:
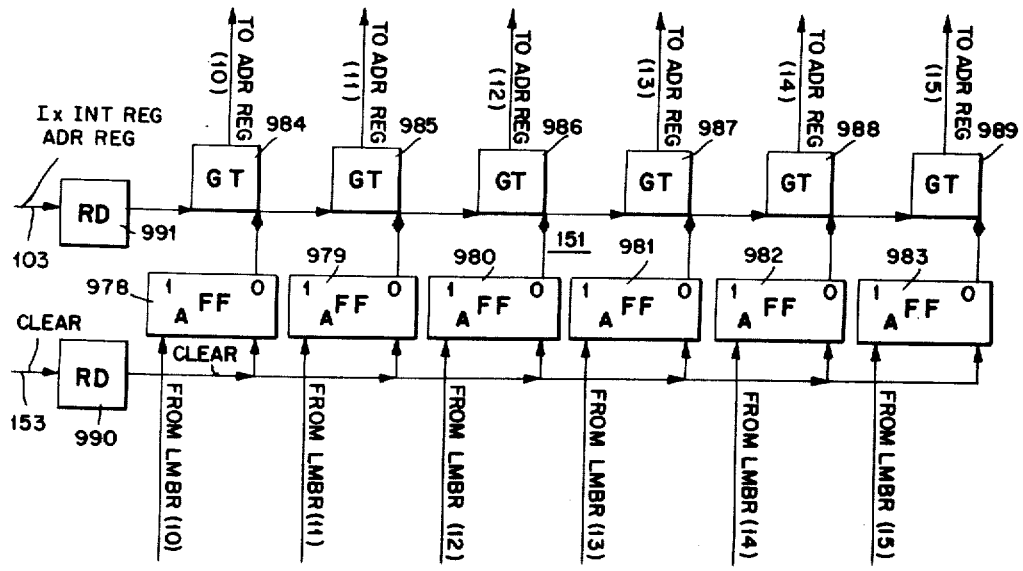

Fig. 44 is a logical diagram of the Index Interval Register shown as block 151 in Fig. 3.

Fig. 45 is a wiring schematic drawing of the model A flip-flop which is shown as a block throughout Figs. 1 through 44.

Fig. 46 is a wiring schematic diagram of the gate circuit illustrated as a block throughout Figs. 1 through 44.

Fig. 47 is a wiring schematic diagram of the Pulse Amplifier shown in block form throughout Figs. 1 through 44.

Fig. 48 is a wiring schematic diagram of the Register Driver illustrated as a block throughout Figs. 1 through 44.

Fig. 49 is a wiring schematic diagram of the A model cathode follower shown in block form throughout Figs. 1 through 44.

Fig. 50 is a wiring schematic diagram of a logical diode Or circuit shown in block form throughout Figs. 1 through 44.

Fig. 51 is a wiring schematic diagram of a delay unit shown in block form throughout Figs. 1 through 44.

Fig. 52 is a wiring schematic diagram of a Matrix Output Amplifier shown in block form in Figs. 33 and 34.

Fig. 53 is a wiring schematic diagram of a Core Memory Driver Circuit illustrated in block form in Figs. 33 and 34.

Fig. 54 is a wiring schematic diagram of a Memory Gate Generator shown in block form in Figs. 31 and 32.

Fig. 55a is a block symbol which is used in Fig. 35 to illustrate a Digit Plane Driver Circuit.

Fig. 55b is a logical diagram of the Digit Plane Driver Circuit shown in block form in Fig. 35 and Fig. 55a.

Fig. 55c is a wiring schematic diagram of the Digit Plane Driver Circuit shown in logical diagram form in Fig. 55b.

Fig. 56a is a block symbol illustrating a Sense Amplifier Circuit, this block symbol being employed in Fig. 36.

Fig. 56b is a logical diagram of the Sense Amplifier shown as a block, accordingly labeled, in Fig. 56a.

Fig. 56c is a wiring schematic diagram of the Sense Amplifier shown in logical diagram form in Fig. 56b.

Figure 57:
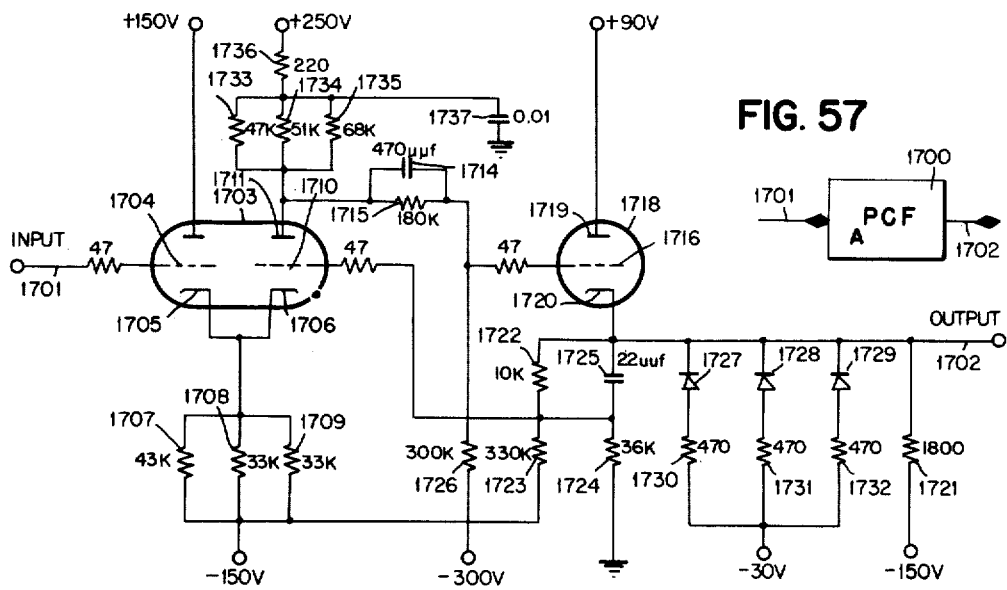

Fig. 57 is a wiring schematic diagram of the A Model Power Cathode Follower shown as a block in Figs. 1 through 44.

Figure 58:
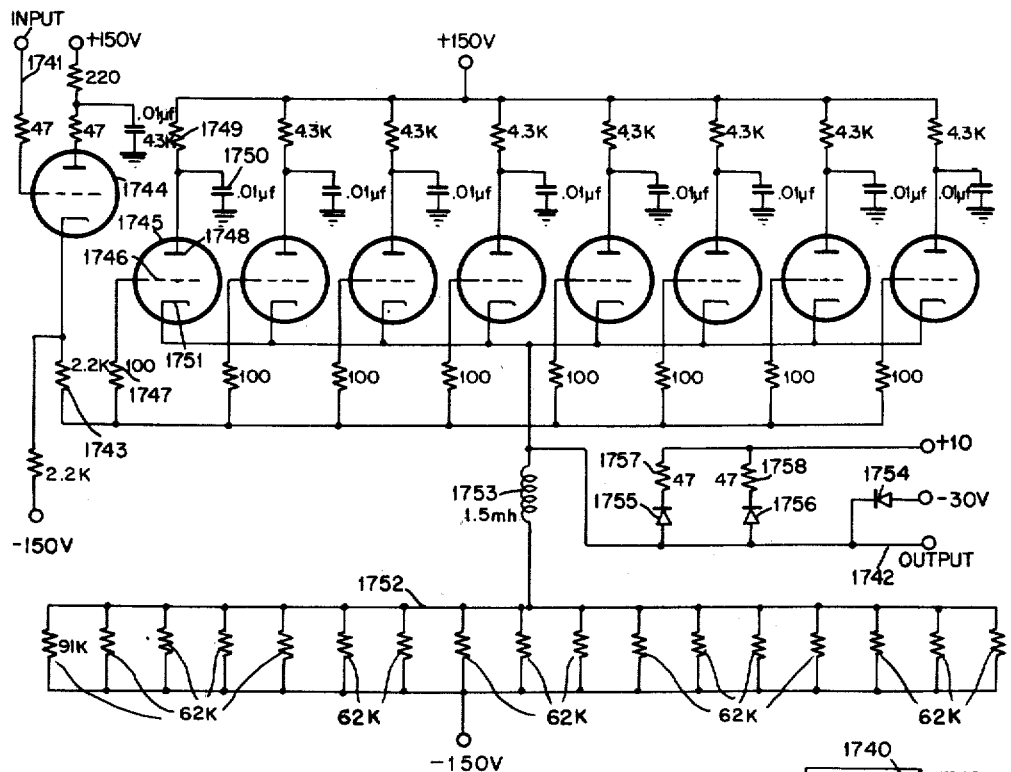

Fig. 58 is a wiring schematic diagram of the C Model Power Cathode Follower shown as a block in Figs. 1 through 44.

Figure 59:
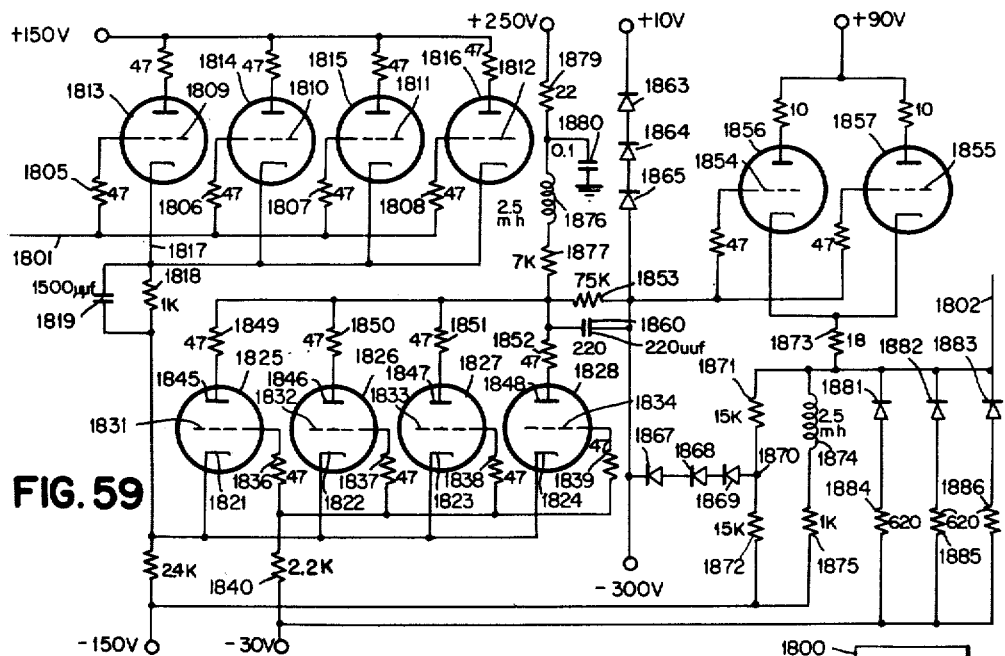

Fig. 59 is a wiring schematic diagram of the D Model Power Cathode Follower shown as a block in Figs. 1 through 44, and Fig. 60 is a wiring schematic diagram of the E Model Power Cathode Follower shown as a block in Figs. 1 through 44.

CONVENTIONS EMPLOYED

Throughout the following description and in the accompanying drawings there are certain conventions employed which are familiar to certain of those skilled in the art. Additional information concerning those conventions is as follows:

In the block diagram figures of the drawing a conventional filled-in arrowhead is employed on lines throughout the drawing to indicate (1) a circuit connection (2) energization with positive pulses and (3) the direction of pulse travel which is also the direction of control. A conventional un-filled-in arrowhead is employed on lines throughout the drawing to indicate the same things indicated by a conventional filled-in arrowhead except that the un-filled-in arrowhead illustrates a pulse having a duration considerably longer than the pulse represented by a filled-in arrowhead. A diamond-shaped arrowhead indicates (1) a circuit connection and (2) energization with a D.C. level. Cables which are used to transfer data are shown as two parallel lines with the arrowheads at one end thereof and at some point intermediate the ends of those cables, the two parallel lines are widened either in the form of a circle or in the form of a rectangular box and numbers appear within the circle or the rectangular box. Cables employing the circle indicate that the lines or conductors of that cable are pulsed at the same time whereas those cables having a rectangular box indicate that (1) if those lines are pulse lines, the lines of that cable are pulsed at different times or (2) that those lines are D.C. level conductors. The numbers appearing within the circle or the rectangular box of a cable indicate the number of conductors within the cable. The D.C. levels are on the order of 10 volts when positive and 30 volts when negative whereas pulses indicated by conventional filled-in arrowheads are $\frac{1}{10}$ microsecond in duration and positive. Pulses indicated by conventional un-filled-in arrowheads are considerably longer than $\frac{1}{10}$ microsecond in duration and on the order of 2 microseconds in duration. The input and output lines of the block symbols are connected to the most convenient side of the block including the same side in some cases. An input line to a corner of a block symbol and an output line from the adjacent corner of that block symbol indicates that the pulses or D.C. levels are applied to the input of the circuit represented by the block and the input conductor is electrically connected to the output conductor of the adjacent corner.

Bold face character symbols appearing within a block symbol identify the common name for the circuit represented, that is, FF identifies a flip-flop, GT a gate circuit, OR a logical Or circuit, and so forth. The character subscripts preceding bold face characters identify the model of the circuit identified by the bold face character, that is, $_A$FF identifies the model A flip-flop, $_C$FF identifies the model C flip-flop and so forth. A number preceding a subscript identifies the number of circuits in parallel, that is, $4_C$CF indicates 4 C model cathode followers in parallel, etc.

In the description the general arrangement of the apparatus of a preferred embodiment of this invention will first be described with respect both to the manner in which the various circuit components and apparatus are inter-connected and in respect to the general over-all operation which is performed by these components and apparatus. The description of the general arrangement will be followed by separate and detailed descriptions of the various components and apparatus, which so require it, and each section of the description will have a heading which indicates the apparatus about to be described. The following is an index or table of contents of the description.

TABLE OF CONTENTS

|  | Column Number |
|---|---|
| General Arrangement | 5–11 |
| Memory Element | 5 |
| Program Counter | 6 |
| Address Register | 6–7 |
| Index Registers 1 and 2 | 7 |
| Memory Buffer Circuits | 7–8 |
| Operation Register | 8 |
| Index Interval Register | 8 |
| Right and Left Arithmetic Elements | 8–9 |
| Instruction Control Element | 9–10 |
| Table 1 (Commands) | 9–10 |
| Detailed System Element Description | 11–47 |
| Instruction Control Element | 11–29 |
| Index Selection Matrix | 11 |
| Class Cycle Matrix | 11–12 |
| Variation Matrix | 12 |
| Table 2 (Operation Codes) | 12 |
| Instruction Matrices | 12 |
| Time Pulse Distributor | 12–14 |
| Step Counter | 14–17 |
| Divide Time Pulse Distributor | 17–18 |
| Common Commands | 18–19 |
| Add Class Instructions | 19–21 |
| Multiply Class Instructions | 21–22 |
| Store Class Instructions | 22–23 |
| Reset Class Instructions | 23–24 |
| Branch Class Instructions | 25–29 |
| Memory Element | 29–39 |
| Memory Address Register | 32–33 |
| Memory Pulse Distributor | 33–34 |
| Read Gate Generator | 34–35 |
| Write Gate Generator | 35 |
| Inhibit Gate Generator | 35 |
| Disturb Gate Generator | 35 |
| Clear and Sample Gate Generator | 35 |
| X Selection Gates | 35–36 |
| Y Selection Gates | 36 |
| X Drivers | 36–37 |
| Y Drivers | 37–38 |
| Digit Plane Driving Section | 38–39 |
| Memory Buffer Circuits | 39–41 |
| Operation Register | 41 |
| Index Register | 41–42 |
| Program Counter | 42–43 |
| Address Register | 43–47 |
| 2-Way Or Circuit | 47 |
| Index Interval Register | 47 |
| General System Operation | 47–48 |
| Comparative Example Programs | 48 |
| Without Indexing | 48–53 |
| With Indexing | 53–55 |
| Basic Circuits | 55–71 |
| Model A Flip-Flop | 55–59 |
| Gate Circuit | 59 |
| Model B Pulse Amplifier | 59–60 |
| Model A Pulse Amplifier | 60 |
| Register Driver | 60 |
| Cathode Followers | 60–61 |
| Or Circuit | 61–63 |
| And Circuit | 63 |
| Delay Unit | 63 |
| Matrix Output Amplifier | 63–64 |
| Core Memory Driver | 64–65 |
| Memory Gate Generator | 65–66 |
| Digit Plane Driver | 66–67 |
| Sense Amplifier | 67–68 |
| Model A Power Cathode Follower | 68–69 |
| Model C Power Cathode Follower | 69–70 |
| Model D Power Cathode Follower | 70–71 |
| Model E Power Cathode Follower | 71 |

GENERAL ARRANGEMENT

Referring now to Figures 2 through 6, Memory Element 21B for the purpose of the immediate description is a device which, in response to electrical signals on the conductors of cable 23B, produces, on the conductors of cables 25 and 27, signals representative of the data stored in memory at the location defined by the signals on the conductors of cable 23B when a pulse is received on conductor 32 and no pulse is received on conductor 33A. When a pulse is received on conductors 32 and 33A, the Memory Element 21B is capable of storing the signals, on the conductors of cable 33B and 35, in the memory register whose location is specified by the signal on the conductors of cable 23B. As will be described in more detail hereinafter, a pulse on conductor 31 always precedes a pulse on either conductor 32 or 33A and this pulse is for the purpose of clearing the memory controls. The Memory Element 21B may have any desired number of memory registers; however for the purposes of illustrating this invention, the Memory Element will be assumed to contain 4,096 registers, each register having a sufficient number of bits to store all of the bits of a "full word." The number of bits in a full word as illustrated herein is 32 and each full word can be considered as two half words, each consisting of 16 bits. The unique address of any register within the Memory Element 21B can be specified by 12 bits and those bits are conveyed to the Memory Element 21B by way of the conductors of cable 23B from either a Program Counter 39 or an Address Register 41B through two-way Or circuits 43B.

The Program Counter 39, for the purpose of the immediate description, is a device capable of (1) storing the signals on the conductors of cable 45, (2) in response to a pulse on conductor 91, delivers the signals stored therein to the conductors of cable 49, (3) in response to a pulse on conductor 93, delivers the signals stored therein to the conductors of cable 53B, (4) in response to a pulse on conductor 92, adding a binary one to the binary signals stored therein, and (5) in response to a pulse on conductor 94, storing therein signals representative of binary zero. The Program Counter's function in the system is to produce signals representative of the address of the next instruction word stored in memory. In normal operation, subsequent to each time the Program Counter delivers its stored data on its conductors of cable 49, the contents stored therein is increased by a count of one and therefore the Program Counter normally specifies the location of successive instructions.

The Address Register 41B, for the purpose of the immediate description is a device capable of (1) storing therein signals received from the conductors of cable 59 or signals received from the conductors of cable 61B since prior to the application of the pulses from the conductors of cable 59 or the conductors of cable 61B, in normal operation, the Address Register is cleared by the application of a pulse on conductor 77, (2) receiving signals from the conductors of cables 65, 67B or 69B, and adding those binary signals to the binary signals already stored in the Address Register. In normal operation, signals on the conductors of cable 61B are in binary complement form and therefore if the Address Register is cleared by a pulse on conductor 77 prior to the receipt of the signals on the conductors of cable 61B and a pulse is applied by way of conductor 103, the binary complement will be stored in the Address Register.

The Address Register 41B is also capable of (1) in response to a pulse on conductor 71, delivering pulses on the conductors of cable 75B representative of the signals stored therein, (2) in response to a pulse on conductor 77, delivering pulses on the conductors of cable 45 which are representative of the signals stored therein, (3) in response to a pulse on conductor 78, delivering pulses on the conductors of cable 83 which are representative of the signals stored therein, (4) in response to a pulse on conductor 79, delivering pulses to the conductors of cable 87 which are representative of the signals stored therein, and (5) in response to a pulse on conductor 76 delivering pulses to the conductors of cable 91B which are representative of the signals stored therein.

*Index Register* 1, for the purpose of the immediate description, is a device capable of (1) storing the signals received from the conductors of cable 87 having previously been cleared by a pulse on conductor 113, (2) upon receipt of a pulse on conductor 114, producing signals on the conductors of cable 67B representative of the signals stored therein, and (3) upon receipt of a pulse on conductor 164, delivering a pulse to conductor 99 if the sign, of the number represented by the signals stored therein, is positive.

*Index Register* 2 may be identical in function to Index Register 1, that is, Index Register 2 is capable of (1) storing the signals applied from the conductors of cable 83B having first been cleared by a pulse on conductor 116, (2) in response to a pulse on conductor 115, delivering pulses to the conductors of cable 65 representative of the signals stored therein, and (3) in response to a pulse on conductor 174, delivering a pulse on conductor 107 provided that the number represented by the signals stored therein is positive.

The indexing system of the apparatus herein described comprises the means of modifying the address of operands. The address of an operand is contained in the address part of an instruction word and signals representative of the address of the operand are momentarily stored in the Address Register 41B. A stored program comprises a series of instruction words, each instruction word being stored by address with the left half of each instruction word identifying the operation to be performed and the right half of the instruction word identifying the address of the operand upon which that operation is to be performed. Many programs for digital computers are run in loop fashion in the sense that the same instructions are performed over and over in the same sequence, the only variation being that the operands upon which the instructions operate are changed as the sequence is repeated. Since the address of an operand can be changed without changing the instruction as stored in memory, the use of the same series of instructions repetitively results in the saving of storage space for the program in memory. Furthermore a substantial saving in time is effected since a rather long program can be performed without loading the memory with new instructions during the execution of the program. A modification of the address contained in the right half of an instruction word is accomplished in the Address Register 41B before the contents of the Address Register are transferred to the Memory Element 21B in the execution of the instruction. The signals transferred from the Address Register to the Memory Element 21B are stored therein and used for the selection of a particular one of the registers in the Memory Element 21B. This modification of the address part of the instruction is accomplished by having the Address Register arranged as an Adder Circuit whereby its present contents (the address part of the instruction word) is one of the inputs to the Adder and another input to the Adder may be either the contents of Index Register 1, Index Register 2 or of the Right Accumulator 109. The sum is contained in the Address Register when the adding process is complete.

The *Left Memory Buffer Circuit* and the *Right Memory Buffer Circuit* are devices which are capable of storing the signals received on the conductors of cables 25 and 27 respectively, having first been cleared by a pulse on conductor 41A and conductor 53A respectively. The Left Memory Buffer Circuit and the Right Memory Buffer Circuit continuously deliver by way of the conductors of cables 33B and 35, respectively, D.C. levels representative of the signals stored therein. The Left Memory Buffer Circuit, (1) in response to a pulse on conductor 42 delivers pulses on the conductors of cable 117 representative of signals stored therein and delivers pulses on the conductors of cable 121B representative of the signals stored therein, (2) in response to a pulse on conductor 43A delivers pulses to the conductors of cable 129 representative of the signals stored therein and (3) stores therein signals from the conductors of cable 131B or from the conductors of cable 132B having first been cleared by a pulse on conductor 41A.

The Right Memory Buffer Circuit, (1) upon receipt of a pulse on conductor 52 delivers pulses on the conductors of cable 59 representative of the signals stored therein, (2) upon receipt of a pulse on conductor 51 delivers pulses on the conductors of cable 137 representative of the signals stored therein, and (3) stores the signals from the conductors of cable 143 or from the conductors of cable 144 having first been cleared by a pulse on conductor 53A.

*Operation Register* 145 is a device capable of storing signals received from the conductors of cable 117 having first been cleared by a pulse on conductor 101 and continuously delivers on the conductors of cable 149 D.C. levels representative of the signals stored therein.

*Index Interval Register* 151 is a device capable of storing the signals received from the conductor of cable 121B having first been cleared by a pulse on conductor 153 and delivers, in response to a pulse on conductor 103, pulses on the conductors of cable 61B representative of the signals stored therein.

The Right A Register is capable of, (1) storing signals received on the conductors of cables 91B, 137, 53B or 157 having first been cleared by a pulse on conductor 230A, (2) in response to a pulse on conductor 162, delivering pulses on the conductors of cable 163B representative of the signals stored therein, (3) in response to a pulse on conductor 228A, delivering pulses on the conductors of cable 143 representative of the signals stored therein and (4) continuously delivering D.C. levels on the conductors of cable 167B representative of the signals stored therein.

The Right Adder is a device capable of producing in response to a pulse on conductor 264A, pulses on the conductors of cable 171 and conductor 173, signals representative of the sum of the signals on the conductors of cable 167B and the conductors of cable 175.

The Right Accumulator 109 is a device capable of (1) storing signals received from the conductors of cable 163B or the conductors of cable 171, having first been cleared by a pulse on conductor 210A, (2) in response to a pulse on conductor 201A, delivers pulses to the conductors of cable 181 representative of the signals stored therein, (3) upon receipt of a pulse on conductor 212A delivers pulses to the conductors of cable 69B representative of the signals stored therein, and (4) upon receipt of a pulse on conductor 121A, delivers pulses to the conductors of cable 144 representative of the signals stored therein.

The Right B Register is a device capable of storing signals received on the conductors of cable 181 and conductor 173, having first been cleared by a pulse on conductor 284. The Right B Register is also capable of delivering puses on the conductors of cable 157 representative of the signal stored therein in response to a pulse on conductor 187.

The Left A Register, the Left Adder, the Left Accumulator and the Left B Register may be identical in function to the right elements just described and it will be understood that the transfer of signals from those elements and the storage of signals therein is likewise controlled by input pulses on conductors identical to those conductors shown with respect to the right elements. The left elements jointly are referred to as the Left Arithmetic Frame and the right elements jointly are referred to as the Right Arithmetic Frame. Each of these frames may be substantially identical to the apparatus disclosed in co-pending application of B. L. Sarahan et al., entitled "Electronic Digital Computer," Serial No. 414,459, filed March 4, 1954.

The *Instruction Control Element* 189 controls the machine operations. In normal operation the data processing machine performs cyclic operations. Referring now to Fig. 7, the timing charts illustrated in that figure indicate that the basic instruction cycle duration may be any one of three periods in length. In Fig. 7 the timing chart of Fig. 7a illustrates the timing pulses labeled PT–7 through PT'–6 which is a basic instruction cycle and this cycle is followed by the next instruction cycle which begins at PT'–7. Timing chart of Fig. 7b illustrates timing pulses PT–7 through PT–11, followed by OT–0 through OT–11, followed by PT'–0 through PT'–6 which together make up a basic instruction cycle and this instruction cycle is followed by PT'–7 of the next following instruction cycle. The timing chart of Fig. 7c illustrates timing pulses PT–7 through PT–11 followed by OTA–0 through OTA–11, followed by OTB–0 through OTB–11, followed by PT'–0 through PT'–6 and these pulses make up an instruction cycle which is followed by PT'–7 of the next following instruction cycle.

It is therefore seen that the various basic instruction cycles are different in time duration. This difference in time duration permits a given instruction to be performed by an instruction cycle whose time duration is sufficient for all of the commands associated with that instruction to be performed. The manner in which the cycle duration for each of the various instructions is controlled will be more fully described hereinafter.

Referring again to Figs. 2–6, each time that the operation part of an instruction is transferred by way of the conductors of cable 117 to the Operation Register 145, that operation part of the instruction, which is in binary form, is stored in the Operation Register 145 and produces D.C. signals on the conductors of cable 149 representing the operation which is next to be performed.

*Instruction Control Element* 189 receives the D.C. levels on the conductors of cable 149 and dependent upon the operation indicated by those signals, the Instruction Control Element produces pulses on certain of its output conductors and those pulses occur in certain time relationships to be more fully described hereinafter. The pulses produced on the various output conductors to the Instruction Control Element 189 are called commands and in the drawing those conductors are labeled with the abbreviation of the command performed as well as the assigned command number. The various commands which the Instruction Control Element 189 may perform are as follows:

TABLE 1

| Command number | Command name |
|---|---|
| 1 | L Acc to L B Reg. |
| 2 | L Division Shift Left. |
| 8 | Cl L Sign Ctrl. |
| 9 | L Correct Sign. |
| 10 | Cl L Acc. |
| 11 | Correct L Remainder. |
| 13 | Make L Acc Pos. |
| 16 | Make L Acc and L B Reg Pos. |
| 17 | L Acc to L Mem Buf. |
| 19 | Compl L Acc. |
| 20 | Make R Acc and R B Reg Pos. |
| 21A | Cl L A Reg. |
| 22 | Make L A Reg Pos. |
| 23A | L A Reg to L Mem Buf. |
| 26 | Compl L A Reg. |
| 31 | Cl Mem Adr Reg. |
| 32 | Start Core Mem. |
| 33A | Inhibit Sample. |
| 41A | Cl L Mem Buf. |
| 42 | L Mem Buf to OP Reg and IX Int Reg. |
| 43A | L Mem Buf to L A Reg. |
| 51 | R Mem Buf to R A Reg. |
| 52 | R Mem Buf to Adr Reg. |
| 53A | Cl R Mem Buf. |
| 60 | L Acc Cond Shift L. |
| 61A | Make L A Reg and L Acc Signs Unlike. |
| 62 | L Carry One. |
| 63 | L End Carry. |
| 64 | L Carry Zero. |
| 67A | Compl L Divide Connect FF. |
| 69A | R Carry One. |
| 71 | ADR Reg to Mem Adr Reg. |
| 73 | Subtract One From Step Ctr. |
| 74 | Set SC to 15. |
| 75A | Set SC to 17. |
| 76 | ADR Reg to R A Reg. |
| 77 | Cl Adr Reg and Step CTR. |
| 78 | ADR Reg to IX Reg #2. |
| 79 | ADR Reg to IX Reg #1. |
| 80 | L Partial Quotient. |
| 82 | L B Reg (1–15) to (S–14). |
| 83A | L Partial Product. |
| 84 | Cl L B Reg. |
| 91A | PR CTR to Mem Adr Reg. |
| 92 | Add One to PR CTR. |
| 93 | PR CTR to R A Reg. |
| 94 | Cl PR CTR. |
| 101 | Cl OP Reg. |
| 103 | IX Int Compl to Adr Reg. |
| 113 | Cl IX Reg #1. |
| 114 | IX Reg #1 to Adr Reg. |
| 115 | IX Reg #2 to Adr Reg. |
| 116 | Cl IX Reg #2. |
| 121A | R Acc to R Mem Buf. |
| 131A | Set PT-OT FLIP-FLOP to OT. |
| 132A | Set A-B FLIP-FLOP to B. |
| 134 | Set Pause FF to 1. |
| 138 | Set 2 MC FF. |
| 140 | Sense for Branch. |
| 153 | CL 1X Int Reg. |
| 154 | Add Reg to PR Ctr. |
| 161 | Cl PT-OT FF to PT. |
| 163A | Cl Branch FF. |
| 164 | Test IX #1 Reg S Bit for Zero. |
| 166 | Test R ACC S Bit for one. |
| 167A | Cl A-B FF to A. |
| 170 | Set Branch FF. |
| 174 | Test IX #2 Reg S Bit for Zero. |
| 187 | RB Reg to RA Reg. |
| 201A | R ACC to R B Reg. |
| 202 | R Division Shift Left. |
| 208 | Cl R Sign Ctrl. |
| 209A | R Correct Sign. |
| 210A | Cl R Acc. |
| 211A | Correct R Remainder. |
| 212A | R ACC to ADR Reg. |
| 213A | Make R ACC Pos. |
| 226A | Compl R A Reg. |
| 228A | R A Reg to R Mem Buf. |
| 229A | Make R A Reg Pos. |
| 230A | Cl R A Reg. |
| 260A | R Acc Cond Shift L. |
| 261A | Make R A Reg and R ACC Signs Unlike. |
| 263A | R End Carry. |
| 264A | R Carry Zero. |
| 267 | Compl R Divide Connect FF. |
| 280A | R Partial Quotient. |
| 282 | R B Reg (1–15) to (S–14). |
| 283 | R Partial Product. |
| 284 | Cl R B Reg. |
| 285 | R B Reg (S–14) to (1–15). |
| 400 | L Combined Shift Left. |
| 401A | R Combined Shift Left. |

Certain of the above indicated commands do not appear in Figures 2 through 6 since those commands are internal in the Instruction Control Element 189. Those internal commands will become more apparent and will be more fully described subsequently with respect to the Instruction Control Element.

As previously stated, the memory element includes 4,096 registers and each register has 32 bits. When the contents of a selected memory register are transferred by way of the conductors of cables 25 and 27 to the Left Memory Buffer Circuit and the Right Memory Buffer Circuit, respectively, they may either be instruction words or operands. An instruction word as previously stated has a left half word and a right half word.

Referring now to Fig. 8 wherein the bit assignments of an instruction word are illustrated, the left half word which is stored by the Left Memory Buffer Circuit includes a sign bit and bits 1 through 15. Bits 1 through 3 of the left half word are called index indicator bits and the purpose of these bits is to select which one of the registers, Index Register 1, Index Register 2 or the Right Accumulator is to be used during this particular instruction. Bits 4 through 10 are called the operation bits and those bits indicate the particular operation to be performed. Examples of operations which may be performed are Add, Subtract, Multiply, Divide and so forth. Bits 10 through 15 of the left half word serve to indicate the index interval whose function will be described in detail hereinafter. The instruction which specifies an index interval does not use bit 10 to specify the operation.

The right half word also contains bit S and bits 1 through 15, bits 1 through 3 of which may be used to select one of several memory elements. In the drawing of Figs. 2 through 6 only one Memory Element 21B is illustrated. It will be understood however that if desired, many memory elements may be used in which case bits 1 through 3 of the right half word of the instruction will indicate which of those memory elements is being used for the particular instruction. Bits 4 through 15 of the right half word are used to specify which register of the 4,096 registers in the Memory Element 21B contains the operand upon which the operation part of the instruction word is to be performed.

As previously stated with respect to Fig. 8, bits 1 through 3 of the left half word and bits 4 through 10 of the left half word are the index indicator bits and the operation bits respectively and as will be seen in the Figs. 2 through 6 these bits of the left half word are transferred by way of the conductors of cable 117 to the Operation Register 145. The Operation Register 145 produces on the conductors of cable 149 signals representative of the bits stored therein, that is, the Operation Register may be any conventional register, preferably having 10 bits or stages and each bit or stage has two output conductors, one of which is positive if that particular bit or stage has stored therein a binary one and the other conductor is positive if the particular bit or stage has a binary zero stored therein.

DETAILED DESCRIPTION

Figure 12:
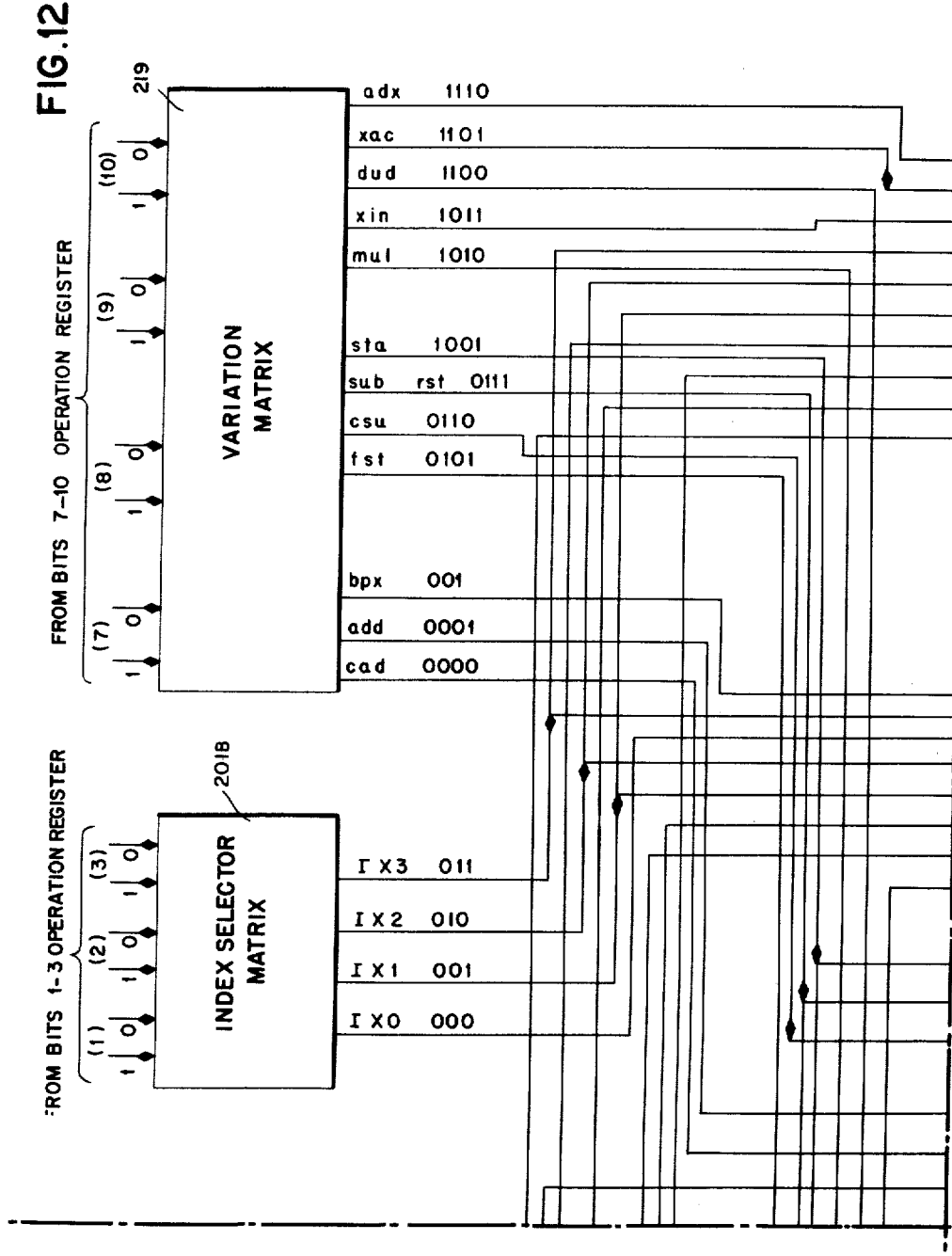

The various conductors of cable 149 in Figs. 2 through 6 which are applied as inputs to the *Instruction Control Element* are individually shown in Figs. 11 and 12 and are labeled indicating the bit with which the particular conductor is associated. The one and zero output conductors of each of the bits 1 through 3 of the Operation Register are applied as inputs to an *Index Selector Matrix 201B* (Fig. 12) whose construction is well known in the art and is a device, usually in the form of a diode matrix, which is capable of producing a positive D.C. level on a selected one of its output conductors in response to a particular combination of D.C. levels on its input conductors. The Index Selector Matrix, may, for example, be of the type shown and described in an article entitled "Rectifier Networks for Multi-Precision Switching," published in the Proceedings of the I.R.E. in February 1949 on pages 139 through 147. If the index indicator bits 1 through 3 of the left half word of the instruction word are binary 000, the output conductor of the Index Selector Matrix 201B labeled IX0–000 will be positive. Other combinations of the index indicator bits will cause the other output conductors of the Index Selector Matrix 201B to be positive and those other output conductors are labeled in Fig. 12 according to the bit combination which causes them to be positive. The output conductors of the Index Selector Matrix 201B are connected to the Branch Class Instruction Matrix 203 (Fig. 15) and the Reset Class Instruction Matrix 205 (Fig. 15) as shown in Figures 10 through 15.

Bits 4, 5 and 6 of the Operation Register have their one and zero output conductors connected as inputs to a *Class Cycle Matrix 207* (Fig. 11) which has additional input conductors labeled PT, OT, OTA and OTB which conductors are the output conductors of a Cycle Control Circuit 209B.

Referring now to Fig. 16a, the Cycle Control Circuit 209B which is shown in Fig. 11 as block 209B includes the PT–OT flip-flop 210B, A–B flip-flop 212B and the Branch flip-flop 214. The input conductors which cause each of these flip-flops to be set in either their One state or their Zero state are labeled with the Command name and will be described in greater detail hereinafter. The output conductors from the flip-flops 210B, 212B and 214 are labeled in Fig. 16a to correspond to the labeling on those conductors which is shown in Fig. 11.

The Class Cycle Matrix 207 may also be of the construction shown in the above referred to I.R.E. article. The output conductors of the Class Cycle Matrix 207 are connected to the Command Generator 211B (Figs. 14 and 15), the Store Class Instruction Matrix 213B (Fig. 14), the Multiply Class Instruction Matrix 215 (Fig. 14), the Add Class Instruction Matrix 217 (Fig. 15), the Branch Class Instruction Matrix 203 (Fig. 15) and the Reset Class Instruction Matrix 205 (Fig. 15) in the manner shown in the drawing.

Bits 7 through 10 of the Operation Register have their One and Zero output conductors connected as inputs to a *Variation Matrix 219* (Fig. 12) which may also be of the construction shown in the above-referred to I.R.E. article. The output conductors of the Variation Matrix 219 are connected to the Reset Class Instruction Matrix 205, the Branch Class Instruction Matrix 203, the Add Class Instruction Matrix 217, the Multiply Class Instruction Matrix 215 and the Store Class Instruction Matrix 213B in the manner shown in Figures 10 through 15.

In the preferred embodiment illustrated and described herein, the various instructions which may be performed have been divided into first the class of instruction and then as a variation within that class. For example, the instructions which will be herein described are as follows:

TABLE 2

*Operation codes for the computer*

| Class | Binary code | Variation | Binary code | Abbrev. |
|---|---|---|---|---|
| Add | 001 | Clear and add | 0000 | CAD |
| | | Add | 0001 | ADD |
| | | Clear and subtract | 0110 | CSU |
| | | Subtract | 0111 | SUB |
| Multiply | 010 | Multiply | 1010 | MUL |
| | | Divide | 1100 | DVD |
| Store | 011 | Store | 0101 | FST |
| | | Right store | 0111 | RST |
| | | Store address | 1000 | STA |
| Branch | 101 | Branch and Index | 001– | BPX |
| | | Branch on right minus | 1011 | BRM |
| Reset | 111 | Reset index register | 1011 | XIN |
| | | Reset index register from right accumulator | 1101 | XAC |
| | | Add index register | 1110 | ADX |

It will be understood that the instructions which may be performed by any electronic data processing machine constructed in accordance with the principles of this invention may be any desired number and type but in the interest of simplicity, only those above indicated instructions will be described. The Store Class Instruction Matrix 213B, the Multiply Class Instruction Matrix 215, the Add Class Instruction Matrix 217, the Branch Class Instruction Matrix 203 and the Reset Class Instruction Matrix 205 may each also be of the same general construction as that shown in the above-referred-to I.R.E. article. The output conductors of the various instruction matrices, and as previously noted, certain of the output conductors of the Class Cycle Matrix 207, are connected as inputs to the Command Generator 211B. The Command Generator 211B is a device which is capable, in response to a D.C. level on one or more of its input conductors, of producing pulse outputs in a predetermined timing relationship from the pulses on the various conductors of cable 221. The pulses on the conductors of cable 221 are produced from a *Time Pulse Distributor 223* (Fig. 10).

The Time Pulse Distributor 223 is a device which is capable of receiving serially related pulses from its input conductors labeled IP Driver and TP Driver and from these serially related pulses sequentially pulsing its output conductors labeled IP–1 through IP–11 as well as successively pulsing its output conductors labeled TP–0 through TP–11.

Referring now to Fig. 16b, the Time Pulse Distributor 223 includes flip-flops 224, 226B, 228B, 230B, 232, 234, 236 and 238. The Time Pulse Distributor actually includes 15 flip-flops; however, in the interest of simplicity, only 8 are shown in the drawing. Stages 2 through 5 are identical to the stage associated with flip-flop 226B, stage 7 is identical to the stage associated with flip-flop 230B and stages 9 and 10 are identical to the stage associated with flip-flop 234. The Zero stage of the Time Pulse Distributor could be said to include the flip-flop 224, Or circuit 240, And circuit 242 and gate circuit 244. The first stage of the Time Pulse Distributor could be said to include the flip-flop 226B Or circuit 246, gate circuit 248 and the gate circuit 250. The sixth stage of the Time Pulse Distributor includes flip-flop 228B, Or circuit 252 and gate circuit 254. The 6A stage of the Time Pulse Distributor includes flip-flop 230B, Or circuit 256, gate circuit 258 and gate circuit 260B. The eighth stage of the Time Pulse Distributor includes flip-flops 232, Or circuit 262 and gate circuit 264B. The 8A stage of the Time Pulse Distributor includes the flip-flop 234, Or circuit 266, gate circuit 268 and gate circuit 270. The eleventh stage of the Time Pulse Distributor includes flip-flop 236, Or circuit 272 and gate circuit 274. The 11A stage of the Time Pulse Distributor includes flip-flop 238, Or circuit 276, gate circuit 278 and gate circuit 280B.

A pulse on the conductor labeled Clear in Fig. 16b will cause flip-flop 224 to be set on the One side while causing the remaining flip-flops of the Time Pulse Distributor to be set on the Zero side. Assuming that the Time Pulse Distributor has been cleared and a positive potential exists on the conductor labeled No Pause, And circuit 242 will supply a positive D.C. level to gate circuit 244. The next received pulse on the conductors labeled IP Driver and TP Driver will be passed by gate circuit 244 and this pulse is applied to the conductor labeled TP-0. This pulse causes flip-flop 224 to be set on the Zero side and flip-flop 226B to be set on the One side thus conditioning gate 248 to pass the next pulse received from the conductor labeled TP Driver and gate circuit 250 to pass the next received pulse from the conductor labeled IP Driver. The pulse passed by gate 248 is applied to the conductor labeled TP-1 and is also applied through Or circuit 246 to cause flip-flop 226B to be set on the Zero side. The pulse passed by gate 248 is also applied to set the flip-flop of stage 2 (not shown) to the One side. The pulse passed by gate 250 is applied to the conductor labeled IP-1. In this manner the TP-0 conductor is pulsed by the first received pulse, TP-1 and IP-1 conductors are pulsed by the second received pulse and so on, so that the sixth received pulse causes the flip-flop 228B to be set on the One side thereby conditioning gate 254 to pass the seventh received pulse. The output of gate 254 which passes the seventh received pulse causes flip-flop 230B to be set on the One side and this seventh pulse is applied through Or circuit 252 to cause flip-flop 228B to be set on the Zero side. It will be noted that there is no TP or IP output conductor for the sixth stage and therefore the sixth received pulse produces no output but merely forms a delay in order that the output conductors associated with the 6A stage will be pulsed in response to the eighth received pulse. The remainder of the Time Pulse Distributor will be understood from the above description; however it should be noted that the eighth stage of the Time Pulse Distributor and the eleventh stage are like the sixth stage and likewise produce no output pulses but merely form a delay, and it should be further noted that the fifteenth received pulse which is passed by gate 278 causes flip-flop 238 to be set on the Zero side and also causes flip-flop 224 to be set on the One side in order to permit the Time Pulse Distributor to perform another cycle of operation in response to the subsequent pulses on the TP and IP Driver conductors. In a preferred embodiment of this invention, the pulses applied to the TP and IP Driver conductors are 1/10 μ sec. in duration at a 2 mc. rate, that is, the pulses are ½ microsecond apart and in the preferred embodiment the Time Pulse Distributor cycle is therefore 7½ microseconds. It will be understood however that in the event that the Memory Element 21B of Fig. 2 is so constructed as to operate at a faster or slower rate, the Time Pulse Distributor will be modified accordingly. For the remaining discussions the IP and TP pulses will be assumed to occur at an even rate, that is, the time between IP-5 and IP-6A, IP-7 and IP-8A, and IP-10 and IP-11A will be assumed to be the same time as the time spacing between all other pulses.

Referring now to Fig. 10, under normal operating conditions the conductor labeled Clear TP-D from the apparatus labeled Master Control is pulsed and this causes the Time Pulse Distributor 223 to be set to a TP-0 condition. Subsequent to a pulse on the line Clear TP-D, the Master Control Circuit 225 delivers a pulse on its output conductor labeled Start TP and IP Driver and this pulse when received by the Set TP-D control sync. flip-flop 227 causes that flip-flop to produce a positive D.C. level on its One output thereby conditioning gate circuit 229B. The pulse input to gate circuit 229B is from a continuously running Oscillator 231 and therefore the first pulse received by gate circuit 229B subsequent to the positive D.C. level at its input is applied to the TP-D control flip-flop 233 to cause that flip-flop to produce a positive D.C. level on its One output. This positive D.C. level output of the TP-D control flip-flop conditions gate circuit 235 to pass the next received pulse from the Oscillator 231. The first pulse passed by gate circuit 235 causes the Set TP-D control sync. flip-flop 227 to be cleared and this first pulse passed by gate circuit 235 as well as the remaining pulses which are passed are applied as IP Driver pulses and TP Driver pulses to the Time Pulse Distributor 223. The first received pulse causes the Time Pulse Distributor 223 to produce a pulse on its output conductor labeled TP-0. The second received pulse causes the Time Pulse Distributor 223 to produce a pulse on its output conductor labeled IP-1 and a pulse on its output conductor labeled TP-1. The third received pulse produces an output pulse on conductors IP-2 and TP-2 and so on until the fifteenth received pulse causes a pulse to be produced on the conductors labeled IP-11 and TP-11 and further this fifteenth received pulse causes the Time Pulse Distributor to be reset so that the next received pulse will cause another pulse on the output conductor labeled TP-0 and so on through the remaining cycles. The Time Pulse Distributor is also capable of being stopped at the beginning of its cycle, that is, at TP-0, when a positive D.C. level is not received on its input conductor labeled No Pause. Briefly summarizing the above, as long as a positive D.C. level is received on the conductor labeled No Pause, the Time Pulse Distributor 223 will cyclically pulse its IP and TP output conductors provided that the Time Pulse Distributor Control flip-flop 233 is on.

As will be described in greater detail hereinafter with respect to the Multiply instruction, the Command Generator 211B generates a command Set Step Counter To 15 (74) followed by a command Set 2 mc. Flip-Flop (138) followed by a command Set Pause Flip-Flop (134).

Upon receipt of a pulse on its input conductor labeled Set Step Counter to 15, the *Step Counter* 237 (Fig. 13) stores in binary form the number 15, the Step Counter having previously been cleared by a pulse on its input conductor labeled Clear.

Referring now to Fig. 17, the Step Counter 237 has flip-flops 401B, 403, 405, 407, 409 and 411 which, together with their associated circuits, comprise a 6 stage counter. The least significant bit stage of the counter includes the flip-flop 401B, Or circuit 413, Or circuit 415, power cathode follower 417 and gate circuit 419. A pulse received on the conductor labeled Clear Step Counter Flip-Flops is applied through Or circuit 415 to clear flip-flop 401B, is applied through Or circuit 421 to clear flip-flop 403, is applied through Or circuit 423 to clear flip-flop 405, is applied through Or circuit 425 to clear flip-flop 407, is applied through Or circuit 427 to clear flip-flop 409 and is applied through Or circuit 429 to clear flip-flop 411. A pulse received on the conductor labeled Set Step Counter Equal To 15 is applied through Or circuit 413 to set flip-flop 401B to its One state, is applied through Or circuit 431 to set flip-flop 403 to its One state, is applied through Or circuit 433 to set flip-flop 405 to its One state, is applied through Or circuit 435 to set flip-flop 407 to its One state, is applied through Or circuit 427 to clear flip-flop 409 and is applied through Or circuit 429 to clear flip-flop 411. The binary states of the flip-flops of the Step Counter therefore are set to 001111 which is the binary number for the decimal 15.

A pulse received from the conductor Set Step Counter Equal To 17 is applied through Or circuit 413 to set flip-flop 401 to its One state, is applied through Or circuit 421 to clear flip-flop 403, is applied through Or circuit 423 to clear flip-flop 405, is applied through Or circuit 425 to clear flip-flop 407, is applied through Or circuit 437 to set flip-flop 409 in its One state and is applied through Or circuit 429 to clear flip-flop 411. In response to a pulse on the conductor Clear Step Counter Flip-Flops followed by a pulse on the conductor labeled Set Step Counter Equal To 17, the flip-flops of the Step Counter store the binary number 010001 which is the binary number which is equal to the decimal number 17. Assuming that the Step Counter has been set to 17, the first received pulse on the conductor labeled Substract One From Step Counter although applied to the gate circuit 419 is not passed by that gate circuit since flip-flop 401B under the assumed condition is in its binary One state. This pulse is also applied to Or circuit 413 and Or circuit 415 and therefore this pulse will cause flip-flop 401B to be set in its Zero state. This in effect results in the number stored in the Step Counter to be reduced from decimal 17 to decimal number 16. A second received pulse on the conductor Subtract One From Step Counter is applied to gate circuit 419 and since flip-flop 401B is in its Zero state, this pulse is passed by gate circuit 419 and is applied to Or circuit 431 and Or circuit 421 to cause flip-flop 403 to be set to the One state. This same pulse being also applied to Or circuit 413 and 415 causes flip-flop 401B to be set to the One state. This same pulse being applied to gate circuit 439 is passed by gate circuit 439 since flip-flop 403 was in its Zero state when the pulse was received. The pulse passed by gate circuit 439 will also be passed by gate circuit 441 and gate circuit 443 resulting in flip-flop 405 being set to the One state, flip-flop 407 being set to the One state, flip-flop 409 being set to the Zero state. This causes the number stored in the Step Counter to be reduced to 15. From the above description it will be evident how the Step Counter contents are reduced by one each time a pulse is received on the conductor labeled Substract One From the Step Counter. It should be noted that the Zero outputs of flip-flop 411, flip-flop 409, flip-flop 407, flip-flop 405 and flip-flop 403 are connected to And circuit 445. Thus when stages 2 through 6 of the Step Counter are zero, a positive D.C. level from And circuit 445 is applied through cathode follower 447 to gate circuit 449 thus permitting the next received pulse from the conductor labeled 2 mc. Pulse to produce a pulse on the output conductor labeled Step Counter is Zero or One.

The Zero side of flip-flops 411, 409 and 407 are applied to And circuit 451 and therefore when the stages 4, 5 and 6 of the Step Counter are Zero, a positive D.C. level from And circuit 451 is applied through cathode follower 453 to gate circuit 455. If the Step Counter had been set to either 15 or 17 and was counting down, when the count stored therein was equal to decimal 7, gate circuit 455 would be conditioned. The next received pulse which will reduce the count stored in the Step Counter to 6 will not be passed by gate circuit 419 since when that pulse is received, flip-flop 401B is in the One state. The next received pulse which will reduce the count stored in the Step Counter to 5 will be passed by gate circuit 419 and through Pulse Amplifier 457 this pulse will be applied to gate circuit 455 to produce a pulse on the output conductor labeled Step Counter 6 Going To 5 and in the event that the conductor labeled *mul* is positive, this pulse will be passed by gate circuit 459 to the conductor labeled Step Counter 6 Going To 5. Flip-flops 405, 407, 409 and 411 have their Zero sides connected to And circuit 461. If the Step Counter had been set to either 15 or 17 and was counting down, when the number stored therein was equal to 3, And circuit 461 will produce a positive D.C. level output which is applied through cathode follower 463 to gate circuit 465. The next pulse received on the Subtract One From Step Counter conductor will reduce the contents stored therein to 2 and the next pulse received from the conductor labeled Substract One From Step Counter will reduce the contents of the Step Counter to 1 and this same pulse will be passed by gate circuit 419 through Pulse Amplifier 457 to the input of gate circuit 465 and since gate circuit 465 is conditioned, it will pass this pulse to the conductor labeled Step Counter Two Going To One.

Referring back now to Figs. 10 and 13, the pulse received on conductor labeled Set 2 mc. Flip-Flop (Fig. 10) is applied to the Set 2 mc. Operate Sync. flip-flop 239 to cause that flip-flop to produce a positive D.C. level on its One output. This positive D.C. level conditions gate circuit 241 to pass the first received pulse from the output of gate 235. The first pulse which is passed by gate 241 causes the 2 mc. Operate Flip-Flop 243 to produce a positive D.C. level on its One output which conditions gate circuit 245. The first received pulse which is passed by gate 245 is applied through Or circuit 247A to clear the Set 2 mc. Operate Sync. flip-flop 239. Each pulse which is passed by gate 245 is applied to the input of gate 247B which is conditioned during a Multiply instruction and therefore each of those pulses is applied to the Step Counter 237 through Or circuit 249 and the Step Counter is so constructed as to substract one from the binary signals stored therein for each of the pulse inputs. Each of the pulses passed by gate 245 is also applied to gate circuit 251 which is also conditioned during a Multiply instruction to produce output pulses on its output conductors labeled Left Partial Product and Right Partial Product which are commands 83A and 283 respectively.

Following the command pulse Set 2 mc. Flip-Flop, the command pulse Set Pause Flip-Flop (134) is applied to the pause flip-flop 252 to cause that flip-flop to produce a negative D.C. level on its output conductor labeled No Pause. The negative D.C. level on the conductor labeled No Pause permits the Time Pulse Distributor 223 to continue its present cycle and to produce pulses on its output conductors labeled IP–11 and TP–11 but prevents any further pulses being produced until a positive D.C. level is established on the conductor labeled No Pause and then the Time Pulse Distributor 223 starts another cycle by first producing an output pulse on its conductor labeled TP–0. When the contents of the Step Counter 237 are 6 and the number stored therein is to be reduced to 5 by the next received pulse on the conductor labeled Subtract One From Step Counter, this next received pulse is applied to the conductor labeled Step Counter Equals 6 Going To 5. This pulse is applied to the Clear Pause Sync. Flip-Flop 253 which causes that flip-flop to produce a positive D.C. level on its One output to condition gate circuit 255. The first pulse passed by the gate circuit 255 is applied to the Pause flip-flop 252 to cause that flip-flop to produce a positive D.C. level on the conductor labeled No Pause which in turn is connected to the Time Pulse Distributor 223. The Pause flip-flop 252 having been turned on by command 134 and then turned off again by the Step Counter going from 6 to 5, results in an interruption in the output of the Time Pulse Distributor during the Multiply instruction for a period of time sufficient for 10 pulses to be produced on the command conductors labeled Left Partial Product and Right Partial Product. When a sufficient number of pulses has been received on the Subtract One From Step Counter conductor input to the Step Counter 237 to cause the contents of the Step Counter to be reduced to 2, the next following pulse on the Subtract One From Step Counter conductor will cause the Step Counter to be reduced to 1, and this pulse is applied by way of the conductor labeled Step Counter Equals 2 Going To 1 and through Or circuit 257 to the Clear input of the 2 mc. Operate Flip-Flop 243 thereby causing that flip-flop to produce a negative D.C. level on its output conductor and preventing the gate circuit 245 from producing any more output pulses. As a result of the above operation 15 pulses were applied to each of the output conductors labeled Left Partial Product and Right Partial Product.

As will be described in greater detail hereinafter with respect to the Divide instruction, the Command Generator 211B generates the command Set Step Counter to 17 (75A) followed by the command Set 2 mc. Flip-Flop (138), followed by the command Set Pause Flip-Flop (134).

Upon receipt of a pulse on its input conductor labeled Set Step Counter To 17, the Step Counter 237 stores in binary form the number 17, the Step Counter having been previously cleared by a pulse on its input conductor labeled Clear. The pulse received on the conductor labeled Set 2 mc. Flip-Flop (Fig. 10) is applied to the Set 2 mc. Sync. Flip-Flop 239 thereby causing the 2 mc. Operate Flip-Flop 243 to produce a positive D.C. level on its One output in the manner previously described. When the 2 mc. Operate Flip-Flop 243 produces a positive D.C. level, pulses are produced on the output of gate 245 which are applied to gate circuit 259 which is conditioned during a Divide instruction and produces pulses on its output conductor labeled Partial Quotient which are applied to a Divide Time Pulse Distributor 261B.

Referring now to Fig. 18, the *Divide Time Pulse Distributor* 261B, includes flip-flops 467, 469, 471, 473 and 475. A pulse on the conductor labeled Clear is applied through Or circuit 477 to cause flip-flop 467 to be set in the One state and is applied through the Or circuits 479, 481, 483 and 485 to cause the flip-flops 469, 471, 473 and 475, respectively, to be cleared. The first pulse applied to the Partial Quotient line is passed by gate circuit 487 which (1) clears flip-flop 467, (2) sets flip-flop 469 in its One state and (3) produces pulses on each of the output conductors labeled with the commands Make Left A Register and Left A Accumulator Signs Unlike, Make Right A Register and Right A Accumulator Signs Unlike, Left Combined Shift Left and Right Combined Shift Left. The next received pulse is passed by gate circuit 489 to (1) clear flip-flop 469, (2) set flip-flop 471 in its One state and (3) produce pulses on the conductors labeled with the command names Left Partial Quotient and Right Partial Quotient. The next received pulse on the conductor labeled Partial Quotient is passed by gate circuit 491 which clear flip-flop 471 and set flip-flop 473 in its One state. However, no command pulses are generated in response to this pulse on the Partial Quotient line. The next received pulse on the Partial Quotient line is passed by gate circuit 493 to (1) clear flip-flop 473, (2) set flip-flop 475 to its One state and (3) produce a pulse on the conductor labeled Subtract One From Step Counter. The next received pulse on the Partial Quotient line is passed by gate circuit 495 which (1) clears flip-flop 475, (2) sets flip-flop 467 in its One state and (3) produces a pulse on each of the conductors labeled with the command names Left Division Shift Left, and Right Division Shift Left.

The Divide Time Pulse Distributor therefore cyclically and sequentially pulses its output conductors in the manner just described. However, during each cycle of the Divide Time Pulse Distributor a pulse is produced on its output conductor labeled Subtract One From Step Counter and this pulse when applied to the Step Counter in Fig. 13 causes that Step Counter to count down in the manner previously described so that when the Step Counter is reduced to Two Going to One a pulse is applied through Or circuit 257 (Fig. 10) to clear the 2 mc. Operate Flip-Flop 243 and thereby prevent further pulses from being applied to gate 259.

It should be noted in Figs. 10 and 13 that each IP–6 pulse from the Time Pulse Distributor 233 is applied to gate circuit 263B which is conditioned by a positive D.C. level from the Cycle Control Circuit 209B (Fig. 11) during PT time of each instruction cycle. Gate circuit 263B supplies its output pulses to the conductor labeled Clear which is applied to the Divide Time Pulse Distributor 261B.

Any particular instruction which is indicated by bits 4 through 10 of the Operation Register requires the generation of certain command pulses at certain times. Figures 19a through 19h and 19j through 19o are timing charts which indicate, with respect to each of the instructions described, the timing at which the various commands associated with that instruction occur.

Several commands are common to all of the classes of instructions noted in Table 2 above. These commands are:

31—Clear Memory Address Register
32—Start Core Memory
41A—Clear Left Memory Buffer
42—Left Memory Buffer to Operation Register
52—Right Memory Buffer to Address Register
53A—Clear Right Memory Buffer
77—Clear Address Register and Step Counter
91A—Program Counter to Memory Address Register
92—Add One to Program Counter
101—Clear Operation Register Whenever an instruction is being executed, the D.C. levels at the command generators are always up for commands 42, 52, 77, 91A, 92 and 101 during program time. This is accomplished by using the PT line directly from the Cycle Control Circuit 209B (Fig. 11) to raise the D.C. levels used by the command generators forming these commands. Similarly, command 71 is constantly generated during the operate time of an instruction by utilizing the OT line from the Cycle Control Circuit 209B (Fig. 11). However, certain instructions do not require an operate time cycle. In these cases, the OT line from the Cycle Control is not energized and command 71 is never generated during these instructions.

Commands 31, 41A and 53A do not use command generators. These commands consist of pulses which are supplied directly by the Time Pulse Distributor 223 (Fig. 10). Command 31 is generated by TP–0 and commands 41A and 53A by TP–1.

The common commands, discussed in the preceindg paragraphs, always occur at the indicated times for all instructions. For the remaining discussions it is assumed that the reader will interpose these common commands where necessary.

The Cycle Control Circuit 209B (Fig. 11) contains the PT–OT flip-flop which determines the mode of operation (PT or OT) in which the computer is operating. Two commands, 131A and 161, control the condition of this flip-flop. These commands are necessary only if a particular instruction requires an OT cycle. When required, these commands occur during the final instruction pulse of PT and OT respectively (IP–11). For those instructions not requiring an OT cycle, the flip-flop will always be in PT status. This condition is set by the last previous instruction containing an OT cycle since command 161 is the final instruction in every OT cycle. The command generator for command 131A is conditioned by an Or circuit through which pass signals from all the instructions requiring an OT cycle. The command generator for command 161 is conditioned directly by the OT line for the particular class in which the instruction being performed is located.

*Add Class Instructions*

The Add Class as described herein includes four variations. Each of the instructions in this class is indexable. For instructions in the Add Class, normal entrance to the Left and Right Accumulators of the Arithmetic Frames from the Left and Right A Register respectively is through the Left and Right Adders respectively. In each of the four instructions herein described, the left half word from Memory is transferred to the Left Accumulator Register and the right half word from Memory to the Right Accumulator Register. The process of subtraction involves addition of complements; consequently in any Add Class instruction the contents of the A Register are added to the Accumulator Register and the sums are placed in the Accumulator Register. Besides the common commands described above, every instruction in the Add Class has in common the following commands.

Program time (condition by the Add–PT line from the Cycle Control Circuit 209B (Fig. 11):

21A, 230A—Clear A Registers
2, 202—Division Shift Left
60, 260A—Accumulator Conditional Shift Left
63, 263A—End Carry Operate time (conditioned by the ADD–OT line from the cycle control):

21A, 230A—Clear A Registers
43A, 51—Memory Buffers to A Registers
64, 264A—Carry Zero The commands listed above and the common commands appear in the timing charts of Figures 19a through 19d and it is assumed that the reader will interpose them when necessary in the ensuing discussion of the Add Class instructions. Since the class is indexable, PT–9 is reserved for the indexing command 114, 115 or 212A. Since every instruction in the class requires two cycles, command 131A (Set PT–OT Filp-Flop to OT) always occurs at PT–11, and command 161 (Clear the PT–OT Filp-Flop to PT) always occurs at OT–11. The Clear type of Add Class instructions are the Clear and Add (CAD), and Clear and Subtract (CSU). In these instructions the Accumulator Register is cleared at OT–6 (10, 210A); the operand is extracted from Memory and placed in the A Register at OT–7 (43A, 51). The following detailed discussion of the Clear and Add instructions is considered to be sufficient in detail that the other instructions in this class will be readily understood without any further discussion.

From the preceding Table 2, it will be noted that the Clear and Add instruction contains class bits 001 and variation bits 0000. When the class bits are received as inputs to the Class Cycle Matrix 207 in Figure 11, they are decoded and cause the output conductor labeled Add–PT to be positive when the Cycle Control Circuit 209B causes the PT conductor to be positive and those class bits cause the output conductor Add–OT to be positive when the Glass Cycle Control Circuit 209B causes the OT conductor to be positive. When the bits 4 through 6 are first received for any instruction by the Class Cycle Matrix 207 in Figure 11, the PT conductor is positive and the OT conductor is negative. The Clear and Add instruction includes in its variation bits 7 through 10 the binary number 0000 which are applied as inputs to the Variation Matrix 219 (Fig. 12) and this will cause the output conductor labeled cad–0000 to be made positive. The Variation Matrix output *cad* is applied to the Add Class Instruction Matrix 217 (Fig. 15). The Add–OT output from the Class Cycle Matrix 207 is also applied as an input to the Add Class Instruction Matrix 217. When the Clear and Add instruction is first decoded by the Class Cycle Matrix 207 and the Variation Matrix 219, the Add–PT output of the Class Cycle Matrix 207 is positive and since it is applied to the Command Generator 211B (Figs. 14 and 15), it will cause a sequence of command pulses to be generated. As will be noted in the timing chart of Figure 19a, the Clear and Add instruction requires that at 7 time of $PT_1$, commands 42, 52 and 92 be generated. However it will also be noted that these pulses are generated at the 7 time of $PT_1$ for each instruction regardless of the instruction being performed and therefore the first commands which are generated in response to the Clear and Add instruction having been decoded occur at PT–9 time. At PT–9 time the commands 114 or 115 or 212A or no command will be generated dependent upon the output of the Index Selector Matrix 201B in Figure 12. If the Index Register 1 is specified by the Clear and Add instruction by having bits 1 to 3 of the Operation Register contain the binary number 001, then the Reset Class Instruction Matrix 205 will cause a positive D.C. level to be established on its output conductor labeled (Add–PT, Store–PT, Multiply–PT) and IX–1. A positive D.C. level on that identified conductor will cause the Command Generator 211B to generate the command 114 at PT–9 time. It will be understood that if bits 1 through 3 of the Operation Register had indicated the selection of Index Register 2 by specifying the binary number 010, then the Command Generator would have generated the command 115 at PT–9 time and if the Right Accumulator had been selected, then command 212A would have been generated at PT–9 time. Under the assumed condition that Index Register 1 was specified by the instruction, the Add–PT output of the Class Cycle Matrix 207 is positive which will cause the Command Generator 211B to generate the command pulse 131A at PT–11 time. This command 131A generated by the Command Generator is applied as an input pulse to the Cycle Control Circuit 209B of Figure 11 to cause the Cycle Control Circuit to produce a positive D.C. level on its OT output conductor and a negative D.C. level on its PT output conductor. The positive D.C. level on the OT conductor when applied to the Class Cycle Matrix 207 will cause the output conductor Add–OT to be made positive. This output conductor Add–OT is applied directly to the Command Generator 211B and is also applied as an input to the Add Class Instruction Matrix 217. Since the Add–OT line and the Variation Matrix output *cad*–0000 is also positive, the Add Class Instruction Matrix 217 produces a positive D.C. level on its output conductor labeled *cad*–OT and this positive D.C. level in combination with the positive D.C. level on the Add–OT line causes the Command Generator to produce the command 31 at OT–0 time, causes commands 21A, 230A, 41A, 53A and 71 to be generated at OT–1 time, causes command 32 to be generated at OT–2 time, commands 10 and 210A to be generated at OT–6 time, commands 43A and 51 to be generated at OT–7 time, commands 64 and 264A to be generated at OT–10 time and command 161 to be generated at OT–11 time. Command 161 which is the Command Clear the PT–OT Flip-Flop to PT, is applied as an input to the Cycle Control Circuit 209B of Figure 11 to cause that circuit to produce a positive D.C. level on its output conductor labeled PT and a negative level on its output conductor labeled OT which when applied to the Class Cycle Matrix 207 will again cause the Add–PT output conductor to be made positive. When the Add–PT conductor is positive it will cause the Command Generator 211B to generate the commands listed in the timing chart of Figure 19a at the times indicated as PT–0 through PT–6.

The command 42 which is generated at PT–7 time causes the Left Memory Buffer Circuit contents of Figure 2 to be transferred by way of the conductors of cable 117 to the Operation Register 145 in Figure 3. The command 52 which is also generated at PT$_1$–7 time causes the Right Memory Buffer Circuit contents to be transferred on the conductors of cable 59 to the Address Register 41B in Figure 4 and therefore the Operation Register 145 in the example given above will contain the binary code for the Clear and Add instruction and the Address Register 41B will contain the address in the Memory Element 21B upon which this instruction is to be performed. However, before the contents of the Address Register 41B are effective to select the register in Memory Element 21B, the binary number stored in the Address Register may be modified at PT$_1$–9 time dependent upon whether or not one of the registers, Index Register 1, Index Register 2 or the Right Accumulator 109 has been selected. If one of those registers had been selected by the instruction word, the contents of the Index Register 1, for example, would be transferred by way of the conductors of cable 67B to the Address Register and as previously stated, the binary number represented by the signals on the conductors of cable 67B would be added to the contents of the Address Register 41B. The sum of the original address plus the contents of the Index Register 1 would be transferred by way of the conductors of cable 75B through the Or circuit 43B and the conductors of cable 23B to the Memory Element 21B at OT–1 time by command 71. The Memory Element 21B would produce on its output conductors of cables 25 and 27 at OT–6 time, signals corresponding to the signals stored in the register of the Memory Element 21B whose location was specified by the signals on the conductors of cable 23B. The last noted operation resulted from the fact that at OT–2 time command 32 was generated, this command being known as Start Memory. The detailed results of this command will be more fully described hereinafter.

*Multiply Class Instructions*

The Multiply Class as described herein contains two variations whose timing charts are shown in Figures 19*e* and 19*f*. Besides the common commands previously described, each of those instructions in this class has in common the following commands.

Program time (conditioned by the MULT–PT line from the Cycle Control Circuit 207 (Fig. 11)):

9, 209A—Correct Sign

Operate time (conditioned by the MULT–OT line from the Cycle Control Circuit 207 (Fig. 11)):

8, 208—Clear Sign Control
21A, 230A—Clear A Registers
22, 229A—Make A Registers Positive
134—Pause
138—Set 2 mc. Flip-Flop The commands listed above and the common commands appear in the timing charts of Figures 19*e* and 19*f* and it is assumed that the reader will interpose them when necessary in the following discussion. Since this class is indexable, PT–9 is reserved for the indexing commands (114, 115 or 212A). Since every instruction requires two cycles, command 131A (Set PT–OT Flip-Flop To OT) always occurs at PT–11, the command 161 (Clear PT–OT Flip-Flop To PT) always occurs at OT–11 time. Each instruction requires 2 mc. operation so that command 138 (Set 2 mc. Flip-Flop) is always generated at OT–8 and command 134 (Pause), which sets the Pause flip-flop, is always generated at OT–10.

In the Multiply instruction the multiplicand is extracted from the Memory Buffer Registers at OT–7 (43A, 51) and placed in the A register. Also at OT–7 the Step Counter is set to 15 by command 74 to indicate that 15 multiplication steps must be performed before the instruction is completed. The multiplier is held in the Accumulator Register and is examined for its sign. If the sign flip-flop equals one, the Accumulator and the Sign Control Flip-Flop are complemented at OT–7 time (13, 213A). At OT–8 the contents of the Accumulator are placed in the B Register (1, 201A) and the Accumulator Register is cleared (10, 210A). The multiplicand which was placed in the A Register at OT–7 (43A, 51) is examined for its sign. If the sign equals one, the A Register is complemented at OT–8 (22, 229A). Thus by OT–9, both multiplicand and multiplier are positive and the sign of the product is stored in the Sign Control Flip-Flop. Now 2 megacycle operation is started because at OT–8 the 2 mc. FF was set (138). At OT–11 time, the Time Pulse Distributor is stopped because the Pause FF 252 (Fig. 10) was set to Pause by command 134 at OT–10 and the PT–OT flip-flop is set to PT (161) at OT–11. For each 2 mc. operation, the Step Counter is reduced by one. As soon as the Step Counter equals 5, the Step Counter causes the Pause FF to be set to No Pause and the Time Distributor is restarted. This initiates the PT cycle of the next instruction. The remaining 2 mc. operations required to complete the Multiply instruction utilize part of the next program time. The 2 mc. operation is stopped by the Step Counter being reduced to zero which causes the 2 mc. Operate FF 243 (Fig. 10) to be cleared. This overlapping operation results in time saved since the time interval between PT–0 and PT–5 is utilized. By PT–5 multiplication is completed and the Step Counter controls are cleared (77) at PT–6. The commands at PT–6 (9, 209A) pertain to the correction of the sign. In this operation, the Sign Control Flip-Flop is examined. If the flip-flop indicates one, the Accumulator Register and B register are complemented and the Sign Control Flip-Flop is cleared. The Accumulator and B Register enter into the complementation process because these registers together hold the single 32 bit product.

In the Divide instruction, the dividend is contained in combined Accumulator and B Registers. At OT–7 the dividend is examined for sign (16, 20). If the Accumulator sign bit is One, the Accumulator and the Sign Control Flip-Flop are complemented. At OT–7, the Step Counter is set to 17 by command 75A and the divisor is placed in the A Register (43A, 51). At OT–8 the sign of the divisor is examined (22, 229A). If the A Register Flip-Flop is indicating a One, the A Register and the Sign Control Flip-Flop are complemented. The command Set 2 mc. Flip-Flop occurs at OT–8 (138) resulting in 2 mc. operation being started at OT–9. The basic divide cycle consists of five steps which are controlled by the Divide Time Pulse Distributor 261B (Fig. 13). The Step Counter is reduced by one for each divide cycle. When the Step Counter is reduced to zero, the Time Pulse Distributor 223 (Fig. 10) is restarted and program time of the next instruction is initiated. The commands at PT–2 (11, 211A) and PT–6 (9, 209A) deal with the correction of the remainder and the correction of signs respectively. To correct the remainder, the A Register Sign Flip-Flop is examined. If this flip-flop indicates Zero, the Carry Zero line is pulsed. This is followed at PT–5 by the Shift Left command (60, 260A). Final correction of signs was previously described as part of the Multiply instruction description.

*Store Class Instructions*

The Store Class as described herein contains three variations whose timing charts are shown in Figs. 19*g*, 19*h* and 19*j*; the Right Store (RST) instruction and the Store Address (STA) instruction each require an instruction cycle composed of PT–7 through PT–11 followed by OTA–0 through OTA–11, followed by OTB–0 through OTB–11, followed by PT–1 through PT–6, and the Store (FST) instruction requires only PT–7 through PT–11, followed by OTB–0 through OTB–11, followed by PT$_2$–0 through $PT_2$–6. Besides the common commands described previously, every instruction in the Store Class has in common the following commands.

Store OTA (conditioned by the Store–OTA line from the Cycle Control Circuit 207 (Fig. 11)):

131A—Set PT–OT Flip-Flop To OT

Store OTB (conditioned by the Store–OTB line from the Cycle Control):

161—Clear PT–OT Flip-Flop To PT
167A——Clear A–B Flip-Flop To A

The commands listed above and the common commands appear in the timing charts of Figs. 19g, 19h and 19j and it is assumed that the reader will interpose them when necessary in the ensuing discussion of the Store Class instructions. Since the class is indexable, PT–9 is reserved for the indexing command (114, 115 or 212A). Since Right Store (RST) and Store Address (STA) require three cycles, command 131A (Set PT–OT Flip-Flop To OT) always occurs at PT–11 for these instructions, command 132 (Set A–B Flip-Flop To A) always occurs at OTA–11 for these instructions, and commands 161 (Clear PT–OT Flip-Flop To PT) and 167A (Clear A–B Flip-Flop To A) always occur at OTB–11. The program times for all instructions in the Store Class are similar with two exceptions. In the Store instruction (FST), command 132 is executed at PT–11 (in addition to common command 131A).

In the Right Store (RST) instruction, the contents of the Right Accumulator is stored in the right half of the Memory Register specified by the address part of the instruction. The contents of the Accumulator Registers and the left half of the indicated Memory Address are not changed, but the original contents of the right half of the indicated Memory Register is lost during the operation.

During a Store Address (STA) instruction, the contents of the Right A Register are stored in the right half of the Memory Register specified by the address part of the instruction. The contents of the Accumulator Registers and the left half of the specified Memory Register are not changed by this operation. The original contents of the right half of the specified Memory Register is lost in this operation. The execution of this instruction is similar to the RST instruction except that, at OTB–2, the contents of the A Registers are transferred to the Memory Buffer Registers (23A, 228A) and command 230A does not occur at OTA–6.

The Store instruction (FST) requires that the contents of the Accumulator Registers be transferred to the Memory Buffer Registers for storage in the specified magnetic-core Memory Register. The contents of the Accumulator Registers are unchanged; however, the original contents of the indicated Memory Register are lost. This instruction does not utilize an OTA cycle, going directly from PT to OTB.

*Reset Class Instructions*

The Reset Class, whose timing charts are shown in Figs. 19m through 19o, contains three instructions. All of these instructions deal with the Index Register specified by the index indicator bits 1 through 3 of the Operation Register. The instructions are not indexable. All of the instructions in this class require one instruction cycle composed of PT–7 through PT–6 to complete.

The Reset Index Register instruction (XIN) sets the specified Index Register to the value indicated by the address part of the instruction. At PT–4, the specified Index Register is cleared (113 or 116). At PT–6, the contents of the Address Register are transferred to the specified Index Register (78 or 79).

From Table 2 above, it will be noted that the Reset Index Register (XIN) instruction contains the class binary code 111 and the variation binary code 1011. The class code number contained in bits 4, 5 and 6 of the Operation Register is decoded in the Class Cycle Matrix 207 (Fig. 11) and will cause a positive D.C. level to be established on the Class Cycle Matrix output conductor labeled Reset PT which is applied to the Reset Class Instruction Matrix 205 (Fig. 15). The Reset Index Register instruction (XIN) bits 1 through 3 of the left half word will specify either Index Register 1 (Fig. 4) or Index Register 2 (Fig. 4). When those bits are decoded by Index Selector Matrix 201B (Fig. 12), a positive D.C. level will be established on the output conductor labeled IX–1, or the conductor labeled IX–2 and those conductors are connected as inputs to the Reset Class Instruction Matrix 205 (Fig. 15). As will be noted in Table 2 above, the Reset Index Register instruction is a variation specified by the binary code 1011 which is contained in the bits 7 through 10 of the Operation Register which when decoded by the Variation Matrix 219 (Fig. 12) will cause its output conductor labeled *xin* to be positive and this output conductor of the Variation Matrix 219 is also applied as an input to the Reset Class Instruction Matrix 205 (Fig. 15). Assuming that the instruction word specified Index Register 2, then the conductors labeled Reset PT, IX–2 and 1011 would each be positive and when decoded by the Reset Class Instruction Matrix 205, a positive D.C. level would be established on the output conductor labeled *xin* and IX–2. In response to a positive D.C. level on the conductor labeled *xin* and IX–2, the Command Generator will generate the commands listed in Figure 19m.

From Fig. 19m it will be noted that at $PT_2$–4 time the command 113 or 116 is generated and at $PT_2$–6 time the command 78 or the command 79 is generated, these alternatives being dependent upon which of the Index Registers has been specified by the Reset Index Register instruction. This instruction therefore causes the selected Index Register to be cleared and causes the contents of the Address Register 41B (Fig. 4) to be transmitted on the conductors of cable 87 or the conductors of cable 83B to the Index Register 1 (Fig. 4) or the Index Register 2 (Fig. 4) respectively. Therefore, the address part of the Reset Index Register instruction is stored in the selected Index Register.

The Reset Index Register From the Right Accumulator instruction (XAC) sets the specified Index Register to the valve indicated by the contents of the Right Accumulator register. The Address Register is cleared at PT–9 (77). The specified Index Register is cleared at PT–4 (113 or 116) and the contents of the Address Register are transferred to the specified Index Register at PT–6 (78 or 79). In the execution of this instruction, the contents of the Right Accumulator are transferred to the Address Register at PT–10 (212A).

In the Add Index Register (ADX) instruction, the contents of the Index Register specified by the index indicator (bits L1 through L3) in the operation part of the instruction are added to the address part of the instruction and the sum is placed in the Right A Register. If bits L1 through L3 are Zero, this instruction has the effect of placing its address part of the instruction word in the Right A Register. At PT–9, the contents of the specified Index Register are added to the contents of the Address Register (114, 115 or 212A). At PT–10 the carry operation is started. At PT–3, the Right A Register is cleared (230A), and at PT–5 the modified contents of the Address Register are transferred to the Right A Register (76). At this point the value specified by the contents of the Address Register is the sum of the address specified by the ADX instruction and the contents of the specified Index Register. If no Index Register is specified, then the original contents of the Address Register are transferred, unmodified, to the Right A Register.

Branch Class Instructions

The Branch Class of instructions as herein described includes two instructions, the Branch on Right Minus instruction (BRM) and the Branch and Index instruction (BPX) whose timing charts are shown in Figs. 19k and 19l. Besides the common commands previously described, each instruction in the Branch Class has in common the following commands.

Branch PT (conditioned by the Branch PT line from the Cycle Control Circuit 209B, Fig. 11):

21A, 230A—Clear A Register
    163A—Clear Branch Flip-Flop

The commands listed above and the common commands appear in the timing charts and it is assumed that the reader will interpose them when necessary in the ensuing discussion of the Branch Class instructions.

In the Branch on Right Minus (BRM) Instruction, the normal execution of instructions from sequential addresses is interrupted if the number contained in the Right Accumulator register is negative. At PT-9, the A Register is cleared and the Right Accumulator sign bit is examined (21A, 230A, 166). If the sign bit is equal to One, the Branch Flip-Flop is in an indicating condition and the contents of the Address Register are transferred to the Program Counter on the following PT-0 pulse (154). Thus the Program Counter is set to the address of the next instruction to be executed. The Branch Flip-Flop is cleared at PT-6 (163A). If the sign condition has not been met, the Branch Flip-Flop remains in the cleared condition and the contents of the Program Counter are not altered.

The Branch and Index Instruction (BPX) in accordance with the principles of this invention accomplishes the previously noted results, that is, if the Branch is executed (the sign of the Index Register which has been selected is Zero) then the contents of that specified Index Register is reduced by the value which is indicated by the index interval part of the instruction. Referring now to Table 2 it will be noted that the Branch and Index instruction has a class binary code 101 and a variation code 001—. The address part of this instruction indicates the location in Memory of the next instruction word if the Branch is performed. The bits 10 through 15 of the left half word of the Branch and Index instruction indicate the binary number to be subtracted from the Index Register which is selected by bits 1 through 3 of the left half word of the instruction.

The timing chart of Figure 19k is a list of the commands performed during the Branch and Index instruction. It will be noted that the binary class code 101 of the Branch and Index instruction having been applied to the Class Cycle Matrix 207, Fig. 11, will first cause the Branch-PT output line to be positive since the Cycle Control Circuit produced a positive D.C. level on its output conductor labeled PT and the Branch PT line is applied as an input to the Branch Class Instruction Matrix 203 (Fig. 15). It will be further noted in Table 2 that the variation binary code for the Branch and Index instruction is 001— and this signal applied to the Variation Matrix 219 (Fig. 12) will cause the output conductor labeled bpx-001— to be made positive and this conductor is applied as an input to the Branch Class Instruction Matrix 203.

The output conductors of the Class Cycle Matrix 207 (Fig. 11) and the Variation Matrix 219 (Fig. 12) are applied to the Branch Class Instruction Matrix 203 (Fig. 15) as indicated in the drawings, Figs. 10 through 15.

Referring now to Figs. 21 and 22, those conductors from the Class Cycle Matrix 207 and the Variation Matrix 219 are applied as inputs to the Branch Class Instruction Matrix 203 and those conductors are connected to the And circuits 300, 302, 304, 306, 308, 310 and 312. The output conductor of And circuit 300 will be positive if the instruction word in its index indicator part selected either IX-0 or IX-3 and if the instruction word in its class bits specified the Branch Class instruction and the variation bits of the instruction word specified the Branch and Index variation. This output conductor of And circuit 300 is applied to the Command Generator 211B and when this line is positive, gate circuit 316 is conditioned to pass a pulse on the IP-9 conductor to the conductor labeled with the command number (170). As will be noted from Table 1 above, the command 170 is the command Set the Branch Flip-Flop and as will also be noted from the timing chart of Fig. 19k this command 170 occurs at PT-9 time.

The output of And circuit 302 will be positive if the Index Register 1 was selected by the instruction and the Branch and Index instruction was specified by the instruction word. The output of the And circuit 302 is applied through cathode follower 318 to condition gate circuit 320 to pass pulses on the input conductor labeled IP-9 and the pulses passed by that gate 320 occur on the conductor labeled with the command number 164. It will be noted from Table 1 above that the command 164 is the command Test Index Register 1 Sign Bit For Zero and it will further be noted in the timing chart of Fig. 19k that the command 164 occurs at PT-9 time.

Before proceeding with the remainder of the commands that are generated in response to the Branch and Index instruction it should be noted from Fig. 19k that the commands 42, 52 and 92 are generated at PT-7 time; command 31 is generated at PT-0 time, commands 41A, 53A and 91 at PT-1 time, command 32 at PT-2 time and commands 77 and 101 at PT-6 time. As has previously been stated, these commands are common commands, that is they are generated at the indicated times regardless of what particular instruction is being executed.

Referring now to Figs. 21 and 22, the conductor labeled PT is applied as an input to the Command Generator 211B and conditions gates 322, 324, 326, 328 and 330. Gate 322 is pulsed at IP-6 time and the output pulse is applied through Or circuit 332 to the conductor labeled with the command number 77. Gate 324 is pulsed at IP-1 time and its output is applied to the conductor labeled with the command number 91. The gate circuit 326 is pulsed at IP-6 time and its output is applied to the conductor labeled with the command number 101. The gate circuit 328 is pulsed at IP-7 time and its output is applied to Pulse Amplifier 334 and to Pulse Amplifier 336. The output of Pulse Amplifier 334 is applied to the conductor labeled with the command number 42 and the output of Pulse Amplifier 336 is applied to the conductor labeled with the command number 52. Gate circuit 330 is pulsed at IP-7 time and its output is applied through the pulse amplifier circuit 338 to the conductor labeled with the command number 92. It is therefore seen that the gate circuits 322, 324, 326, 328 and 330 produce the common commands 77, 91, 101, 42, 52 and 92. The conductor IP-2 continuously applies pulses to the Pulse Amplifier 340 whose output pulses are applied to the conductor labeled with the command number 32. The conductor labeled TP-0 continuously applies pulses to the Pulse Amplifier 342 whose output is applied to the conductor labeled with the command number 31. The conductor labeled TP-1 continuously applies pulses to the Pulse Amplifier 344 and to the Pulse Amplifier 346. The output pulses of Pulse Amplifier 344 are applied to the conductor labeled with the command number 41A and the Pulse Amplifier 346 delivers its output pulses to the conductor labeled with the command number 53A. It will therefore be seen that the Pulse Amplifiers 340, 342, 344 and 346 produce the common commands 32, 31, 41A and 53A respectively.

The And circuit 304 will have a postive output when the instruction has specified the Branch and Index instruction and this output from And circuit 304 is applied through cathode follower 340 to And circuits 300, 302 and 312 as well as to gate circuit 348 and gate circuit 350. Gate circuit 348 is pulsed at IP–1 time and its output is applied to the conductor labeled with the command number 103. From Table 1 above it will be noted that the command 103 is the command Index Interval Complement To The Address Register and it will be further noted in Fig. 19k that the command 103 occurs at PT–1 time. Referring now to Figs. 2 through 6 it will be noted that the conductor from the Instruction Control Element 189 which is labeled with the command Ix. Int. Reg.-Adr. Reg., 155, is applied to the Index Interval Register 151 which in response to a pulse on that conductor will transfer its contents to the Address Register 41B (Fig. 4) by way of the conductors of cable 61B.

Returning now to Figs. 21 and 22, gate circuit 350 is pulsed at TP–0 time and its output is applied through Or circuit 332 to the conductor labeled with the command number 77. As will be noted in Fig. 19k the command 77 is generated at PT–0 time and at PT–6 time. Gate circuit 350 causes that command pulse at PT–0 time and gate circuit 322 causes a pulse on that conductor at PT–6 time.

And circuit 306 (Fig. 21) will produce a positive output if the instruction word specified the Branch and Index instruction and the instruction word also specified Index Register 1 and provided that the Cycle Control Circuit 209B of Fig. 11 produces a positive D.C. level on its output conductor labeled Branch Flip-Flop On. The conductor labeled Branch Flip-Flop On will be positive only if the selected Index Register has a number therein which is positive. The manner in which this positive D.C. level on the Branch Flip-Flop On conductor is produced will be described in greater detail hereinafter. The output of And circuit 306 is applied to gate circuit 352 and also is applied through Or circuit 354 and cathode follower 356 to gate circuits 358 and 360. Gate circuit 352 is pulsed at IP–2 time and its output is applied to the conductor labeled with the command number 114. From Table 1 above it will be noted that command 114 is the command Index Register 1 to Address Register and it will further be noted in Fig. 19k that the command 114 occurs at PT–2 time. Gate circuit 358 is pulsed by the conductor labeled IP–4 and its output is applied to the conductor labeled with the command number 113. It will be noted from Table 1 above that command 113 is the command Clear Index Register 1 and it will further be noted from Fig. 19k that the command 113 occurs at PT–4 time. Gate circuit 360 is pulsed by the conductor labeled IP–6 and its output is applied to the conductor labeled with the command number 79. It will be noted from Table 1 above that the command 79 is the Command Address Register to Index Register 1 and it will be noted from Fig. 19k that the command 79 occurs at PT–6 time.

And circuit 308 (Fig. 21) will produce a positive output in response to a Branch and Index instruction which specifies Index Register 2 provided that the Branch Flip-Flop On conductor from the Cycle Control Circuit 209B of Fig. 11 is positive. The output from And circuit 308 is applied through cathode follower 362 to gate circuit 364 and is also applied through Or circuit 366 and cathode follower 368 to gate circuits 370, 372. Gate circuit 370 receives pulses from the conductor labeled IP–4 and applies its output pulses to the conductor labeled with the command number 116. It will be noted from Table 1 above that the command 116 is the command Clear Index Register 2 and it will further be noted in Fig. 19k that the command 116 occurs at PT–4 time. Gate circuit 372 receives pulses from the conductor labeled IP–6 and applies its output pulses to the conductor labeled with the command number 78. From Table 1 above it will be noted that command 78 is Address Register to Index Register 2 and it will further be noted from Fig. 19k that command 78 occurs at PT–6 time.

Gate circuit 364 receives pulses from the conductor labeled TP–2 and delivers its output pulses through Or circuit 374 and Pulse Amplifier 376 to the conductor labeled with the command number 115. It will be noted from Table 1 above that the command 115 is the command Index Register 2 to Address Register and it will further be noted from Fig. 19k that this command 115 occurs at PT–2 time.

And circuit 310 will produce a positive D.C. level on its output conductor when the instruction word specified the Branch on Right Minus instruction (BRM). The output of And circuit 310 is applied through cathode follower 378 to gate circuit 380. Gate circuit 380 receives pulses from the conductor labeled IP–9 and delivers its output pulses to the conductor labeled with the command number 166. From Table 1 above it will be noted that command 166 is Test the Right Accumulator Sign Bit For One and it will be noted in Fig. 19l that the command 166 occurs at PT–9 time.

And circuit 312 will produce a positive D.C. level on its output conductor in response to the Branch and Index instruction provided that the instruction word has specified the Index Register 2. The output of And circuit 312 is applied through cathode follower 382 to gate circuit 384. Gate circuit 384 is supplied pulses by the conductor labeled IP–9 and it produces its output pulses on the conductor labeled with the command number 174. It will be noted from Table 1 above that the command number 174 is Test Index Register 2 Sign Bit For Zero and it will further be noted in Fig. 19k that the command 174 occurs at PT–9 time. From Fig. 19k it will be noted that there are still further commands which are generated during a Branch and Index instruction. During the Branch and Index instruction the Branch PT conductor from the output of the Cycle Control Circuit 209B of Fig. 11 is positive and this conductor is applied to the Command Generators 211B in Figs. 21 and 22. The Branch PT conductor is applied to gate circuit 386 and gate circuit 388. Gate circuit 386 receives pulses from the conductor labeled IP–6 and produces its output pulses on the conductor labeled with the command number 163A. From Table 1 above it will be noted that command number 163A is the command Clear the Branch Flip-Flop and it will further be noted from Figs. 19k and 19l that command 163A occurs at PT–6 time. Gate circuit 388 receives pulses from the conductor labeled IP–9 and delivers its output pulses to Pulse Amplifier 390 and Pulse Amplifier 392. The output pulses from Pulse Amplifier 390 are supplied to the conductor labeled with the command number 21A. It will be noted from Table 1 above that the command 21A is the command Clear the Left A Register and it will further be noted from Figs. 19k and 19l that the command number 21A occurs at PT–9 time. The output pulses from Pulse Amplifier 392 are applied to the conductor labeled with the command number 230A. It will be noted from Table 1 above that the command 230A is the command Clear the Right A register and it will further be noted from Figs. 19k and 19l that the command 230A occurs at PT–9 time.

During the Branch and Index instruction the sign bit of the selected Index Register is inspected and if the sign bit is Zero, a pulse is delivered to the Cycle Control Circuit 209B of Fig. 11 which causes its output conductor labeled Branch Flip-Flop On to be made positive. The conductor labeled Branch Flip-Flop On is applied to the Command Generator 211B and when positive it conditions gate 394 and gate 396. Gate circuit 394 receives pulses from the conductor labeled IP–11 and delivers its output pulses to Pulse Amplifier 398 and to Pulse Amplifier 400. Output pulses from Pulse Amplifier 398 are applied to the conductor labeled with the command number 94. It will be noted from Table 1 above that the command 94 is the command Clear the Program Counter and it will further be noted from Figs. 19k and 19l th t this command 94 occurs at PT–11 time. The output pulses of Pulse Amplifier 400 are applied to the conductor labeled with the command number 93. It will be noted from Table 1 above that the command 93 is the command Program Counter to the Right A Register and it will further be noted from Figs. 19k and 19l that the command 93 occurs at PT–11 time. The gate circuit 396 receives pulses from conductor labeled TP–0 and delivers pulses to the conductor labeled with the command number 154 which is the command Address Register to Program Counter and this command occurs at TP–0.

*Memory detailed description*

As will be recalled from the previous general description, the Memory Element 21B serves the function of storing words in its 4,096 registers and upon receipt of a pulse on conductor 31 labeled Clear Memory Adr. Reg. followed by a pulse on conductor 32, delivers pulses to the output conductors of cables 25 and 27 which are representative of the signals stored in the particular register whose address is determined by the signals on the conductors of cable 23B. This is known as reading a word out of memory and the read out operation will not occur if a pulse is received on conductor 33A which is labeled Inhibit Sample.

The writing a word into memory operation occurs when a pulse is received from conductor 31 followed by a pulse on conductor 32. In response to these pulses the Memory Element 21B will write the word, corresponding to the signals on the conductors of cables 33B and 35, into the Memory Register whose address is designated by the signals on the conductors of cable 23B.

In the preferred embodiment, the Memory Element 21B is a magnetic core memory and the block schematic of the Memory Element is shown in Fig. 23a, reference being made thereto. A pulse on conductor 31 labeled Clear Memory Adr. Reg. will cause each stage of the Memory Address Register 301 to be cleared and will cause the various control devices in the Clear and Sample Gate Generator 303 to be cleared, the various control devices in the Disturb Gate Generator 305 to be cleared, the various control devices in the Write Gate Generator 307 to be cleared, the various control devices in the Inhibit Gate Generator 309 to be cleared and also cause the various control devices in the Read Gate Generator 311 to be cleared.

The Clear Memory Address Register command pulse on conductor 31 is always followed by Start Memory command pulses on conductor 32. This Start Memory Pulse is applied as an input pulse to a Memory Pulse Distributor 313, the details of which will be subsequently described. However, its function is, in response to the Start Memory pulse, to sequentially pulse its various output conductors. Referring now to Fig. 23b, there is illustrated a timing chart which shows the internal memory cycle, the time relationship between the various pulses generated by the Memory Pulse Distributor 313 in Fig. 23a and the various instruction command pulses received from the Instruction Control Element 189 in Figs. 2 through 6. It will be noted in Fig. 23b that the Clear Memory Address Register command pulse occurs at 0 time of the internal memory cycle and that the Start Memory command pulse and the Inhibit Sample command pulse both occur at 2 time of the internal memory cycle. It should be remembered, however, that in certain instructions the Inhibit Sample pulse will not be generated. In Fig. 23b the first six commands are those commands which are generated by the Instruction Control Element 189 in Fig. 6 whereas the next nine commands are those command pulses which are generated by the Memory Pulse Distributor 313 in Fig. 23a in response to a Start Memory pulse. Referring now to Figs. 23a and 23b, the output conductors of the Memory Pulse Distributor each labeled with the particular command identified by the pulse on that conductor, have the pulses on the individual conductors occur at times indicated in Fig. 23b. The Set Read command pulse and the Clear Read command pulse, each of which is generated by the Memory Pulse Distributor 313, are delivered to the Read Gate Generator 311 whose function is, in response to a Clear signal on its clear input conductor followed by a Set Read command pulse which is in turn followed by a Clear Read command pulse, to deliver pulses on its output conductors, the duration of which is determined by a time spacing between the Set Read and Clear Read command pulses. The output of the Read Gate Generator 311 which is applied to the X Selection Gates 315 is labeled Read X Gate whereas the output of the Read Gate Generator 311 which is applied to the Y Selection Gates 317 is labeled Read Y Gate. The Inhibit Gate Generator 309 functions in response to a Set Inhibit command and a Clear Inhibit command from the Memory Pulse Distributor 313 to deliver on its output conductors labeled Inhibit, pulses whose time duration is dependent upon the time spacing between the Set Inhibit command and the Clear Inhibit command. These Inhibit pulses from the Inhibit Gate Generator 309 are applied to the Digit Plane Driving Section 319. The Write Gate Generator 307 functions in response to a Set Write command pulse followed by a Clear Write command pulse from the Memory Pulse Distributor 313 to deliver on its output conductors, labeled Write X Gate and Write Y Gate, pulses whose time duration is determined by the time spacing between the Set Write command and the Clear Write command.

The Disturb Gate Generator 305 functions in response to a Set Post Write Disturb command followed by a Clear Post Write Disturb command, from the Memory Pulse Distributor 313, to deliver on each of its output conductors, labeled Post Write Disturb, pulses whose time duration is determined by the time spacing between the Set Post Write Disturb command pulse and the Clear Post Write Disturb command pulse.

The Clear and Sample Gate Generator 303 functions in response to an Inhibit Sample command pulse from the Instruction Control Element 189 of Fig. 6, followed by a Sample command pulse from the Memory Pulse Distributor 313, to not deliver a pulse to its output conductors labeled Sample on Read. However, in the event no Inhibit Sample pulse is received by the Clear and Sample Gate Generator 303, the Sample command pulse from the Memory Pulse Distributor 313 will cause pulses to be delivered to the output conductors labeled Sample on Read. The Sample pulse is always followed by a Clear Write command pulse from the Memory Pulse Distributor 313 to cause the Clear and Sample Gate Generator 303 to generate another pulse on its output conductors labeled Sample on Read provided that prior to the next Sample command pulse an Inhibit Sample command pulse is not received.

Referring now to Figs. 2 through 6 it will be noted that pulses can be delivered to the conductors of cable 23B from either the Program Counter 39 or the Address Register 41B. In either event these pulses will deliver in binary code the address of the selected memory register and these pulses are applied as inputs to the Memory Address Register 301 (Fig. 23a). The Memory Address Register 301 may be considered as having a left and a right half and the 6 bits which may be transferred into the left half could be said to identify the Y address while the 6 bits in the right half could be said to identify the X address since the Array Section 321 is to be considered as a three dimensional array of magnetic core registers. The 5 bits of the left half of the Memory Address Register 301 each have an output conductor on its Zero side as well as on its One side and these conductors totaling 10 make up cable 323, which are applied as inputs to a Diode Matrix Decoder 325 which may also be of the same general construction as that shown in the previously referred to I.R.E. article. Dependent upon the binary value of the 5 bits in the left half of the Memory Address Register 301, one of the output conductors of cable 327 will be energized with a negative D.C. level. The remaining stage of the left half of the Memory Address Register 301 which stores the least significant bit of the Y address of the Memory Register to be selected has its Zero and One side output conductors applied to the Y Selection Gates 317. The right half of the Memory Address Register 301 has its stages corresponding to the 5 most significant bits stored therein connected by way of cable 331 to another Diode Matrix Decoder 333 which may be identical in construction to the Diode Matrix Decoder 325. Dependent upon the value of the binary number stored in the 5 most significant bits of the right half of the Memory Address Register, one of the output conductors of cable 335 will be energized with a negative D.C. level. The stage of the right half of the Memory Address Register 301 which stores the least significant bit of the X address of the Memory Register to be selected has its Zero and One output conductors connected to the X Selection Gates 315.

The X Selection Gates 315 serve the function of (1) producing a negative pulse, on the output conductor labeled Read Odd, upon receipt of a pulse on its input conductor labeled Read X Gate, when the conductor, labeled One from the right half of the Memory Address Register 301, is positive, (2) producing a negative pulse on its output conductor labeled Write Odd in response to an input pulse on its input conductor labeled Write X Gate, under the same memory address condition, (3) in response to a positive D.C. level on the Zero conductor from the least significant bit of the right half of the Memory Address Register, producing an output negative pulse on its Read Even conductor in response to a command pulse Read X Gate, and (4) producing under the same conditions of the Memory Address Register a negative pulse on its output conductor labeled Write Even in response to the command pulse Write X Gate. The Y Selection Gates 317 function in a manner similar to the X Selection Gates 315.

The output conductors labeled Read Even, Write Even, Read Odd and Write Odd as well as the conductors of cable 327 are applied as inputs to X Drivers 339.

The X Drivers 339 function to select one of the output conductors of cable 341, this selection being dependent upon which one of the conductors of cable 335 is negative and which one of the conductors labeled Read Even, Write Even, Read Odd and Write Odd has a positive D.C. level, and to produce on this selected conductor a pulse of one polarity if either of the Read conductors has a positive pulse and to produce on that selected conductor a pulse of opposite polarity if either of the Write input conductors has a pulse thereon.

The Y Drivers 343 function to select one of the output conductors of cable 345, this selection being dependent upon which one of the conductors of cable 327 is negative and which one of its input conductors labeled Read Even, Write Even, Read Odd, Write Odd has a pulse thereon and to produce on that selected output conductor a pulse of one polarity if the pulse is in response to a pulse on one of its Read input conductors and to produce a pulse of opposite polarity on that selected conductor if the pulse is in response to a pulse on one of its Write input conductors. The Array Section 321 may be considered as 32 planes, each plane having 64 rows of magnetic cores and 64 columns of magnetic cores, that is, 64 X and 64 Y address locations thereby defining 4,096 addresses. The details of the manner of construction and operation of such an array of magnetic cores is more thoroughly described in patent application Serial Number 431,164, filed by Francis Durgin et al. on May 20, 1954, entitled "Transformer Matrix System." As more fully described in the referred to application of Durgin et al., a coincident current energization of one of the conductors of cable 341 and one of the conductors of cable 345 by a pulse of one polarity will cause one of the corresponding selected cores in each of the 32 planes of the Array Section 321 to be saturated to one predetermined state of magnetization. A current pulse of the opposite polarity will cause the corresponding cores of the planes to be saturated to the opposite state of magnetization. Those referred to coincident currents when of one polarity are used for writing a word into the selected register of the Memory Array while the coincident currents of opposite polarity cause reading from the selected register into the Memory Array.

The Digit Plane Driving Section 319 has as D.C. level inputs the conductors of cable 33B and the conductors of cable 35. As was pointed out in the previous general description, these conductors are connected to the Left and Right Memory Buffer Circuits respectively. These conductors and cables 33B and 35 are connected to the Zero side of their corresponding stages in the Left and Right Memory Buffer Circuits. The Digit Plane Driving Section 319 serves the function of producing on selected ones of the conductors of cable 347 pulses in response to pulses on its input Inhibit conductors. If the particular conductor of cable 347 corresponds to one of the conductors of cable 33B or 35 which has a positive D.C. level thereon a pulse is produced in that particular conductor. The Digit Plane Driving Section 319 also functions to produce pulses on all of the conductors of cable 347 in response to pulses on its Post Write Disturb input conductors. The conductors of cable 347 are applied to the Array Section 321 as Z conductors and as will be noted in the previously referred to Durgin et al. application, the Z conductors perform the function of preventing the core associated therewith from being driven to the predetermined magnetic state representative of a binary one. The cores in the Array Section 321 are driven to one remanent state by positive coincident currents, individually less than the coercive force, applied to the X and Y windings. That is, the magnitude of either the X or Y line current alone is insufficient to overcome the coercive force but applied together, they exceed the coercive force. Positive currents applied to the X and Y windings may, for example, establish a positive magnetomotive force greater than the coercive force which changes the core from the Zero state of remanence to the One state of remanence. The currents in the conductors of cable 347 are of sufficient magnitude to produce a magnetomotive force in the opposite direction to the magnetomotive force produced by the current in the conductors of cables 341 and 345 and thereby cause the cores associated with the particular conductor of cable 347 to remain in its previous or Zero magnetic state. The sense windings of the Array Section 321 are connected to the Sense Section 349 and currents will be produced in those sense conductors, one for each digit plane, if one of the cores of the plane associated with the particular conductor was caused to change its magnetic state from One to Zero. The Sense Section 349 functions to amplify and properly shape the pulses on the conductors of cable 351 and deliver those pulses to the conductors of cables 25 and 27 if a Sample on Read pulse has been received at its input.

*The Memory Address Register* which is indicated in Fig. 23a as block 301 is shown in detail in Fig. 24. Referring now to Fig. 8 the right half of the instruction word includes bits 4 through 15 which designate the memory address and when transferred from the Address Register 41B of Fig. 4, bit 4 of this instruction address word is stored in flip-flop 501 of Fig. 24. In the interest of simplicity the flip-flops which store bits 5, 6, 7 and 8 are not shown in Fig. 24 since they are identical to the flip-flop 501 and their inputs and outputs will be readily understood in view of the following description. Bit 9 from the Address Register or Program Counter is stored by flip-flop 503. Bit 4 from the Address Register or Program Counter which is stored by flip-flop 501 is the bit corresponding to the $2^{11}$ bit of the binary word. The Zero output of flip-flop 501 is therefore labeled $\overline{2^{11}}$ which means no $2^{11}$ or that the $2^{11}$ bit of the binary number is Zero. The One output of the flip-flop 501 is labeled $2^{11}$ which means that the $2^{11}$ bit of the binary number is a One. Bit 9 from the Address Register or Program Counter which is stored by flip-flop 503 corresponds to the $2^6$ bit of the binary number and the output conductors from flip-flop 503 are accordingly labeled. As previously stated bits 4 through 9 specifiy the Y address of the selected Memory Register. Bit 10 from the Address Register or Program Counter is stored by flip-flop 505 and since bit 10 corresponds to the $2^5$ bit of the binary number, the output conductors of flip-flop 505 are accordingly numbered. Bits 11 through 14 do not have their corresponding flip-flops shown in Fig. 24 since those circuits are identical to bit 10 flip-flop 505 and those circuits will be readily understood in view of the following description. Bit 15 from the Address Register or Program Counter is stored by flip-flop 507 and since bit 15 corresponds to the $2^0$ bit of the binary number the output conductors of flip-flop 507 are accordingly labeled. As previously stated, bits 10 through 15 specify the X address of the selected Memory Register. The output conductors of flip-flop 505 as well as the output conductors of the circuits corresponding to the bits 11 through 14 which are not shown in Fig. 24 make up cable 331 of Fig. 23a and the output conductors of flip-flop 507 which are labeled $2^0$ and $\overline{2^0}$ are connected to the X Selection Gates 315 as shown in Fig. 23a. The output conductors of flip-flop 501 as well as the output conductors from the circuits corresponding to bits 5 through 8 which are not shown in Fig. 24 make up cable 323 of Fig. 23a and the output conductors of flip-flop 503 which are labeled $2^6$ and $\overline{2^6}$ are applied to the Y Selection Gates 317 as shown in Fig. 23a.

*The Memory Pulse Distributor* which is indicated in Fig. 23a as block 313 is shown in detail in Fig. 25. The input to the Memory Pulse Distributor is a pulse which appears on the conductor labeled Start Memory and in response to a pulse on that conductor the Memory Pulse Distributor sequentially pulses its output conductors in the manner previously described. A Start Memory pulse is applied through Register Driver 509 and Pulse Amplifier 511 to the output conductor labeled Set Read. Therefore, the Set Read pulse occurs substantially in time coincidence with the Start Memory pulse. The output of Register Driver 509 in addition to being applied through Pulse Amplifier 511 to the Set Read output is also applied through a ½ microsecond Delay Circuit 513, Pulse Amplifier 515, another ½ microsecond Delay Circuit 517, another Pulse Amplifier 519, still another ½ microsecond Delay Circuit 521, still another Pulse Amplifier circuit 523, a further ½ microsecond Delay Circuit 525, a further Pulse Amplifier circuit 527, and a still further Pulse Amplifiier circuit 529 to the output conductor labeled Clear Read. Due to the Delay Circuits 513, 517, 521 and 525, the Clear Read output pulse occurs substantially two microseconds after the Start Memory pulse is received and as shown in Fig. 23b the Clear Read pulse occurs at 6 time of the internal memory cycle, assuming that the internal memory cycle is 7½ microseconds. The output of Pulse Amplifier 527 in addition to being applied through Pulse Amplifier 529 to produce the Clear Read output pulse is applied to the input of a Delay circuit 531 which has two outputs. The output which is applied to a Pulse Amplifier 533 is an adjustable time delay output, that is, the Delay circuit 531 is so constructed as to permit that output conductor to be connected to 1/10 microsecond delay intervals. The output of Pulse Amplifier 533 is applied through another adjustable Delay circuit 535 which may be tapped at 2/100 microsecond intervals and that output is applied through Pulse Amplifier 537 to the output conductor labeled Sample. As shown in Fig. 23b, the Sample output pulse may occur shortly after time 6 of the internal memory cycle but may be adjusted to occur either a little earlier or a little later than that shown in Fig. 23b. The ½ microsecond delay output of Delay circuit 531 is applied through Pulse Amplifier 539 to an adjustable Delay circuit 541 and the output of Delay circuit 541 which is applied to Pulse Amplifier 543 is an adjustable delay of 1/10 microsecond intervals. The output of Pulse Amplifier 543 is applied to the output conductor labeled Set Write and therefore the Set Write pulse will occur some time later than time 6A and some time earlier than time 7 of the internal memory cycle as shown in Fig. 23b. The ½ microsecond delay output of Delay circuit 541 is applied through Pulse Amplifier 545 and Pulse Amplifier 547 to the output conductor labeled Set Inhibit and therefore this Set Inhibit pulse will occur at 7 time of the internal memory cycle as shown in Fig. 23b. The output of Pulse Amplifier 541 is also applied through Delay circuit 549, Pulse Amplifier 551, adjustable Delay circuit 553, Pulse Amplifier 555, Delay circuit 557 and Pulse Amplifier 559 to another adjustable Delay circuit 561. The output of Delay circuit 561 which is applied to Pulse Amplifier 563 is adjustable at 1/10 microsecond intervals and the output of Pulse Amplifier 563 is applied to the conductor labeled Clear Write. As shown in Fig. 23b, the Clear Write pulse occurs some time later than 9 time and some time earlier than 10 time of the internal memory cycle.

The ½ microsecond delayed output of Delay circuit 561 is applied through Pulse Amplifier 565, Delay circuit 567 and Pulse Amplifier 569 to the input of Pulse Amplifier 571 whose output is applied to the output conductor labeled Clear Inhibit and the pulse on this conductor occurs at 11 time of the internal memory cycle as shown in Fig. 23b.

The output of Pulse Amplifier 569 is also applied to an adjustable Delay circuit 573 whose output which is applied to Pulse Amplifier 575 is adjustable at 1/10 microsecond intervals. The output of Pulse Amplifier 575 is applied to the output conductor labeled Set Post Write Disturb.

The ½ microsecond delayed output of Delay circuit 573 is applied through Pulse Amplifier 577, Delay circuit 579, Pulse Amplifier 581, Delay circuit 583 and Pulse Amplifier 585 to an adjustable Delay circuit 587. The output of Delay circuit 587 which is applied to Pulse Amplifier 589 has an adjustable delay of 1/10 microsecond intervals and the output of Pulse Amplifier 589 is applied to the output conductor labeled Clear Post Write Disturb. The Clear Post Write Disturb pulse occurs at a time later than 1 time and earlier than 2 time of the internal memory cycle as shown in Fig. 23b.

*The Read Gate Generator* which is shown in Fig. 23a as block 311 is shown in detail in Fig. 26. In response to a pulse on the Set Read conductor, flip-flops 591 and 593 are set in their One state. In response to a pulse on the Clear Read conductor, flip-flops 591 and 593 are set to their Zero state. Initially flop-flops 591 and 593 are set to their Zero state by a pulse applied on the conductor labeled Clear Memory Controls which through Or circuits 595 and 597 is applied to the Clear sides of flip-flops 591 and 593. During normal operation the Memory Pulse Distributor 313 in Fig. 23a delivers a pulse to the Set Read conductor followed by a pulse two microseconds later on the Clear Read conductor. This sequence of pulses causes the flip-flops 591 and 593 (Fig. 26) to be set in their One state for two microseconds and therefore flip-flop 591 produces a pulse on its output conductor labeled Read X Gate which is two microseconds long and the flip-flop 593 delivers a pulse to its output conductor labeled Read Y Gate which is two microseconds long.

*The Write Gate Generator* which is illustrated in Fig. 23a as block 307 is shown in detail in Fig. 27 and the Write Gate Generator includes flip-flops 599 and 601 and Or circuits 603 and 605. The operation of those flip-flops and Or circuits is identical to the operation of the Read Gate Generator of Fig. 26, that is, in response to a Set Write pulse followed by a Clear Write pulse flip-flop 599 is set to its One side for a time interval determined by the time difference between the Set Write and Clear Write pulses. Therefore flip-flop 599 delivers a pulse to its output conductor labeled Write X Gate whose width is determined by the time at which the flip-flop 599 is in its One state. Flip-flop 601 remains on its One side for the same length of time as flip-flop 599 and therefore produces a pulse on its output conductor labeled Write Y Gate whose width is substantially identical to that of the pulse on the conductor labeled Write X Gate.

*The Inhibit Gate Generator* which is illustrated in Fig. 23a as block 309 is shown in detail in Fig. 28. The Inhibit Gate Generator includes flip-flops 607 and 609, and Or circuits 611 and 613. The operation of those flip-flops and Or circuits is substantially identical to the operation of the Read Gate Generator and the Write Gate Generator of Figs. 26 and 27, that is, in response to a Set Inhibit pulse followed by a Clear Inhibit pulse, flip-flops 607 and 609 are set to the One side for a time interval determined by the time difference between the Set Inhibit and the Clear Inhibit pulses. Therefore, the flip-flops 607 and 609 deliver pulses to their output conductors labeled Inhibit whose pulse width is determined by the time at which the flip-flops 607 and 609 are in their One state.

*The Disturb Gate Generator* which is illustrated in Fig. 23a as block 305 is shown in detail in Fig. 29. The Disturb Gate Generator includes flip-flops 615, 617, 619 and 621 together with their associated Or circuits 623, 625, 627 and 629. A pulse on the conductor labeled Set Post Write Disturb followed by a pulse on the conductor labeled Clear Post Write Disturb causes each of the flip-flops 615, 617, 619 and 621 to be set on the One side for a period of time determined by the time period between those two pulses. This results in the output conductors of each of those flip-flops having a negative pulse thereon.

*The Clear and Sample Gate Generator* which is illustrated in Fig. 23a as block 303 is shown in detail in Fig. 30. The Clear and Sample Gate Generator includes flip-flop 631, gate circuit 633 and Or circuit 635 together with their associated circuits. During normal operation the conductor labeled Clear Memory Adr. Reg. is pulsed each Zero time of the internal memory cycle. This Clear Memory Address Register pulse is produced by the Instruction Control frame 189 of Fig. 6. Therefore flip-flop 631 normally is in its Zero state and since the conductor labeled Sample is produced by the Memory Pulse Distributor on each cycle of its operation, gate circuit 633 will produce an output pulse which is applied to each of the conductors labeled Sample on Read. During certain instructions, for example, during the Store Class of instructions, the Instruction Control frame 189 of Fig. 6 supplies a pulse to the conductor labeled Inhibit Sample and this pulse occurs at 2 time of the internal memory cycle. In response to this Inhibit Sample pulse, flip-flop 631 is set in its One state and therefore the gate circuit 633 is not conditioned and the Sample pulse is not passed.

*The X Selection Gates* which are shown in Fig. 23a as block 315 are shown in detail in Fig. 31. The X Selection Gates include the Memory Gate Generators 635, 637, 639 and 641 together with their associated circuits. When the conductor labeled $2^0$ is positive, Memory Gate Generator 635 is conditioned to pass a pulse received on conductor labeled Read Gate, and Memory Gate Generator 637 is conditioned to pass a pulse received from the conductor labeled Write gate. When the $\overline{2}^0$ conductor is energized with a positive D.C. level, Memory Gate Generator 639 is conditioned to pass a pulse received from the conductor labeled Read Gate, and the Memory Gate Generator 641 is conditioned to pass a pulse received from the conductor labeled Write Gate. The output pulses from the X Selection Gates are negative.

*The Y Selection Gates* which are illustrated in Fig. 23a by block 317 are shown in detail in Fig. 32. The Y Selection Gates include Memory Gate Generators 643, 645, 647 and 649. When the conductor labeled $2^6$ is energized with a positive D.C. level, Memory Gate Generator 643 is conditioned to pass a pulse received from the conductor labeled Read Gate and Memory Gate Generator 645 is conditioned to pass a pulse received from the conductor labeled Write Gate. When the conductor labeled $2^6$ is energized with a positive D.C. level, Memory Gate Generator 647 is conditioned to pass a pulse received from the conductor labeled Read Gate and Memory Gate Generator 649 is conditioned to pass a pulse received from the conductor labeled Write Gate. The output pulses from the Y Selection Gates are negative.

*The X Drivers* which are shown in Fig. 23a as block 339 are shown in detail in Fig. 33. Each driver of the X Drivers includes a Core Memory Driver circuit and an associated Matrix Output Amplifier. Fig. 33 shows a plurality of output conductors labeled 0 through 3 and 60 through 63. It is to be understood however that there are actually 64 conductors and in the interest of simplicity certain of the drivers have not been shown in the drawings since their construction and connections will be understood in view of the following description. Associated with the output conductor labeled 0 is a Core Memory Driver 651 and a Matrix Output Amplifier 653. Associated with the output conductor labeled 1 is a Core Memory Driver 655 and a Matrix Output Amplifier 657. The conductor labeled 0, 1 (Fig. 33) from the X Diode Matrix Decoder 333 (Fig. 23a) will be negative if the five most significant bits of the right half memory address word are all Zeros, that is, the actual memory X address is either Zero or One and this conductor labeled 0, 1 is connected to each of the Matrix Output Amplifiers 653 and 657 whose output positive D.C. levels are applied to the Core Memory Drivers 651 and 655 respectively. Each of those Core Memory Drivers is therefore conditioned to pass either a negative Write pulse or a negative Read pulse. Assuming that the least significant bit of the right half word of the memory address is a One, then the X Selection Gates 315 of Fig. 23a would have caused either the Read $2^0$ conductor or the Write $2^0$ conductor to be pulsed dependent upon whether it had received a Read pulse or a Write pulse from the Read Gate Generator 311 or the Write Gate Generator 307 of Fig. 23a. It should be noted that the Read Even and the Write Even conductors are connected as inputs to the Core Memory Driver 651 whereas the Read Odd and Write Odd conductors are connected as inputs to the Core Memory Driver 655. Under the assumed condition that the least significant bit of the right half word in the Memory Address Register is One and the five most significant bits are Zero and assuming that the Command is to Read, then the Read Odd conductor will be pulsed and the Core Memory Driver 655 will produce a pulse of current of one polarity on its output conductor labeled One. Of course if the Command had been to Write Odd, then the Core Memory Driver 655 would have caused a current pulse of opposite polarity on its output conductor labeled One, if the $2^1$ stage of the Memory Address Register 301 of Fig. 23a contained a One while the $2^2$ through $2^6$ stages contained a Zero then the conductor labeled 2, 3 (Fig. 33) would have a negative D.C. level thereon which when amplified and inverted by the Matrix Output Amplifiers 659 and 661 is applied to the Core Memory Drivers 663 and 665 respectively. If the conductor labeled 2, 3 is negative, the Core Memory Drivers 663 and 665 will both be conditioned and if a pulse is received on the Read Even conductor, Core Memory Driver 663 will cause a pulse of one polarity on its output conductor labeled 2 and in response to a Write Even pulse, Core Memory Driver 663 will cause a current pulse of the opposite polarity on its output conductor labeled 2. In response to a pulse on conductor labeled Write Odd, Core Memory Driver 665 will cause a current pulse to be produced on its output conductor labeled 3 of one polarity and in response to a pulse on the Write Odd conductor, Core Memory Driver 665 will cause a current pulse of opposite polarity on its output conductor labeled 3. If the right half word in the Memory Address Register 301 of Fig. 23a was 11110—, then the X Diode Matrix Decoder 333 of Fig. 23a would cause conductor labeled 60, 61 (Fig. 33) to be energized with a negative D.C. level and this negative D.C. level is applied through Matrix Output Amplifiers 667 and 669 to Core Memory Drivers 671 and 673 respectively, which in turn will cause either the output conductor labeled 60 or the output conductor labeled 61 to be pulsed. If the right half word contained in the Memory Address Register 301 of Fig. 23a was 11111—, then the X Diode Matrix Decoder 333 of Fig. 23a would cause the conductor labeled 62, 63 of Fig. 33 to be energized with a negative D.C. level and this negative D.C. level is applied through Matrix Output Amplifiers 675 and 677 to Core Memory Drivers 679 and 681 respectively.

The Y Drivers which are shown in Fig. 23a as block 343 are shown in detail in Fig. 34. Each driver of the Y Drivers includes a Core Memory Driver Circuit and an associated Matrix Output Amplifier. Fig. 34 shows a plurality of output conductors labeled 0 through 3 and 60 through 63. It is to be understood however that there are actually 64 output conductors and in the interest of simplicity certain of the drivers have not been shown in the drawings since their construction and connections will be understood in view of the following description. Associated with the output conductor labeled 0 is a Core Memory Driver Circuit 683 and a Matrix Output Amplifier 685. Associated with the output conductor labeled 1 is a Core Memory Driver Circuit 687 and a Matrix Output Amplifier 689. The input conductor labeled 0, 1 from the Y Diode Matrix Decoder 325 (Fig. 23a) will be negative if the 5 most significant bits of the left half memory address word are all Zeros, that is, the actual memory Y address is either 0 or 1. This conductor labeled 0, 1 (Fig. 34) is connected to each of the Matrix Output Amplifiers 685 and 689 whose output D.C. levels are applied to the Core Memory Drivers 683 and 687 respectively. Each of those Core Memory Drivers is therefore conditioned to pass a Write pulse or a Read pulse. Assuming that the least significant bit of the left half word of the memory address is a One, then the Y Selection Gates 317 of Fig. 23a will cause either the Read $2^6$ conductor or the Write $2^6$ conductor to be pulsed dependent upon whether it had received a Read pulse or a Write pulse. It should be noted that the Read Even and Write Even conductors are connected as inputs to the Core Memory Driver 683 whereas the Read Odd and Write Odd conductors are connected as inputs to the Core Memory Driver 687. Under the assumed condition that the least significant bit of the left half word in the Memory Address Register is One, and assuming that the instruction is to Read, then the Read Odd conductor will be pulsed and the Core Memory Driver 687 will produce a pulse of current of one polarity on its output conductor labeled One. Of course if the instruction had been to Write Odd, then the Core Memory Driver 687 would have caused a current pulse of opposite polarity on its output conductor labeled One. If the $2^7$ stage of the Memory Address Register 301 of Fig. 23a contained a One while the $2^8$ through $2^{11}$ stages contained a Zero, then the conductor labeled 2, 3 would have a negative D.C. level thereon and this conductor in Fig. 34 is connected to the Matrix Output Amplifiers 691 and 693 whose outputs are connected to Core Memory Driver Circuits 695 and 697 respectively. If the conductor labeled 2, 3 is negative, the Core Memory Drivers 695 and 697 will both be conditioned and if a pulse is received on the Read Even conductor, Core Memory Driver 695 will cause a pulse of one polarity on its output conductor labeled 2 and in response to a Write Even pulse, Core Memory Driver 695 will cause a current pulse of the opposite polarity on its output conductor labeled 2. In response to a pulse on the conductor labeled Write Odd, Core Memory Driver 697 will cause a current pulse to be produced on its output conductor labeled 3 of one polarity and in response to a pulse on the Write Odd conductor, Core Memory Driver 697 will cause a current pulse of opposite polarity on its output conductor labeled 3. If the left half word in the Memory Address Register 301 of Fig. 23a was 11110—, then the Y Diode Matrix Decoder 325 of Fig. 23a would cause the conductor labeled 60, 61 of Fig. 34 to be energized with a negative D.C. level. This negative D.C. level is applied through Matrix Output Amplifiers 699 and 701 to Core Memory Drivers 703 and 705 respectively, which function in like manner to the Core Memory Drivers previously described. The conductor labeled 62, 63 (Fig. 34) is negative when the Y memory address is 11111— and this negative D.C. level is applied through Matrix Output Amplifiers 707, 709 to Core Memory Drivers 711, 713 respectively, which function in like manner to those Core Memory Drivers previously described.

*The Digit Plane Driving Section* which is illustrated in Fig. 23a as block 319 is shown in detail in Fig. 35. The Zero output from the Left Memory Buffer Register sign bit (Fig. 2) is applied to a Digit Plane Driver 715 in Fig. 35 and in the event that the sign bit of the Left Memory Buffer is a Zero, Digit Plane Driver 715 is conditioned to pass the pulse received from the conductor labeled Inhibit. The Digit Plane Driver 715 whose details will be more fully described hereinafter functions as a gate and an amplifier circuit for the Left Memory Buffer sign input conductor and the Inhibit input conductor. The Digit Plane Driver also functions solely as an amplifier in response to a pulse on its input conductor labeled Post Write Disturb. In Fig. 35 there are shown in addition to Digit Plane Driver 715, Digit Plane Drivers 717, 719, 721, 723, 725, 727 and 729. Although only eight Digit Plane Drivers have been shown in Fig. 35, it is to be understood that there is a digit plane driver for each bit of the Left Memory Buffer as well as one for each bit of the Right Memory Buffer. As will be noted in Fig. 23a, the Inhibit Gate Generator 309 has two output conductors each labeled Inhibit. One of these conductors is connected as pulse input to each of the Digit Plane Drivers associated with the Left Memory Buffer while the other conductor labeled Inhibit is connected as an input to each of the Digit Plane Drivers associated with the Right Memory Buffer. As will also be noted in Fig. 23a, the Disturb Gate Generator has four output conductors each labeled Post Write Disturb. One of these Post Write Disturb conductors is connected as an input to the Digit Plane Drivers associated with the Left Memory Buffer stages sign through 7, another of those Post Write Disturb conductors is connected as an input to the Digit Plane Drivers associated with the left Memory Buffer stages 8 through 15, another of those Post Write Disturb conductors is connected as an input to each of the Digit Plane Drivers associated with the Right Memory Buffer stages sign through 7 and the other Post Write Disturb conductor is connected as an input to each of the Digit Plane Drivers associated with the Right Memory Buffer stages 8 through 15. Each of the Digit Plane Drivers produces a pulse on its associated output conductor in response to a D.C. level from its associated Memory Buffer Stage. If an Inhibit pulse is received while that positive D.C. level is received, each of the Digit Plane Drivers also produces a pulse on its output conductor in response to an input pulse on its input conductor labeled Post Write Disturb. As has previously been indicated when Write pulses are delivered to the Array Section 321 of Fig. 23a, all of the cores which have been selected by the Memory Address Register will be set in their One state unless an Inhibit pulse is simultaneously received and these Inhibit pulses are selectively produced by the Digit Plane Driving Section of Fig. 35.

*Memory Buffer Circuits—Detailed description*

The block labeled Left Memory Buffer Circuit in Fig. 2 is shown in detail in Fig. 37. The sign stage of the Left Memory Buffer Circuit includes flip-flop 751 together with its associated circuits. The number 1 bit stage of the Left Memory Buffer circuit includes flip-flop 753 together with its associated circuits. The number 9 bit stage of the Left Memory Buffer Circuit includes flip-flop 755, the number 10 bit stage includes flip-flop 757 and the number 15 bit stage includes flip-flop 759. Although only certain stages of the Left Memory Buffer Circuit are shown in Fig. 37, the construction and operation of the remaining stages will be understood in view of the following description. Each stage of the Left Memory Buffer Circuit has its flip-flop set to the One side by pulses from the corresponding stages of the Left A Register, the Left Accumulator or the Sense Amplifier Each stage also has its flip-flop cleared by pulses applied by way of the conductor labeled Clear through Pulse Amplifier 761 and Register Driver 763. As previously indicated, the Left Memory Buffer Circuit is normally cleared prior to storage of a word therein. As indicated in Fig. 2 the Left Memory Buffer circuit may store signals from the Memory Element 21B, from the Left Accumulator and from the Left A Register. The conductors of Fig. 37 which are labeled Sense Amplifier followed by a number in parenthesis indicate that the Memory Element Sense Amplifier stages corresponding to those numbers in parenthesis are applied through the corresponding Or circuits 765, 767, 769, 771, and 773 to the One side of the corresponding flip-flops 751, 753, 755, 757 and 759. Those conductors labeled Sense Amplifier in Fig. 37 are the conductors which make up cable 25 of Fig. 2. The conductors of Fig. 37 which are labeled Left Accumulator followed by a number in parenthesis are the conductors of cable 132B in Figs. 2 and 5. The conductors of Fig. 37 which are labeled Left A Register followed by a number in parenthesis are the conductors which make up cable 131B in Figs. 2 and 5. It will therefore be seen that if a pulse is applied to the conductor labeled Clear in Fig. 37 followed by pulses corresponding to a data word on the conductors labeled Sense Amplifier, Left Accumulator or Left A Register, that data word will be stored in the Left Memory Buffer Circuit. The sign stage of the Left Memory Buffer Circuit of Fig. 37 has its One output connected through cathode follower 775 to the input of gate circuit 777. In this manner if the sign stage flip-flop 751 is on its One side, gate 777 is conditioned to pass pulses to its output conductor labeled To Left A Register Sign. The Zero side of each of the stages of the Left Memory Buffer Circuit is connected through associated cathode followers to corresponding stages of the Digit Plane Drivers within the Memory Element 21B of Fig. 2. The number 1 bit stage of the Left Memory Buffer Circuit has its flip-flop 753 One output connected through cathode follower 779 to condition each of the gate circuits 781 and 783. The number 9 bit stage has the One output of its flip-flop 755 connected through cathode follower 785 to the input of gate circuits 787 and 789. The number 10 bit stage has the One output of its flip-flop 757 connected through cathode follower 791 to the input of gate circuits 793 and 795. The number 15 bit stage has the One output of its flip-flop 759 connected through cathode follower 797 to the input of gate circuits 799 and 801. When it is desired to transfer the contents of the Left Memory Buffer Circuit to the Left A Register, a command pulse is applied to the conductor labeled with the command name Left Memory Buffer to the Left A Register and this pulse after being amplified by Register Driver 803 is applied to each of the gate circuits 777, 783, 789, 795 and 801. The outputs of those gates are connected to the corresponding inputs of the Left A Register. In this way each stage of the Left Memory Buffer Circuit which has a One stored therein will cause its corresponding output conductor to the Left A Register to be pulsed. A transfer from the Left Memory Buffer Circuit to the Operation Register is accomplished by applying a pulse to the conductor labeled with the command name Left Memory Buffer to the Operation Register. It should be noted that in this transfer the sign bit of the Memory Buffer is not transferred to the Operation Register and only bits 1 through 10 are transferred. As shown in the Fig. 37, gate circuits 781, 787 and 793 have their output conductors labeled To Operation Register with a number in parenthesis indicating the stage of the Operation Register to which that conductor is connected. It should further be noted that gate circuit 793 has another output conductor labeled To Index Interval Register (1). This indicates that the 10th bit stored in the Left Memory Buffer Circuit is transferred to both the Operation Register and to the Index Interval Register. Gate 799 has its output conductor labeled To Index Interval Register (6) indicating that that output is connected to the input of the 6th stage of the Index Interval Register. It will therefore be seen that upon a pulse being applied to the conductor labeled Left Memory Buffer to the Operation Register, each of the stages 1 through 10 which has a One stored therein will cause their corresponding output conductors labeled To Operation Register to be pulsed. Furthermore, each of the stages 10 through 15 which has a One stored therein will cause their corresponding output conductors labeled To Index Interval Register to be pulsed.

The block labeled Right Memory Buffer Circuit in Fig. 2 is shown in detail in Fig. 38. The Right Memory Buffer Circuit includes flip-flops 815, 817 and 819. It will be understood that there is a flip-flop and associated circuit for each of the stages of the Right Memory Buffer Circuit, only three of which are shown in Fig. 38. The stages corresponding to bits 2 through 14 are identical to the number 1 and number 15 bit stages and in the interest of simplicity those stages have not been shown in the drawing. As previously indicated, prior to transferring any data for storage in the Right Memory Buffer Circuit, the conductor labeled Clear is pulsed. This Clear pulse is amplified by Register Driver 821 and is applied to the Clear input terminal of each of the flip-flops of the Right Memory Buffer Circuit. As shown in Fig. 2, data from the Memory Element 21B, The Right Accumulator 109 or the Right A Register may be stored in the Right Memory Buffer Circuit. In Fig. 38 the conductors for receiving pulses from the Right A Register, the Right Accumulator and from the Sense Amplifier in the Memory Element 21B are accordingly labeled and those pulses are applied through Or circuits 823, 825 and 827 to the One side of flip-flops 815, 817 and 819 respectively. From Fig. 2 it will be noted that the D.C. levels from the various stages of the Right Memory Buffer Circuit are applied to the Memory Element 21B. In Fig. 38 this connection is indicated by the Zero outputs of each of the flip-flops being connected through corresponding cathode followers to the conductors labeled To Digit Plane Driver followed by a number in parenthesis which indicates the particular stage of the Digit Plane Driver to which these conductors are connected. It will be noted in Fig. 2 that the contents of the Right Memory Buffer Circuit may be transferred to either the Right A Register or to the Address Register. In Fig. 38 it will be noted that the One output of the sign stage flip-flop 815 is connected through a cathode follower 829 to gate circuit 831, flip-flop 817 has its One output connected through cathode follower 833 to gate circuits 835 and 837 and flip-flop 819 has its One output connected through cathode follower 839 to gate circuits 841 and 843. In order to transfer the contents of the Right Memory Buffer to the Right A Register a pulse is applied to the correspondingly labeled conductor of Fig. 38 which is amplified by means of Register Driver 845 and is applied as a pulse input to each of the gate circuits of the various stages in the Right Memory Buffer Circuit. Therefore each of the stages which contains a One will cause a pulse to be delivered to its corresponding output conductor labeled To Right A Register. In order to cause the contents of the Right Memory Buffer Circuit to be transferred to the Address Register a pulse is applied to the correspondingly labeled conductor of Fig. 38. This pulse is amplified by Register Driver 847 and is applied as a pulse input to each of the gates 835 and 841. Each stage of the Right Memory Buffer Circuit which contains a One will cause a pulse to be applied to its corresponding output conductor labeled To Address Register. It should be noted in the transfer to the Address Register that the sign bit is not transferred since the sign of an address is meaningless.

*Operation Register—Detailed description*

The Operation Register which is shown in Fig. 3 as block 145 is shown in detail in Fig. 39. Prior to the transfer of any data to be stored in the Operation Register the conductor labeled Clear is pulsed and this pulse is applied to the Clear input of each of the flip-flops of the Operation Register. As shown in Fig. 39 the Operation Register includes flip-flops 849 and 851. It will be understood that in a preferred embodiment there are actually 10 flip-flops in the Operation Register. However since all stages of the Operation Register are identical, only two flip-flops have been shown in Fig. 39. When the contents of the Left Memory Buffer Circuit of Fig. 2 are transferred to the Operation Register 145 of Fig. 3 by way of the conductors of cable 117, the pulses on those various conductors of cable 117 are applied as inputs to the corresponding flip-flops of the Operation Register to cause those flip-flops to be set on the One side. As shown in Fig. 39 each flip-flop of the Operation Register has its One and Zero outputs connected through a corresponding cathode follower to the Instruction Control Element.

*Index Register—Detailed description*

The Index Register 1 and the Index Register 2, each of which is shown in block form in Fig. 4, may be identical and therefore only Index Register 1 is shown in detail in Fig. 40. Each Index Register has 12 stages. In Fig. 4 the left-most stage is labeled 4th bit and the right-most stage is labeled 15th bit since those stages transfer into the 4th through 15th stages of the Address Register. As shown in Fig. 4 Index Register 1 stores data from the Address Register and delivers pulses to the Address Register. Assuming that the Address Register 41B is transferring its contents to the Index Register 1 by way of the conductors of cable 87, the various conductors of cable 87 in Fig. 40 will cause the pulses to be applied to the flip-flops of the Index Register. In Fig. 40 the Index Register includes flip-flop 853 and flip-flop 855. It will be understood however that there is a flip-flop for each stage of the Index Register, only two stages being shown in Fig. 40 in the interest of simplicity. Prior to the transfer of any data to be stored in the Index Register, a pulse is applied to the conductor labeled Clear which causes all of the flip-flops to be cleared. The various conductors of cable 87 which have a pulse thereon will cause the flip-flops of the Index Register to be set to the One side. Each flip-flop of the Index Register has its One output connected to condition a gate. As shown in Fig. 40 the One output of flip-flop 853 conditions gate 857 and the One output of flip-flop 855 conditions gate 859. When it is desired to transfer the contents of the Index Register to the Address Register, a pulse is applied to the correspondingly labeled conductor of Fig. 40 and therefore each of the flip-flops of the Index Register which contain a One will cause its corresponding output conductor of cable 67B to be pulsed. The stage labeled 4th bit in Fig. 40 is the stage which is used to store the sign of the index quantity and therefore flip-flop 853 has its zero output applied to gate circuit 861. As has previously been indicated, during a Branch and Index instruction, the sign bit of the specified Index Register is examined for Zero and if the sign is Zero, then the Branch flip-flop is set permitting the Branch to be executed. In order to test the Index Register sign bit for Zero, a pulse is applied to the correspondingly labeled conductor of Fig. 40 and if flip-flop 853 is in its Zero state that pulse will be passed by gate circuit 861 to the conductor labeled Set Branch Flip-Flop.

*Program Counter—Detailed description*

The Program Counter which is indicated in Fig. 4 as block 39 is shown in detail in Fig. 41. The Program Counter has 15 stages, only five of which are shown in Fig. 41; however, the construction and operation of the remaining stages will be understood in view of the following description. Flip-flops 863, 865, 867 and 869 are associated with the stages 1 through 4 of the Program Counter, respectively. Flip-flop 871 is associated with the 15th stage of the Program Counter. Stages 4 through 15 are identical and are connected as a binary counter. The One output of flip-flop 871 is connected through cathode follower 873 to each of gate circuits 875, 877 and 879. The One output of flip-flop 869 is connected through cathode follower 881 to the input of each of gate circuits 883, 885 and 887. Assuming that each of the flip-flops associated with stages 4 through 15 of the Program Counter has been set to some given binary number, then a pulse on the conductor labeled Add One to Program Counter will cause the binary number stored in the stages 4 through 15 to be increased by one. It will be seen in Fig. 41 that the pulse on the conductor labeled Add One to Program Counter is applied to the complement input of flip-flop 871 as well as to the pulse input of gate 875. In the event that the flip-flop 871 is in the Zero state, a pulse on the conductor labeled Add One to the Program Counter merely results in flip-flop 871 being complemented to its One state. Assuming that the flip-flop 871 is in the One state and a pulse is applied to the conductor labeled Add One to the Program Counter this pulse will be passed by gate circuit 875 before flip-flop 871 has been complemented to its Zero state. The pulse passed by gate circuit 875 is applied to the complement input of the flip-flop in the next higher order stage as well as being applied to the pulse input of the gate circuit connected to the One side of the flip-flop of that next higher order stage. In the event that the next higher order stage is in the Zero state when this pulse is received, the flip-flop will be complemented to the One state. However in the event that the next higher order stage was in the One state when this pulse was received, its associated gate will pass that pulse before being complemented to its Zero state. Stages 4 through 15 of the Program Counter always contain a binary number to indicate the address of the next instruction which the data processing machine is to perform. The Program Counter having been set to some desired binary number, a pulse is applied to the conductor labeled Program Counter to the Memory Address Register and assuming that flip-flops 867 and 865 have been set to their Zero state, gate circuit 889 will pass that pulse which is then applied to gate circuits 887 and 879 as well as to gate circuit 891 which will pass that pulse to the conductor labeled Select Memory 1. Therefore normally when the Program Counter has been set to some desired number, the number 3 stage and the number 2 stage are set to their Zero side. This results in the contents stored in the flip-flops of stages 4 through 15 being transferred to the conductors labeled To Or Circuit 43B, and at the same time a pulse is applied to the conductor labeled Select Memory 1. As previously stated a preferred embodiment of this invention includes a plurality of Memory Elements. In the interest of simplicity only one Memory Element 21B of Fig. 2 has been illustrated and described. In the event that more than one Memory Element is used, this pulse on the output conductor labeled Select Memory 1 would be utilized to actuate certain memory selecting circuits to cause the Memory Element #1 to be selected. Subsequent to the pulse being applied to the conductor labeled Program Counter to Memory Address Register, a pulse is always applied to the conductor labeled Add One to Program Counter. This will result in the number stored in stages 4 through 15 of the Program Counter to be increased by one. When each of the stages 4 through 15 of the Program Counter has a One stored therein giving a binary number equal to 4095, a pulse applied to the conductor labeled Add One to Program Counter will cause all of the flip-flops of those stages 4 through 15 to be set to the Zero state and will cause flip-flop 867 associated with the number 3 stage to be set to the One side. When the flip-flop 867 is in the One state, gate circuit 893 is conditioned and under this condition a pulse on the conductor labeled Program Counter to Address Register will result in a pulse being applied to the conductor labeled Select Memory 2.

Stages 1 and 2 of the Program Counter may be used in some suitable manner to select one or more additional memory units; however, an understanding of such use or the manner in which it is accomplished, is not essential to an understanding of the invention herein described.

*Address Register—Detailed description*

The Address Register which is shown as block 41B in Fig. 4 is shown in detail in Figs. 42a through 42f. The Address Register includes 15 stages; however, in the interest of simplicity only 7 stages are shown in Figs. 42a through 42f. Stages 1 and 2 are shown in Fig. 42a, stage 3 is shown in 42b, stage 4 is shown in 42c. Stages 5 through 8 are not shown in the drawing; however, their construction and operation will be apparent in view of the following description. Stage 9 is shown in Fig. 42d, stage 10 is shown in 42e, stages 11 through 14 likewise are not shown in the drawing and stage 15 is shown in Fig. 42f. Stages 4 through 15 are so constructed as to function as an accumulator. As shown in Fig. 4 the Address Register 41B may receive data from any one of five registers. Data from Index Register 1 may be transferred to the Address Register 41B by the conductors of cable 67B (Fig. 4) and the number of bits of data in a preferred embodiment of this invention is 12. As shown in Figs. 42c through 42f the data input from Index Register 1, Index Register 2 or the Right Accumulator is applied through Or circuits 900 through 903 to Pulse Amplifiers 904 through 906 and 906a. The outputs of the Pulse Amplifiers 904 through 906 and 906a are applied through Or circuits 907 through 910 to the complement input of flip-flops 911 through 914, respectively. In Figs. 2 through 6 it will be noted that the contents of the Right Memory Buffer Circuit are transferred to the Address Register 41B by way of the conductors of cable 59. In Figs. 42a through 42f the conductors of cable 59 are individually shown and labeled Right Memory Buffer with a number in parenthesis, the number in parenthesis indicating the stage of the Right Memory Buffer Circuit with which the particular conductor is associated. The individual conductors labeled Right Memory Buffer are applied directly to the One side of flip-flops 915, 916 and 917 and are applied through Or circuits 918 through 921 to the One side of flip-flops 911 through 914. Prior to the transfer of data from the Right Memory Buffer, in normal operation, a pulse is applied to the conductor labeled Clear in Figs. 42a through 42f and this pulse is individually applied to the Clear input of flip-flops 915 through 917 and 911 through 914. In this manner if a pulse is applied to the Clear conductor followed by pulses on the selected conductors labeled Right Memory Buffer then the contents of the Right Memory Buffer circuit will be stored in the Address Register.

As has previously been indicated, if an instruction is indexable and one one of the Index Registers, Index Register 1, Index Register 2 or Right Accumulator has been specified by the instruction, then the address part of the instruction which is contained in the Address Register will be modified by the contents of the selected Index Register. In a preferred embodiment, this modification of the Address part of the instruction is in the form of an addition, that is, the contents of the selected Index Register are adding to the instruction address part. Following the transfer of the address part of the instruction by way of the conductors labeled Right Memory Buffer in Figs. 42a through 42f, pulses are received on the conductors labeled Index Register 1, Index Register 2 or the Right Accumulator. As previously indicated, the pulses from these conductors are applied to the complement input of flip-flops 911 through 914. The conductors in Fig 42f labeled Index Register 1 (15) or the conductors Index Register 2 (15) or the conductors labeled Right Accumulator (15) are applied through Or circuit 903 to Pulse Amplifier 906a. The output of Pulse Amplifier 906a, besides being applied through Or circuit 910 to the complement input of flip-flop 914, is applied as a pulse input to gate circuit 922. In the event that the 15th bit from the Right Memory Buffer Circuit was a One and a pulse is received from the 15th bit of any one of the Index Registers, that pulse will be passed by gate circuit 922 followed by flip-flop 914 being complemented to its Zero side. Under the assumed condition that bit 15 from the Right Memory Buffer Circuit was a One and the selected Index Register bit 15 was a One, the binary sum of these numbers would be a sum of Zero and a carry of One. The pulse passed by gate circuit 922 is a carry of One and the pulse applied to the complement input of flip-flop 914 resulting in the flip-flop being complemented to Zero represents the sum of Zero. The remaining stages of the Address Register operate in like fashion to the 15th stage, each stage producing sum and carry signals representative of the binary sum of the inputs for that stage. Stage 15 in Fig. 42f has a high speed carry gate 923. Each of the remaining stages 3 through 14 likewise has a high speed carry gate. As shown in Figs. 42a through 42f the high speed carry gate 924 is associated with the 3rd stage, high speed carry gate 925 is associated with the 4th stage, high speed carry gate 926 is associated with the 9th stage and high speed carry gate 927 is associated with the 10th stage. Gate circuits 924 through 927 each have an Or circuit in their pulse input indicated in the drawing as 928 through 931 respectively. The output of gate circuit 922 in Fig. 42f, which is the carry signal produced by the 15th stage, is applied through a delay circuit 932 to a Pulse Amplifier 933. The output of Pulse Amplifier 933 is applied to the complement input of the flip-flop associated with the 14th stage and is applied to the pulse input of the high speed carry gate of the 14th stage through its associated Or circuit. Therefore subsequent to each of the flip-flops of the various stages having been set to their stage indicating the sum of their inputs, each of those stages will deliver its carry signal to the next higher order stage. This carry signal will result in the next higher order stage flip-flop being complemented and in the event that the flip-flop associated with any particular stage was in a state indicating a sum of One, that delayed carry pulse will be passed by the high speed carry gate associated with that particular stage to the complement input of the next higher order stage as well as being applied to the high speed carry gate of that next higher order stage. In this manner the carry signals are propagated through the various stages and in the event that the high speed carry gate 924 associated with the 3rd stage (Fig. 42d) is conditioned, then that pulse will be passed by gate circuit 924 through Or circuit 934 to Pulse Amplifier 935. The output of Pulse Amplifier 935 is labeled End Carry and this End Carry signal is applied to the high speed carry gate 923 and is applied through Or circuit 910 to the complement input of flip-flop 914 of the 15th stage (Fig. 42f). In the above described manner each indexable instruction which specifies an Index Register results in the address part of that instruction having added to it the contents of the specified Index Register.

As previously indicated with respect to a Branch and Index instruction, the address part of the instruction which is contained in the Address Register is transferred by way of the conductors of cable 45 to the Program Counter 39 (Fig. 4). As shown in Figs. 42a through 42f, this transfer from the Address Register to the Program Counter is effected by applying a pulse to the conductor accordingly labeled in Fig. 42a which is amplified by Register Driver 936. The output of Register Driver 936 is applied as a pulse input to each of the gate circuits 937 through 943. Therefore each of the stages of the Address Register which contains a One will produce a pulse on its associated output conductor labeled To Program Counter. During a Branch and Index instruction this transfer of the Address Register to the Program Counter is followed by a pulse being applied to the Clear conductor of Figs. 42a through 42f resulting in all stages of the Address Register being set to Zero. Subsequent to this Clear pulse, a pulse is applied to the conductor of Fig. 6 labeled Index Interval Register, to the Address Register which is conductor 103. This pulse on conductor 103 of Fig. 6 is applied to the Index Interval Register 151 of Fig. 3 and is also applied to the conductor labeled 103 in Fig. 42c which is then amplified by Register Driver 944 and is applied to the One input of the flip-flops associated with each of the stages 4 through 9.

This pulse on conductor 103, Fig. 3, will result in a pulse on each of the conductors of cable 61B which is associated with a stage of the Index Interval Register 151 which contains a Zero. The individual conductors of cable 61B in Figs. 3 and 4 are shown in Figs. 42e and 42f and are labeled Index Interval followed by a number in parentheses corresponding to the stage of the Index Register with which that particular conductor is associated. Therefore, each stage of the Index Interval Register of Fig. 3 which contains a Zero will produce a pulse on its associated conductor in Figs. 42e and 42f. These pulses are applied through Or circuits 920 and 921, respectively, to the associated flip-flops 913 and 914 to cause those flip-flops to be set in their One state. It will therefore be seen that during a Branch and Index instruction, following the transfer from the Address Register to the Program Counter the Address Register is set to the complement of the number contained in the Index Interval Register.

As has previously been indicated, the Branch and Index instruction, subsequent to the above indicated operation, causes the Index Register which is specified by the Branch and Index instruction to have its contents modified by the value of the Index Interval provided that the sign of the specified Index Register is a Zero, indicating a positive number. This modification of the specified Index Register by the value of the Index Interval is accomplished by transferring the specified Index Register to the Address Register which contains the complement of the Index Interval. As previously indicated, pulses on the conductors of Figs. 42c through 42f labeled Index Register 1, Index Register 2 or the Right Accumulator will result in the various flip-flops of those stages of the Address Register being set to the conditions indicating the sum of the number stored therein and the number being transferred thereto. If the transfer in was the result of either the Index Register 1 or the Index Register 2 having been selected by the Branch and Index instruction, then a pulse will be applied subsequent thereto to the conductor labeled Address Register to the Index Register 1 or a pulse being applied to the conductor labeled Address Register to the Index Register 2, dependent upon which of those Index Registers was specified by the Branch and Index instruction. From Fig. 19k it will be seen that the command 77 (Clear Address Register) and either the command 78 (Address Register to Index Register No. 2) or command 79 (Address Register to Index Register No. 1) are generated at the same time. The construction of the flip-flop illustrated in the drawings is such that if a pulse is applied to the clear input of that flip-flop at the same time that a pulse samples a gate conditioned by that flip-flop, the pulse will be passed by that gate before the command to clear the flip-flop has been executed. A pulse on the conductor labeled Address Register to Index Register 1, Fig. 42c, is amplified by Register Driver 945 and is applied as a pulse input to each of the gate circuits 946 through 949 and therefore each stage of the Address Register stages 4 through 15 which contained a One will produce a pulse on its output conductor labeled To Index Register 1. A pulse applied to the conductor labeled Address Register To Index Register 2 (Fig. 42c) is amplified by Register Driver 950 and is applied as a pulse input to each of the gate circuits 951 through 954 thereby causing each of the stages 4 through 15 of the Address Register which has a One therein to produce a pulse on its output conductor labeled To Index Register 2. The contents of the Address Register stages 4 through 15 can be transferred to the Memory Address Register through Or circuit 43B of Fig. 4 by applying a pulse to the conductor 71 labeled Address Register to Memory Address Register of Fig. 42a. This pulse is amplified by Register Driver 955 and is applied as a pulse input to each of the gate circuits 956 through 959 causing each of those stages 4 through 15 of the Address Register which contained a One to produce a pulse on its associated output conductor labeled To Or 43. The pulse output of Register Driver 955, Fig. 42a, is also applied as a pulse input to gate circuits 960 and 961. Gate circuits 960 and 961 are conditioned by the One and Zero outputs respectively of flip-flop 916. If flip-flop 916 is set to the Zero side by a word transferred to the Address Register from either the Right Memory Buffer of Fig. 2 or from the Right Accumulator, Fig. 5, the pulse output of Register Driver 955, Fig. 42a, will be passed by gate circuit 961 and is applied as a pulse input to gate circuits 962 and 963 which are conditioned by the One and Zero outputs respectively of flip-flop 917. If flip-flop 916 is in the One state when a pulse is produced in the output of Register Driver 955, gate circuit 960 will produce an output pulse which is applied to gate circuits 964 and 965 which are conditioned by the One and Zero outputs respectively of flip-flop 915. It will therefore be seen that dependent upon the numbers stored in bits 1, 2 and 3 of the Address Register, either one of the conductors labeled To Operating Unit Selector (Fig. 42a) or either one of the conductors labeled To Memory Element Selector (Fig.

42b) will be pulsed when the contents of stages 4 through 15 of the Address Register are transferred to the Memory Address Register. It will be understood that although many Memory Elements may be employed in a data processing machine constructed in accordance with the principles of this invention, only one Memory Element has been illustrated and described herein. In the event that only one Memory Element is employed, then the conductors labeled To Operating Unit Selector (Fig. 42a) and the conductors labeled To Memory Element Selector (Fig. 42b) together with their associated circuits are not needed.

Figure 5:
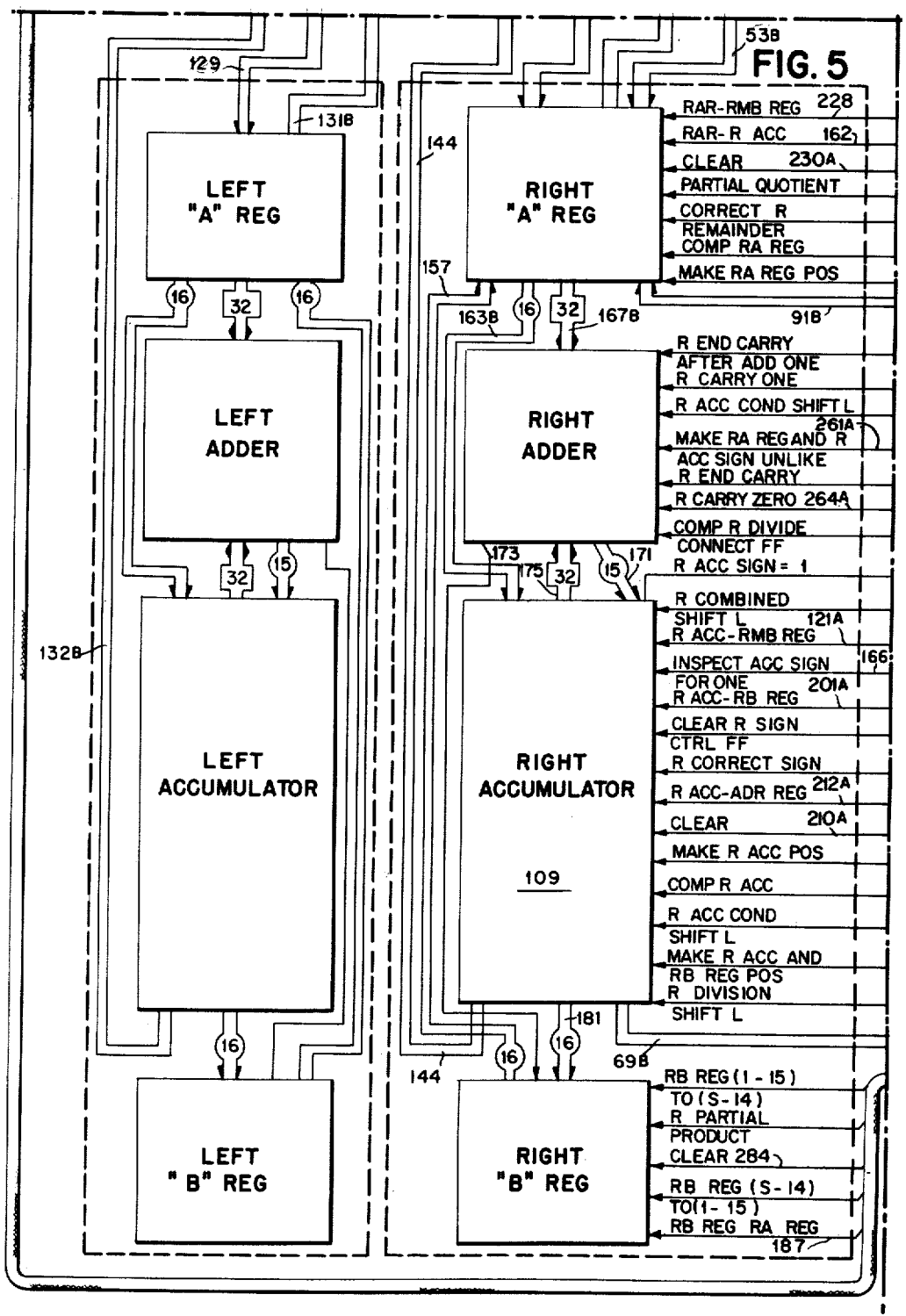

As has previously been indicated, during certain types of instructions, it is necessary to transfer the contents of the Address Register to the Right A Register of Fig. 5. This is accomplished by applying a pulse to the conductor labeled Address Register to Right A Register (Fig. 42a) which is amplified by Register Driver 966 and is applied to the gate circuits 967 through 973 which will cause each of the stages 1 through 15 of the Address Register which contains a One to produce a pulse on its associated output conductor labeled to Right A Register.

Or Circuits 43B—Detailed description

The two-way Or circuits illustrated as block 43B in Fig. 4 are shown in detail in Fig. 43. Fig. 43 shows two-input Or circuits 974, 975, 976 and 977. It will be understood that in a preferred embodiment there are 12 two-input Or circuits; however, in the interest of simplicity only 4 two-input Or circuits have been shown in Fig. 43. Each of the Or circuits has two inputs labeled From Address Register followed by a number in parenthesis indicating the stage of the Address Register with which that particular conductor is associated, and From Program Counter with a number in parenthesis indicating the stage of the Program Counter with which that particular conductor is associated.

Index Interval Register—Detailed description

The Index Interval Register which is shown as block 151 in Fig. 3 is shown in detail in Fig. 44. The Index Interval Register includes flip-flops 978 through 983 together with their respective gate circuits 984 through 989. As indicated in Figs. 2 through 6 the Left Memory Buffer stages 10 through 15 are transferred to the Index Interval Register 151 by way of the conductors of cable 121B. The individual conductors of cable 121B are shown in Fig. 44 and are each labeled From Left Memory Buffer followed by a number in parenthesis indicating the particular stage of the Left Memory Buffer with which the particular conductor is associated. Prior to the transfer from the Left Memory Buffer, the Index Interval Register is cleared by a pulse applied to the conductor 153 labeled Clear in Fig. 44 which is amplified by Register Driver 990 and is applied to the Clear input terminal of each of the flip-flops 978 through 983. The Zero outputs of flip-flops 978 through 983 condition their respective gate circuits 984 through 989. As shown in Figs. 3 and 4, the contents of the Index Interval Register may be transferred to the Address Register 41B by way of the conductors of cable 61B. In order to transfer the contents of the Index Interval Register to the Address Register, a pulse is applied to the conductor 103 correspondingly labeled in Fig. 44. This pulse is amplified by Register Driver 991 and is applied as a pulse input to each of the gate circuits 984 through 989 causing each stage of the Index Interval Register which contains a Zero to produce a pulse on its corresponding output conductor labeled To Address Register.

GENERAL SYSTEM OPERATION

Referring now to Figs. 2 through 6 it is assumed that the Program Counter 39 is set to the binary number indicating some particular memory address. Referring now to Figs. 10 through 15 a Master Control Circuit 225 is caused, in some suitable manner, to produce a pulse on the conductor labeled Start TP and IP Drivers. This will result in pulses from the Oscillator 231 sequentially pulsing the output conductors of the Time Pulse Distributor 223 starting with the output conductor labeled TP-0 followed by pulses on the output conductors labeled IP-1, TP-1 and so forth. As indicated in the timing charts of Figs. 19a through 19h and 19j through 19o, command 31 is generated at PT-0 time of each instruction and as previously indicated in Fig. 22 the command 31 is generated directly from the TP-0 output conductor of the Time Pulse Distributor through Pulse Amplifier 342. This command 31 will result in clearing the Memory Address Register and the Memory Controls of Fig. 23a. As shown in the timing charts of Figs. 19a through 19h and 19j through 19o, at TP-1 time the commands 41A, 53A and 91 are always generated regardless of the instruction. As more particularly shown in Fig. 22, the command 41A is generated directly from the TP-1 output of the Time Pulse Distributor through the Pulse Amplifier 344. The command 53A is generated also by the TP-1 output conductor of the Time Pulse Distributor through Pulse Amplifier 346 and the command 91 is generated directly by the Time Pulse Distributor IP-1 conductor during program time by the output of gate 324. Command 41A results in the Left Memory Buffer Circuit of Fig. 2 being cleared. Command 53A results in the Right Memory Buffer Circuit of Fig. 2 being cleared and command 91 results in the Program Counter 39 of Fig. 4 being transferred to the Memory Address Register 301 of Fig. 23a which is within the Memory Element 21B of Fig. 2. As shown in the timing charts of Figs. 19a through 19h and 19j through 19o at PT-2 time the command 32 is generated and in Figs. 19 and 20 it will be noted that the command 32 is generated directly from the IP-2 conductor of the Time Pulse Distributor through Pulse Amplifier 340. The command 32 which is Start Core Memory is applied to the Memory Element 21B of Fig. 2 and as previously indicated will result in the contents of the Memory Register whose address is specified by the Program Counter being transferred to the Left and Right Memory Buffer Circuits of Fig. 2.

This is the manner in which the data processing machine is started and after having been started, the operation of the machine is dependent upon the instructions which are stored in the Memory Element.

Comparative example programs

In order to illustrate the manner in which the machine constructed in accordance with the principles of this invention operates to simplify the stored program, thus resulting in fewer number of instruction words being necessary for performing a given program, the following examples set forth a very simplified program for performing multiplication of two first pairs of operands, storing their products, and then performing multiplication of two second pairs of operands, storing their products, and also summing the products and storing the same. It will be understood that in the interest of simplicity only four pairs of operands are employed in the example; however, in a practical problem many pairs of operands would be processed or for that matter many operations other than multiplication may be employed.

Without indexing

The following is a table of the contents of various indicated Memory Registers whose locations are identified,

TABLE 3

Memory (initially)

| Instructions | | | Operands and answers | | | Grand totals | | | Constants | | |
|---|---|---|---|---|---|---|---|---|---|---|---|
| Location | Word | | Location | Word | | Location | Word | | Location | Word | |
| | L. half | R. half | | L. half | R. half | | L. half | R. half | | L. half | R. half |
| 100 | CAD | 200 | 200 | 0 | (n-1)-200 | 300 | 0 | 0 | 400 | 0 | 205 |
| 101 | ADD | 400 | 201 | X | $X_1$ | | | | 401 | 0 | 5 |
| 102 | RST | 404 | 202 | Y | $Y_1$ | | | | 402 | 0 | 1 |
| 103 | CAD | 201 | 203 | (¹) | (¹) | | | | 403 | 0 | 3 |
| 104 | MUL | 202 | 204 | (¹) | (¹) | | | | 404 | 0 | 0 |
| 105 | FST | 205 | 205 | 0 | 0 | | | | | | |
| 106 | ADD | 300 | 206 | $X_2$ | $X_3$ | | | | | | |
| 107 | FST | 300 | 207 | $Y_2$ | $Y_3$ | | | | | | |
| 108 | CAD | 103 | 208 | (¹) | (¹) | | | | | | |
| 109 | ADD | 401 | 209 | (¹) | (¹) | | | | | | |
| 110 | RST | 103 | 210 | 0 | 0 | | | | | | |
| 111 | ADD | 402 | --- | ------- | ------- | | | | | | |
| 112 | RST | 104 | --- | ------- | ------- | | | | | | |
| 113 | ADD | 403 | --- | ------- | ------- | | | | | | |
| 114 | RST | 105 | --- | ------- | ------- | | | | | | |
| 115 | SUB | 404 | n | ------- | ------- | | | | | | |
| 116 | BRM | 103 | | | | | | | | | |
| 117 | Next | Inst. | | | | | | | | | |

¹ Not used.

In the example of Table 3, Memory Registers 201 and 202 contain operands X, $X_1$ and Y, $Y_1$ respectively and Memory Registers 206 and 207 contain operands $X_2$, $X_3$ and $Y_2$, $Y_3$ respectively. The instruction words stored in Memory locations 100 through 117 together form a program which may be employed to process the operands X, $X_1$ and Y, $Y_1$, store their products and to process the operands $X_2$, $X_3$ and $Y_2$, $Y_3$ and store their products. The instruction words contained in Memory Registers 103, 104, 105, 106 and 107 are the instructions which will perform the multiplications of X, $X_1$ and Y, $Y_1$, storing those products in Memory Register 205, and then adding those products to the contents of Memory Register 300 and storing the sums in Memory Register 300.

When it is desired to perform the same sequence of instructions upon many operands it is desirable that the program include only the instructions for performing the first multiplication or multiplications. The program also contains sufficient instructions to automatically change the address of those instructions thereby successively processing the various operands.

In the example of Table 3, Memory Registers 201 through 205 could be called a block of memory devoted to storing the X, $X_1$ operands and the Y, $Y_1$ operands as well as having register 205, for example, reserved for the storing of the product of X, Y, and $X_1$, $Y_1$ and registers 203 and 204 reserved for some other functions of X, $X_1$ and Y, $Y_1$ or possibly even other operands falling within the same category as X, $X_1$ and Y, $Y_1$. Memory Registers 206 through 210 may be devoted to the storage of operands $X_2$, $X_3$, $Y_2$, $Y_3$, their products and other functions of those operands or possibly other operands in the same category as the operands $X_2$, $X_3$, $Y_2$, $Y_3$. Therefore, in the example of Table 3, there may be said to be two blocks of memory devoted to operands. In register 200, in the chosen example, the number 9 is stored. The number 9 is derived by subtracting the lowest address from the next to the highest address in the particular section of memory being used for operands and in the example since register 210 is the highest address and since register 200 is the lowest address, then 200 is subtracted from 209 resulting in the number 9 being stored in the address 200. In register number 400, is stored the number 205. This number is derived by adding the lowest address of memory devoted to operands to the number of registers in an operand block. Since register 200 is the lowest address of memory devoted to operands in the chosen example, and since there are 5 registers in an operand block, then the number 205 is stored in memory location 400. In memory location 401, is stored the number equal to the number of registers in each block of memory and, since each block is 5 registers, the number 5 is stored in register 401. In register 402 is stored the number which is the difference between the memory address of one of the operands and the address of the other of the operands. Register 202, in the chosen example, contains the Y, $Y_1$ operands and register 201 contains the X, $X_1$ operands and therefore since there is only one register difference between those locations, the number 1 is stored in memory location 402. In memory location 403 is stored the number equal to the difference between the address of the register reserved for the product and the address containing the last operand. Since register 205 in the chosen example is reserved for the product, and since register 202 contains the Y, $Y_1$ operands, then the difference in their addresses, which is 3, is placed in register 403.

As shown in the example of Table 3, three preliminary instructions are performed and those instructions are located in memory locations 100, 101 and 102. The first instruction CAD causes the number 9 which is stored in the memory location 200 to be placed in the Right Accumulator and 0 to be placed in the Left Accumulator. The instruction contained in memory location 101 causes the number 205 in location 400 of memory to be added to the contents of the Right Accumulator, producing the sum 214. The third instruction which is located in memory location 102 causes the contents of the Right Accumulator, that is, 214, to be stored in memory location 404.

The instruction CAD in memory location 103 causes the operands X, $X_1$ to be placed in the Left and Right accumulators, respectively. The instruction MUL which is stored in location 104 of memory causes the X operand to be multiplied by the Y operand and their product will be contained in the Left Accumulator. The MUL instruction also causes the $X_1$ operand to be multiplied by the $Y_1$ operand and their product will be contained in the Right Accumulator. The instruction FST which is stored in memory location 105 causes the contents of the accumulators, the products of X and Y and the products of $X_1$ and $Y_1$, to be stored in memory location 205. The instruction ADD in memory location 106 causes the contents of the Left and Right Accumulators, which in the example, is the product of X and Y, and the product of $X_1$ and $Y_1$, respectively, to be added to the contents of memory location 300. Under the assumed example, in Table 3, initially register 300 of memory contains all Zeros; therefore this ADD instruction merely results in the product of X and Y and $X_1$ and $Y_1$ remaining in the accumulator. The FST instruction located in the memory register 107 results in the contents of the accumulators being stored in memory location 300. Therefore at the conclusion of this FST instruction, the product of X and Y has been computed and stored in the left half of register 205 of memory as well as in the left half of register 300 of memory, and the product of $X_1$ and $Y_1$ has been computed and stored in the right half of register 205 as well as in the right half of register 300.

The instructions whose memory locations are 108 through 116 are that part of the program which prepares the instructions in the loop comprising memory locations 103 through 107 to be used for the second time. The CAD instruction at memory location 108 causes the instruction in memory location 103 to be placed in the Left and Right Accumulators. The ADD instruction in memory location 109 causes the number 5 in memory location 401 to be added to the address part of the instruction CAD 201 which is now the accumulator, resulting in the accumulator containing the instruction CAD 206. The RST instruction in memory location 110 causes the contents of the Right Accumulator to be placed in memory location 103. Therefore memory location 103 will now contain the instruction CAD 206. The ADD instruction in memory location 111 will cause the number 1 in memory location 402 to be added to the contents of the Right Accumulator and this Add instruction followed by the Right Store instruction in memory location 112 will result in memory location 104 now containing the instruction MUL 207. The ADD instruction in meory location 113 will cause the number 3 in memory location 403 to be added to the contents of the Right Accumulator and this ADD instruction followed by the RST instruction in memory location 114 will result in the memory location 105 now containing the instruction FST 210. The instruction in memory location 115 causes the number 214 in memory location 404 to be subtracted from the contents of the Right Accumulator. As will be remembered the contents of the accumulator prior to this SUBTRACT instruction was 210 which following the SUBTRACT instruction will be minus 4. The instruction in memory location 116 which is Branch on Right Minus inspects the sign of the Right Accumulator for a One and if the sign is One, a Branch is executed to the address in memory specified by the address part of the Branch on Right Minus, instruction which, in the example of Table 3, is 103. Since the contents of the accumulator was minus 4, the BRANCH is executed to memory location 103 which now contains the instruction CAD 206 which will result in the operands $X_2$, $X_3$ in memory location 206 being placed in the Left and Right accumulators. The following table indicates the contents of the memory registers following the completion of the instruction in memory location 116.

TABLE 4

*Memory (after 1st time through loop)*

| Instructions | | | Operands and answers | | | Grand totals | | | Constants | | |
|---|---|---|---|---|---|---|---|---|---|---|---|
| Location | Word | | Location | Word | | Location | Word | | Location | Word | |
| | L. half | R. half | | L. half | R. half | | L. half | R. half | | L. half | R. half |
| 100 | CAD | 200 | 200 | 0 | 9 | 300 | XY | $X_1Y_1$ | 400 | 0 | 205 |
| 101 | ADD | 400 | 201 | X | $X_1$ | | | | 401 | 0 | 5 |
| 102 | RST | 404 | 202 | Y | $Y_1$ | | | | 402 | 0 | 1 |
| 103 | CAD | 206 | 203 | (¹) | (¹) | | | | 403 | 0 | 3 |
| 104 | MUL | 207 | 204 | (¹) | (¹) | | | | 404 | 0 | 214 |
| 105 | FST | 210 | 205 | XY | $X_1Y_1$ | | | | | | |
| 106 | ADD | 300 | 206 | $X_2$ | $X_3$ | | | | | | |
| 107 | FST | 300 | 207 | $Y_2$ | $Y_3$ | | | | | | |
| 108 | CAD | 103 | 208 | (¹) | (¹) | | | | | | |
| 109 | ADD | 401 | 209 | (¹) | (¹) | | | | | | |
| 110 | RST | 103 | 210 | 0 | 0 | | | | | | |
| 111 | ADD | 402 | | | | | | | | | |
| 112 | RST | 104 | | | | | | | | | |
| 113 | ADD | 403 | n | | | | | | | | |
| 114 | RST | 105 | | | | | | | | | |
| 115 | SUB | 404 | | | | | | | | | |
| 116 | BRM | 103 | | | | | | | | | |
| 117 | Next | Inst. | | | | | | | | | |

¹ Not used.

Those registers in memory which have had their contents changed by the execution of the instructions in locations 100 through 116 are underlined in Table 4. It will therefore be seen that the instructions in locations 103 through 116 are again performed and the contents of the various memory registers following this second time through the program loop are shown in the following table.

TABLE 5
Memory (after 2nd time through loop)

| Instructions | | | Operands and answers | | | Grand totals | | | Constants | | |
|---|---|---|---|---|---|---|---|---|---|---|---|
| Location | Word | | Location | Word | | Location | Word | | Location | Word | |
| | L. half | R. half | | L. half | R. half | | L. half | R. half | | L. half | R. half |
| 100 | CAD | 200 | 200 | 0 | 9 | 300 | $XY+X_2Y_2$ | $X_1Y_1+X_3Y_3$ | 400 | 0 | 205 |
| 101 | ADD | 400 | 201 | X | $X_1$ | | | | 401 | 0 | 5 |
| 102 | RST | 404 | 202 | Y | $Y_1$ | | | | 402 | 0 | 1 |
| 103 | CAD | 211 | 203 | (¹) | (¹) | | | | 403 | 0 | 3 |
| 104 | MUL | 212 | 204 | (¹) | (¹) | | | | 404 | 0 | 214 |
| 105 | FST | 215 | 205 | XY | $X_1Y_1$ | | | | | | |
| 106 | ADD | 300 | 206 | $X_2$ | $X_3$ | | | | | | |
| 107 | FST | 300 | 207 | $Y_2$ | $Y_3$ | | | | | | |
| 108 | CAD | 103 | 208 | (¹) | (¹) | | | | | | |
| 109 | ADD | 401 | 209 | (¹) | (¹) | | | | | | |
| 110 | RST | 103 | 210 | $X_2Y_2$ | $X_3Y_3$ | | | | | | |
| 111 | ADD | 402 | --- | ---- | ---- | | | | | | |
| 112 | RST | 104 | --- | ---- | ---- | | | | | | |
| 113 | ADD | 403 | --- | ---- | ---- | | | | | | |
| 114 | RST | 105 | --- | ---- | ---- | | | | | | |
| 115 | SUB | 404 | n | ---- | ---- | | | | | | |
| 116 | BRM | 103 | | | | | | | | | | |
| 117 | Next | Inst. | | | | | | | | | | |

¹ Not used

Those registers in Memory which have had their contents changed by the execution of the instructions in locations 103 through 116 are underlined in Table 5.

When instruction 115 is performed for the second time, this will result in the accumulator signs being made positive and therefore the instruction Branch on Right Minus which is in the memory location 116 will not be performed and the program will continue to the next instruction which is located in memory register 117. It should be noted that in the second time through the loop, the memory location 300 which contained the products XY, $X_1Y_1$ at the end of the first time through the loop, is changed to the sum of the products XY and $X_2Y_2$, and $X_1Y_1$ and $X_3Y_3$. It will therefore be seen from the examples of Tables 3, 4 and 5 that the program in accomplishing the processing of blocks of memory operands can be performed without the benefit of an Index Register or without the benefit of an Index Interval Register.

With indexing

A machine constructed in accordance with the principles of this invention may perform the example of Tables 3, 4 and 5 with a considerable reduction in the number of instructions which must be included in the program. The following table indicates certain of the memory registers which are listed in the example of Tables 3, 4 and 5.

TABLE 6
Memory (initially)

| Instructions | | | Operands and answers | | | Grand totals | | |
|---|---|---|---|---|---|---|---|---|
| Location | Word | | Location | Word | | Location | Word | |
| | L. half | R. half | | L. half | R. half | | L. half | R. half |
| 100 | CAD | 200 | 200 | 0 | 5 | 300 | 0 | 0 |
| 101 | (1)XAC | --- | 201 | X | $X_1$ | | | |
| 102 | (1)CAD | 201 | 202 | Y | $Y_1$ | | | |
| 103 | (1)MUL | 202 | 203 | (¹) | (¹) | | | |
| 104 | (1)FST | 205 | 204 | (¹) | (¹) | | | |
| 105 | (0)ADD | 300 | 205 | 0 | 0 | | | |
| 106 | (0)FST | 300 | 206 | $X_2$ | $X_3$ | | | |
| 107 | (1)BPX(5) | 102 | 207 | $Y_2$ | $Y_3$ | | | |
| 108 | Next | Inst. | 208 | (¹) | (¹) | | | |
| | | | 209 | (¹) | (¹) | | | |
| | | | 210 | 0 | 0 | | | |

¹ Not used.

It will be seen from Table 6 that only 17 Memory Registers are used whereas in the examples of Tables 3, 4 and 5, 31 Memory Registers are used. The instruction located in Memory Register 100 causes the contents of memory location 200 to be placed in the Left and Right Accumulators. In Memory Register 200 is placed the number equal to the number of Memory Registers in an operand block times one less than the number of blocks and as has previously been noted, in the example given, there are 5 Memory Registers for each block and in the chosen example, only two blocks are used. The instruction in memory location 101 causes the specified Index Register 1 to be set to the number contained in the Right Accumulator and since the Right Accumulator contained the number 5, Index Register 1 will contain the number 5. In Table 6 above, the specification of a given Index Register is indicated by a number in parentheses in the left half word of the instruction; (1) specifies Index Register No. 1 and (0) specifies no Index Register is to be used during this instruction. The instruction in memory location 102 causes the contents of Memory Register 206 to be placed in the Right and Left Accumulators, those Accumulators having previously been cleared by this instruction. The instruction MUL in location 103 of memory causes the operand $Y_2$ in memory location 207 to be multiplied by the contents of the Left Accumulator and the operand $Y_3$ to be multiplied by the contents of the Right Accumulator. The instruction FST which is in location 104 of memory causes those products, which are contained in the Right and Left Accumulators, to be stored in Register 210. The instruction ADD contained in memory location 105 causes the contents of Memory Register 300 to be added to the contents of the accumulator and this instruction followed by FST instruction in memory location 106 will cause the contents of the accumulator to be stored in register 300. It should be noted that the part of the instruction in Memory Register 105 and the instruction FST in memory location 106, which is used to specify the Index Register, contains the number Zero. This Zero means that although these are indexable instructions, no Index Register is specified and therefore the effective memory address is the address part of the instruction. The Branch and Index instruction, BPX, at memory location 107 in addition to causing branching causes the contents of the Index Register 1 to be reduced by a value of 5 since the Index Interval part of the instruction is 5. The manner in which the Index Interval is determined for any given program is derived in part from the number of times it is desired to go through the program loop. In the given example it is desired to go through the loop only twice, since only two blocks of memory are being operated upon. The general condition is that the Index Interval will be equal to the number of registers in each of the blocks of memory which are to be operated upon. Since, as previously noted, the Index Register 1 was set to 5 by the instruction in memory location 101, following the Branch and Index instruction, that Index Register will contain Zero which is indicated by a negative sign or a One in the sign stage of the Index Register. The Branch and Index instruction located in 107 when first performed will result in the instruction CAD in memory location 102 being performed. After the first time through the loop, although Index Register 1 is specified by the instructions, their address part will be unmodified since the contents of the Index Register 1 is Zero and when the instruction Branch and Index in memory location 107 is again decoded, the sign of Index Register 1 is first inspected and since it is minus, the Branch will not be executed and the next instruction in memory location 108 will be performed. The following table indicates the contents of the various Memory Registers after the first time through the loop:

in one of two stable conditions except during a transition of states, the switching from one stable condition to the other being accomplished by means of short duration pulses applied to the inputs of the flip-flop circuit.

As shown in block form in Fig. 45, a flip-flop 1000 has three inputs and two outputs. A positive pulse applied to the Set input terminal is said to turn the flip-flop circuit On, producing a positive D.C. level at the left or binary one output, and a negative D.C. level at the right or binary zero output and the flip-flop is said to contain a "one"; a positive pulse applied to the right or Clear input terminal is said to turn the flip-flop Off, producing a positive D.C. level output on the right or binary zero output and a negative D.C. level output at the left or binary one output and the flip-flop is said to contain a "zero." A positive pulse applied to the center input, shown as the complement input, reverses the existing conduction state of the flip-flop to its opposite conduction state; i.e., complementing the contents of the flip-flop. This latter function, referred to as complementing the flip-flop, is described in greater detail hereinafter.

Referring now to the schematic diagram of Fig. 45, tubes 1001 and 1002 function as cathode followers, while tubes 1003 and 1004 function as trigger tubes. The functions performed by the cathode followers 1001 and 1002

TABLE 7
*Memory (after 1st time through loop)*

| Instruction | | | Operands and answers | | | Grand totals | | |
|---|---|---|---|---|---|---|---|---|
| Loca- tion | Word | | Loca- tion | Word | | Loca- tion | Word | |
| | L. half | R. half | | L. half | R. half | | L. half | R. half |
| 100 | CAD | 200 | 200 | 0 | 5 | 300 | $X_1Y_2$ | $X_3Y_1$ |
| 101 | (1)XAC | --- | 201 | X | $X_1$ | | | |
| 102 | (1)CAD | 201 | 202 | Y | $Y_1$ | | | |
| 103 | (1)MUL | 202 | 203 | (¹) | (¹) | | | |
| 104 | (1)FST | 205 | 204 | (¹) | (¹) | | | |
| 105 | (0)ADD | 300 | 205 | 0 | 0 | | | |
| 106 | (0)FST | 300 | 206 | $X_2$ | $X_3$ | | | |
| 107 | (1)BPX(5) | 102 | 207 | $Y_2$ | $Y_3$ | | | |
| 108 | Next | Inst. | 208 | ------ | ------ | | | |
| | | | 209 | ------ | ------ | | | |
| | | | 210 | $X_2Y_2$ | $X_1Y_3$ | | | |

¹ Not used.

The following table indicates the contents of the various Memory Registers after the second time through the loop.

in flip-flop 1000 are threefold. First, to present a high impedance load to the anodes of associated trigger tubes TABLE 8
*Memory (after 2nd time through loop)*

| Instruction | | | Operands and answers | | | Grand totals | | |
|---|---|---|---|---|---|---|---|---|
| Loca- tion | Word | | Loca- tion | Word | | Loca- tion | Word | |
| | L. half | R. half | | L. half | R. half | | L. half | R. half |
| 100 | CAD | 200 | 200 | 0 | 5 | 300 | $XY+X_2Y_2$ | $X_1Y_1+X_3Y_3$ |
| 101 | (1)XAC | ---- | 201 | X | $X_1$ | | | |
| 102 | (1)CAD | 201 | 202 | Y | $Y_1$ | | | |
| 103 | (1)MUL | 202 | 203 | (¹) | (¹) | | | |
| 104 | (1)FST | 205 | 204 | (¹) | (¹) | | | |
| 105 | (1)ADD | 300 | 205 | XY | $X_1Y_1$ | | | |
| 106 | FST | 300 | 206 | $X_2$ | $X_3$ | | | |
| 107 | (1)BPX(5) | 102 | 207 | $Y_2$ | $Y_3$ | | | |
| 108 | Next | Inst. | 208 | ------ | ------ | | | |
| | | | 209 | ------ | ------ | | | |
| | | | 210 | $X_2Y_2$ | $X_3Y_3$ | | | |

¹ Not used.

BASIC CIRCUITS

Fig. 45 illustrates in block and schematic form the *High Speed Flip-Flop* labeled $_A$FF. A flip-flop is a bi-stable switching device which operates so that it is always 1003 and 1004, respectively; second, to present a low output impedance for driving pulse loads such as gate circuits and to allow fast transition times with heavy capacitive loads, and third, to obtain a fast resolution time for high p.r.f. operation by means of the small cathode impedance. The flip-flop may be considered as comprising two identical circuits, each circuit including a trigger tube, a cathode follower and associated circuits. It is believed that a detailed descriptioin of one of these identical circuits and its mode of operation together with a more general description of the remaining circuitry, is sufficient for an understanding of the flip-flop circuit. With respect to the ensuing description, it is assumed that the flip-flop circuit initially is in the Off condition, which, by the conventon employed herein, indicates that trigger tubes 1003 and 1004 are in the conducting and non-conducting states, respectively.

When a positive pulse is applied to the Set input terminal 1005, it passes through a diode 1006 to primary winding 1008 of transformer 1009, resulting in a negative pulse being induced in the secondary winding 1010 of transformer 1009. This pulse is prevented from going to trigger tube 1004, however, by the high back resistance of diode 1011. When trigger tube 1003 is conducting, the grid bias is approximately zero with respect to the cathode. Since diode 1012 is positioned in a loop between grid and cathode of trigger tube 1003, it also has approximately zero potential produced thereacross when trigger tube 1003 is conducting or the flip-flop is Off. One end of transformer secondary winding 1010 is connected directly to the cathode of diode 1012 while the other end is connected to the cathodes of trigger tubes 1003 and 1004. The induced negative pulse is therefore applied between control grid 1013 and cathode 1014 of trigger tube 1003, and is of sufficient amplitude to cause trigger tube 1003 to cut off. This in turn causes trigger 1004 to conduct, thereby completing the transition of the flip-flop circuit from the Off to the On condition.

Anode 1015 of trigger tube 1003 is coupled to control grid 1016 of cathode follower tube 1002 through resistor 1017. As trigger tube 1003 is cut off, its rising anode potential is applied directly to control grid 1016 of cathode follower tube 1002, resulting in a corresponding rise in the cathode follower output. The cathode impedance of cathode follower 1002 comprises a network including parallel connected resistors 1020, 1021 and capacitor 1022, this network in turn being connected in series with the parallel combination of resistors 1023 and 1024. The resistance elements in the above configuration constitute a voltage divider circuit used to control the bias on control grid 1025 of trigger tube 1004, the potential on grid 1025 being tapped from a point on the voltage divider network through resistor 1026. The bias thereby produced maintains trigger tube 1004 cut off so long as trigger tube 1003 is conducting. Resistor 1028, bridged across the cathode impedance network, provides the correct output load for cathode follower 1002. Terminal 1030 is the output terminal of cathode follower 1002, shown as the binary one output in the block diagram 1000.

As the initiation of transition causes output from the anode circuit of trigger tube 1003 to rise, a portion of the resultant increased output from cathode follower tube 1002 is applied to grid 1025 of trigger tube 1004 in the manner described above. This applied potential overcomes the negative bias on trigger tube 1004, causing its anode potential to decrease as current conduction increases. Since anode 1032 of trigger tube 1004 is connected to control grid 1033 of cathode follower tube 1001 through resistor 1034, the lowered anode potential of trigger tube 1004 is reflected in a decreased output from cathode follower tube 1001. The output from cathode follower tube 1001 is developed across a cathode impedance network including a voltage divider circuit identical to the one described with reference to cathode follower 1002. Control grid 1013 of trigger tube 1003 is connected to a tap between resistors 1036 and 1037 of the voltage divider network through resistor 1038. The decreased output from cathode follower 1001 produces a negative bias being applied to control grid 1013, which maintains trigger tube 1003 in its cut-off condition. Output terminal 1043 of cathode follower 1001 is the zero output shown in the block diagram 1000 of Fig. 45.

While the operation described above illustrates a complete transition of the flip-flop circuit from the Off to the On condition, a similar sequence occurs in the transition from the On to the Off state. A positive pulse applied to the Clear input terminal 1039 passes through diode 1040 to transformer 1041 where it is inverted before being applied to the cathode of diode 1042. Since trigger tube 1004 is conducting in the On state of the flip-flop, a zero potential exists thereacross. The negative pulse therefore passes through diode 1042 and resistor 1026 to control grid 1025 of trigger tube 1004, causing trigger tube 1004 to be cut off. The resulting increase of positive potential appearing on anode 1032 of trigger tube 1004 is applied to control grid 1033 of cathode follower 1001, producing a corresponding rise in positive potential across the voltage divider circuit associated with cathode follower 1001. The positive potential at the tap of the voltage divider network is applied to control grid 1013 of trigger tube 1003 through resistor 1038, causing trigger tube 1003 to conduct. The resulting decrease of positive potential at anode 1015 of trigger tube 1003 is in turn applied to control grid 1025 of trigger tube 1004 through cathode follower 1002, thereby biasing trigger tube 1004 below cut off.

The operation of the flip-flop circuit is briefly summarized as follows: a positive pulse applied to the Set terminal 1005 produces a positive and a negative D.C. level at output terminals 1030 and 1043, respectively, while a positive pulse applied to Clear input terminal 1039 produces a reversal of the above D.C. levels at output terminals 1030 and 1043.

Resistor 1044 in combination with diode 1045, connected across input transformer 1009, constitutes a damping network to prevent the transformer from oscillating. Resistors 1046 and 1047 associated with trigger tube 1003 are identical in function to resistors 1023 and 1024 associated with trigger tube 1004. Resistors 1049 and 1050 together with diodes 1051 and 1052 are connected in the anode circuit of trigger tube 1003, as shown. The functions of diodes 1051 and 1052 are to clamp the output level to 30 volts negative or 10 volts positive when trigger tube 1003 is in the conducting or non-conducting state respectively. The output level at terminal 1030 is thereby constrained between the levels of +10 and −30 volts depending on the state of trigger tube 1001. An identical network is associated with trigger tube 1004. Grid resistors 1017, 1026, 1034 and 1038 are employed to inhibit parasitic oscillations.

A positive pulse applied to complement input terminal 1054 of the flip-flop 1000, as heretofore noted, reverses its existing state. When a positive pulse is applied to the complement input terminal 1054, it passes through separate paths including diodes 1011 and 1055 and transformers 1009 and 1041, respectively, where pulse inversion takes place. The resulting negative pulses are then applied to the cathodes of diodes 1012 and 1042 which are associated with the grid circuits of trigger tubes 1003 and 1004, respectively. The functions performed by these diodes are twofold; (1) to permit the associated trigger tube to be cut off by allowing it to go more negative than its cathode and (2) to isolate, during transition time, the rising portion of the input pulse from the falling grid to prevent the loss of control during transition. Assuming that the flip-flop circuit is Off, i.e., trigger tube 1003 is conducting when the complement pulse is applied, the circuit operates in the identical manner as described above with respect to the transition from the Zero state or Off to the One state or On. Similarly, if the flip-flop is in the One state or On condition, the circuit operates as above described to reverse the state of the flip-flop to the Zero state or Off condition. The duration of the input pulse is short relative to the time required to reverse the conduction state of the flip-flop 1000. Once, initiated, the change in state continues until completion.

From the above description, it is evident that when the flip-flop is in one of its bi-stable states, a positive pulse applied to the Set or Clear input terminal associated with the non-conducting tube cannot change the state of the flip-flop. On the other hand, a positive pulse applied to the complement input always reverses the existing state of the flip-flop.

Diodes 1006 and 1011, transformer primary 1008, resistor 1057 and capacitor 1058, together with the negative source of 15 volts potential from terminal 1061, constitute a logical Or circuit, discussed more fully hereinafter. Similarly, diodes 1040 and 1055, the primary winding of transformer 1041, resistor 1059 and capacitor 1060, together with the negative source of 15 volts from terminal 61 constitute a logical Or circuit.

Fig. 46 illustrates in block and schematic form the *Gate Circuit* illustrated in block form in Figs. 1 through 44 inclusive. The gate circuit herein described is a vacuum tube And gate having two inputs and one output. An output pulse, equal in duration to the input pulse applied to terminal 1070, is produced on terminal 1072 if the proper D.C. level is applied to terminal 1071.

Referring now to the schematic diagram of Fig. 46, there is shown a tube 1073 having a control grid 1074, a screen grid 1075, a suppressor grid 1076 and an anode 1077. Control grid 1074 receives an input pulse from terminal 1070 through a parasitic suppressor 1077, and the suppressor grid 1076 receives a D.C. conditioning potential from terminal 1071 through a parasitic suppressor 1078. Screen grid 1075 is biased at a positive potential of 90 volts from a source, not shown, connected to a terminal 1080. The control grid 1074 is biased negatively by the driving circuit and another negative voltage source which is connected to control grid 1074 from terminal 1079 through resistor 1081 and parasitic suppressor 1077. The purpose of this negative bias source at terminal 1079 is to prevent vacuum tube 1073 from conducting if the driving circuit should be disconnected. Upon simultaneously receiving the two positive inputs at terminals 1070 and 1071, the gate tube conducts, thereby producing a voltage across a primary winding 1082 of output transformer 1083. A voltage pulse, induced in the secondary winding 1084 of transformer 1083, is applied across output terminals 1072 and 1085.

The resistor and capacitor combinations of 1086 and 1087, 1088 and 1089, 1090 and 1081 respectively comprise decoupling networks associated with the anode circuit, the output circuit, and the screen grid circuit. Resistor 1093 is a transformer terminating resistor providing damping for the output transformer 1083. Positive anode potential is supplied by a source, not shown, through resistor 1086. The tube employed is a 7AK7, which has a control grid (1074) and suppressor grid (1076) cut-off of —15 volts. As long as the suppressor grid is at or below —15 volts, a pulse cannot be transmitted through the gate tube. Proper transfer of a standard pulse occurs when the suppressor is at about +10 volts.

Referring to Fig. 47, there is illustrated in block and schematic form the *Type B Pulse Amplifier* shown in block form in Figs. 1 through 44. The pulse amplifier herein described is a vacuum tube amplifier used for amplification of 0.1 $\mu$ second pulses. As shown in block form in Fig. 47, a pulse applied to terminal 1101 of pulse amplifier 1100 is amplified and applied to the load through output terminal 1102.

Referring now to the schematic diagram of Fig. 47, there is shown a tube 1103 having a cathode 1104, a control grid 1105, a screen grid 1106, a suppressor grid 1107 and anode 1108. The 0.1 microsecond input pulse is applied through input terminal 1101 and parasitic suppressor 1109 to control grid 1105. Screen grid 1106 is biased at a positive potential of 90 volts from a source, not shown, through terminal 1111 and resistor 1117, while suppressor grid 1107 is biased at a positive potential of 250 volts from the positive anode supply at terminal 1112. The tube is maintained below cutoff by a potential of —15 volts applied from terminal 1113 through resistor 1114. Resistor 1114 is a protective device employed to prevent a floating grid and resultant tube conduction in the event that the line between the driving source and input terminal 1101 was opened. Resistor and capacitor combinations of 1115 and 1116, 1117 and 1118, 1119 and 1120 are decoupling networks associated with the anode circuit, screen grid circuit and output circuit respectively. Transformer 1121, having a primary winding 1122 connected to the anode and a secondary 1123 connected to the load circuit, is a tight coupled 4 to 1 step-down transformer which is employed to obtain desirable transfer characteristics under relatively heavy loads, and to obtain maximum power transfer by increasing the current delivery to the load according to the turns ratio of the transformer.

The pulse applied to the input of the circuit is .1 microsecond in duration. The output pulse delivered to the load is a standard pulse with respect to potential and width but having a considerably higher current which is utilized to drive loads such as flip-flops, gate circuits, Or circuits, etc.

The *Model A Pulse Amplifier*, also shown in block form in Figures 1 through 44 as $_APA$, is substantially identical to the Model B Pulse Amplifier herein described, differing only in that suppressor grid 1107 is coupled to a source of +10 volts rather than the 250 volt anode supply.

Fig. 48 illustrates in block and schematic form a *Register Driver* 1130 labeled RD throughout Figs. 1 through 44. The register drivers are employed for simultaneously pulsing a plurality of gate tubes, a plurality of flip-flops or another heavy load device.

The Register Driver 1130 employs a coupling arrangement including a transformer feeding its control grid 1131. The transformer 1132, having a primary winding 1133 and a secondary winding 1134, supplies input pulses to control grid 1131. One side of the secondary winding 1134 is connected through resistor 1135 to control grid 1131, while the other side of the secondary winding 1134 is connected to a negative 30 volt D.C. source through resistors 1136 and 1137. Resistors 1136 and 1138 in series with diode 1139 constitute a serial circuit connected across the secondary winding 1134, and inductor 1140 and condenser 1141 are connected in series between the lower side of transformer secondary 1134 and ground. The transformer 1132 is a step-up transformer employed to increase the magnitude of the input pulse. The input circuit to the grid functions to reduce positive overshoot in the grid voltage, to match the characteristics of the circuit supplying the input pulse, and to minimize loss of voltage to the grid of the tube. A $\frac{1}{10}$ microsecond positive pulse applied to input transformer 1132 causes register driver 1130 to yield a positive pulse between output terminals 1143 and 1144.

The remaining components of the register driver which are shown in Fig. 48 and do not have reference numbers, are identical to their corresponding components in the Model B pulse amplifier shown in Fig. 47. Reference may be made to the description of Fig. 47 for detailed information concerning those components.

Referring now to Fig. 49, there is illustrated in block and schematic form a *Cathode Follower* of the type shown in block form throughout Figs. 1 through 44.

As is well known in the electrical art, a cathode follower circuit is a vacuum tube wide band power amplifier having its load impedance in the cathode circuit. This circuit is characterized by a high input and low output impedance, and is widely employed to couple an input signal from a high impedance source to a low impedance load. The output of a cathode follower circuit varies with the level of the input signal, the potential level of output waveform being slightly higher than that of the input but the potential swing of the output being slightly less than the input. The cathode followers as employed in the present apparatus generally utilize the D.C. level outputs from the high speed flip-flop (Fig. 45) as inputs, and are generally employed to drive either a single or a plurality of gate circuits such as shown and described heretofore with reference to Fig. 46.

The block diagram of Fig. 49 shows a cathode follower 1230 having a single D.C. level input 1231 and a single D.C. level output 1232.

Referring now to the schematic diagram of Fig. 49, for a more detailed description of the cathode follower operation, there is shown a cathode follower tube 1233 having a cathode 1234, a control grid 1235 and an anode 1236. Resistors 1237 and 1238 in the control grid and anode circuits respectively are parasitic suppressors. Cathode resistor 1240 is shown merely as $Rk$ in the drawing, since the sole difference between the B, C and F type of cathode follower lies in the value of $Rk$, the specific values of which will be pointed out in the present description.

The input signal is applied to input terminal 1231 from a suitable source, such as the output from a high speed flip-flop, in which case the signal may be either $+10$ or $-30$ volts. Since the plate load impedance consists solely of parasitic suppressor 1238, the potential at anode 1236 remains relatively constant. The output potential appearing across cathode impedance 1240 "follows" closely the changes in potential of the grid, so long as the grid remains in the negative grid region, i.e., does not draw grid current, so that the signal reproduced at output conductor 1232 is effectively the same as the signal applied to input terminal 1231. Generally speaking, as the value of $Rk$ increases, the gain of the stage increases and the output signal level rises. Thus, the amplitude of the output signal approaches that of the input as the value of $Rk$ is increased. For an input swing of 40 volts between the input levels specified above, the output waveform of the present circuit will have a nominal swing of 38 volts.

In the B, C and F type cathode followers, cathode impedance $Rk$ is 17.15 K, 19.3K and 27.8 K ohms respectively. The tube type employed is a commercially available 5965, and the remaining circuit values are shown on the drawing.

In addition to power considerations, other factors such as the desired rise time and permissible fall time of the output waveform also determine the type of cathode follower to be employed. The rise time of the output waveform essentially varies directly as the value of $Rk$, while the fall time of the output waveform varies inversely as the value of $Rk$. Since the value of $Rk$ for the described types of cathode folowers increases from the B through F types, the B type cathode follower is preferred where the fall time is more critical, while the C or F type of cathode follower is preferred where a more rapid rise time is sought.

Logical Diode circuits employed throughout the apparatus herein described are of two basic types, the And gate and the Or gate.

The Or gate requires that only one input be positive for a positive output, while the And gate requires that all inputs be positive for a positive output.

Fig. 50 illustrates in block and schematic form a Pulsed Or Circuit as illustrative of a logical diode circuit of the types illustrated in block form throughout Figs. 1 through 44. The circuit shown in Fig. 50 illustrates a pulsed Or circuit of the type used throughout the present apparatus to drive loads such as high-speed flip-flops, gate circuits or pulse amplifier circuits, these circuits being illustrated in detail in Figs. 45, 46 and 47 respectively.

A logical Or circuit may be considered as a multiple input gate circuit, each input having an associated control point and being isolated from the remaining inputs. In the logical Or circuit illustrated in Fig. 50, there are shown three inputs as illustrative of the principle employed. However, two or more than three inputs may be used, and a positive pulse applied to one or all of the above noted control points produces the same results, i.e., a single output pulse.

Referring now to the block diagram of Fig. 50, there is shown a logical Or circuit 1250 having a plurality of inputs from terminals 1251, 1252 and a single output conductor 1254. The diode Or circuit places no restriction on the input signal, that is, the rise time, fall time and levels of the input signal are not materially altered by the Or circuit. The pulse input signal will be the standard .1 microsecond pulse, previously referred to.

Referring to the schematic diagram of Fig. 50 for a more specific description of the Or circuit, the cathodes of diodes 1255 through 1257 are shown connected through an inductance 1258 to one end of a load resistor 1259, the other end of which is connected to a source of 15 volts negative potential at terminal 1260. The anodes of diodes 1255 through 1257 are connected to input terminals 1251 through 1253, respectively. As is well known in the art, a diode is a device which permits current to flow freely in the direction indicated by the arrowheads in the symbol, but offers a high impedance to current flow in the reverse direction. Logical Or circuits as shown throughout Figs. 1 through 44 are, for example, driven by gate circuits or pulse amplifiers. The input terminals 1251 through 1253 are connected to a source of negative 15 volts from the secondary winding of the output transformer of the driving circuit employed. As previously described, each of the above noted driving circuits delivers a pulse through an output transformer, the secondary winding of which is connected to a source of negative 15 volts. Thus diodes 1255 through 1257 in the absence of a pulse input have a potential of negative 15 volts applied to each side, or an effective potential of zero volts applied thereacross.

The input pulse to the Or circuit in the ensuing discussion is the standard $\frac{1}{10}$ microsecond positive pulse, heretofore referred to, this pulse being of an order of magnitude of approximately 20 to 40 volts. Assuming a $\frac{1}{10}$ microsecond pulse is applied to one of the input terminals of the Or circuit, at the termination of the input pulse, the grid of the tube in the load circuit should return to the $-15$ volt level. However, the RC time constant consisting of the back resistance of the associated input diode and the input capacity of the load circuit would prevent the voltage on the grid from returning to $-15$ volts before the next input pulse arrives, resulting in erratic operation. To prevent this condition from occurring, choke 1258 is connected to output terminal 1261, as shown, to offset the capacitive effect in the time constant and thereby reduce the fall time of each input pulse. If the choke alone is employed to compensate for the capacitive effect, the high Q of the choke would cause the trailing edge of the input waveform to overshoot in a negative direction and tend to remain at this lower level. To prevent such occurrence, a load resistor 1259 is connected between the choke and the $-15$ volt source, thereby lowering the Q of the circuit and thereby causing rapid recovery of the negative overshoot.

While the effect of a single input pulse to the Or circuit of Fig. 50 has been considered, the effect resulting from two or more input pulses is the same, i.e., the Or circuit operates to pass a pulse to the load circuit. With respect to the illustration of Or circuits in block form in the logical diagrams of Figs. 1 through 44, inputs and outputs are shown connected to any side of the block for ease of illustration.

While the Or circuit has been illustrated in Fig. 50 as a pulse type Or circuit, it will be understood that a D.C. level input Or circuit may be of identical construction.

The Diode And circuits shown throughout Figs. 1 through 44 are similar to the Or circuit shown in Fig. 50 and above described and differing in that the diodes are reversed, the potential applied to terminal 1260 is positive 150 volts instead of negative 15 volts and the choke 1258 is eliminated.

Referring to Fig. 51, there is illustrated in block and schematic form a *Delay Unit* of the type used to provide a up to .5 microsecond delay to a .1 microsecond pulse. Briefly stated, the present delay unit is a low pass LC filter type of lumped constant electrical delay line.

Referring to the block diagram of Fig. 51, there is shown a delay unit 1270 having single input and output terminals 1271 and 1272 respectively.

For a detailed description of the present delay unit, reference is made to the schematic diagram of Fig. 51. Essentially the delay unit comprises a network of 25 identical sections, each section having a delay of .02 microsecond, four of which are shown in Fig. 51 as illustrative of the network. Each section of the network comprises a center-tapped coil, shown as 1273–1276, the center tap of which is connected through a capacitor, shown as 1277–1280, to the other side of the delay line 1281. Each of coils 1273–1276 consists of 29 turns of #3 double silk covered wire and is .350" in length with a space of .304" between coil center tap connections. Each of capacitors 1277–1280 has a capacitance of 200 micromicrofarads.

The delay line is divided into three interconnected networks for minimum packaging, two of the networks comprising eight sections, the third network comprising the remaining nine sections, the coils of each section being wound on a ⅜" rexolite rod. The physical length of the delay line is limited to the length of each rod, 5.371", while the electrical length of the delay line is, as noted above, .5 microsecond. The characteristic impedance of the delay unit is 100 ohms, and the delay line is designed to pass the standard .1 microsecond pulse, heretofore referred to, with relatively minor distortion.

By means of the physical arrangement described above, an extremely small size and compact packaging are attained for the electrical characteristics specified.

While the full delay of .5 microsecond has been generally utilized in the present apparatus, it is obvious that shorter delays might be attained by tapping off the delay unit, since the delay per section is constant and uniform.

Referring now to Fig. 52, there is shown in block and schematic form the *Matrix Output Amplifier* identified in block form as MOA throughout the logical diagrams of Figs. 33 and 34. The Matrix Output Amplifier is a circuit used to amplify and invert an output of the Diode Matrix Decoder to provide the proper signal level to the input of an associated Core Memory Driver.

Referring to the block diagram of Fig. 52, the Matrix Output Amplifier (MOA) 1300 has a single input shown as 1301 and a single output shown as 1302, both input and output being D.C. levels.

Referring now to the schematic diagram of Fig. 52, there is shown a Matrix Output Amplifier (MOA) 1300. Each MOA is associated with an output line from the X or Y Diode Matrix Decoders. Essentially the MOA comprises an amplifier having a cathode follower output stage. The output from the Diode Matrix Decoder is applied through input conductor 1301 to an overdriven voltage divider comprising resistors 1303 and 1304 and capacitor 1305. The output from the voltage divider is tapped off at point 1306 and applied through parasitic suppressor 1307 to control grid 1308 of amplifier tube 1309. The output from anode 1310 is applied to control grid 1311 of cathode follower tube 1312 through parasitic suppressor 1313. The anode circuit of amplifier tube 1309 includes a choke 1315 critically damped by the parallel connected resistor 1316, this combination being connected in series with resistor 1317 to the positive anode supply at terminal 1318. The purpose of choke 1315 and resistor 1316 is to increase the rise time of the output waveform.

Cathode follower tube 1312 has a load consisting of three parallel banks of resistors, each bank including two 36K ohms resistors, for a total impedance of 24K ohms. Three individual banks have been utilized to maintain the power dissipation of each resistor within the rated tolerances. The lower half of the load impedance of the cathode follower is connected to the negative supply potential shown as terminal 1327. A diode 1328, interconnected between cathode 1329 and control grid 1311 of cathode follower tube 1312, is employed as a protective device for the Core Memory Driver tube driven by the MOA. The diode 1328 prevents the output of the MOA from dropping below that positive level which would be detrimental to the CMD. Anode 1330 of cathode follower 1312 is connected through parasitic suppressor 1331 to a positive supply potential shown as terminal 1332. Output conductor 1302, connected to cathode 1329, comprises the input to the associated Core Memory Driver to be subsequently described.

The input 1301 of the MOA 1300 which is connected to its associated output conductor of the Diode Matrix Decoder is normally positive and goes negative if selected by the Diode Matrix Decoder. This negative D.C. level is inverted and produces a positive D.C. level output from the MOA.

Referring now to Fig. 53, there is illustrated in block and schematic form the *Core Memory Driver* shown in block form in the logical diagrams of Figs. 33 and 34. Essentially, the Core Memory Driver is a circuit capable, when conditioned, of supplying a bi-directional current having an amplitude equal to half that required to read or write a word into memory in response to a Read or Write pulse input respectively. The Core Memory Driver 1370 labeled CMD is conditioned at input 1371 by the D.C. level output from the Matrix Output Amplifier. Read or Write input conductors 1372 or 1373 respectively are energized by the output of Memory Gate Generators to be described in detail subsequently. The Read and Write inputs 1372 and 1373 respectively may not be switched on at the same time. Output conductors 1374 and 1375 supply the current which produces the positive or negative M.M.F used to read or write in the Magnetic Core Array.

The D.C. conditioning potential is applied through input conductor 1371 and parastic suppressors 1376 and 1377 to control grids 1378 and 1379 respectively. A regulated current pulse will be applied to the cathodes through input conductors 1372 or 1373 in response to a Read or Write command respectively. Positive plate potential is applied to anodes 1383 and 1384 from terminal 1385. The Read and Write negative pulses applied to input terminals 1372 and 1373, respectively, cause the potential at terminals 1372 or 1373 to be reduced from 180 volts to positive 97 volts.

If a pulse is applied to the Read input conductor 1372, when positive 90 volts exists on conductor 1371, current will flow from the anode supply potential terminal 1385 through the upper half of primary winding 1386 of transformer 1387 and thereby induce a current pulse in the secondary winding 1388. This induced current is then applied through output conductor 1374 to establish an M.M.F. used to write in the selected cores.

If a pulse is applied to the Write input through input terminal 1373, a current will flow from plate supply terminal 1385 through the lower half of primary winding 1386 of transformer 1387 to thereby induce a current pulse in transformer secondary winding 1388. This current flow is in such a direction as to establish an M.M.F. for reading in the selected cores. Resistors 1389 and 1390 are protective resistors which are connected across the upper and lower halves of the center tapped primary winding 1386 of transformer 1387.

Referring now to Fig. 54, there is illustrated in block and schematic form the *Memory Gate Generator* illustrated in block form in Figs. 31 and 32. The Memory Gate Generator is a circuit which normally supplies a positive D.C. level to the Core Memory Drivers, illustrated and described with reference to Fig. 53, of sufficient amplitude to maintain the associated Core Memory Driver cut off. The Memory Gate Generator is capable of producing an output negative pulse to its associated Core Memory Driver cathodes in response to a D.C. conditioning potential and an input pulse.

Referring now to the block diagram of Fig. 54, there is illustrated in block form the Memory Gate Generator labeled MGG. The circuit is conditioned by a D.C. input on conductor 1441 and has a pulse input applied to input conductor 1442. The circuit output, shown on output conductor 1443, is a regulated current output of 2.5 microseconds duration.

The circuit shown in schematic form in Fig. 54 comprises a gating stage at the input consisting of parallel connected vacuum tubes 1444 and 1445 with associated circuits and a cathode follower output stage using four parallel connected vacuum tubes shown as 1446 through 1449 and having a switchable load impedance to permit obtaining a regulated current output despite variation in the circuit parameters. Switch 1450 when initially set to provide the desired current output, nominally 165 ma., will remain set in this position. The D.C. conditioning input on input conductor 1441 is applied to suppressor grids 1452 and 1453 of gate tubes 1444 and 1445 respectively. The pulse input is applied through input conductor 1442 to control grids 1454 and 1455 of gate tubes 1444 and 1445 respectively. Two gate tubes are employed herein in order to produce the necessary lower anode potential, on a relative order of amplitude of plus 20 volts when the gate tubes are conducting. Anode potential of 250 volts from terminal 1456 is applied to anodes 1458 and 1459 of gate tubes 1444 and 1445 through a voltage divider network consisting of resistors 1461, 1462, 1463 and 1464. A second source of potential of plus 90 volts is applied from terminal 1465 through resistors 1466 and 1467 to the gate tube anodes. The result of these two potential sources is to maintain anodes 1458 and 1459 of gate tubes 1444 and 1445 at a potential level of plus 180 volts when the tubes are in the non-conducting state. This level is necessary because, if exceeded, it will result in drawing grid current in the succeeding cathode follower stage. The output of gate tubes 1444 and 1445 are applied through resistors 1469, 1470, 1471 and 1472 to control grids 1473, 1474, 1475 and 1476 of tubes 1446, 1447 1448 and 1449 respectively. Resistors 1469 through 1472 are parasitic suppressors. The common cathode impedance of tubes 1446 through 1449 includes resistors 1478 through 1484 and variable resistor 1485. Switch 1450 is employed to vary the cathode impedance by adding in parallel to the resistor 1481, various combinations of resistors 1486 through 1488. The desired regulated current previously specified may be obtained by the operation of switch 1450. Resistors 1482 through 1484 and capacitors 1490 through 1493 comprise a decoupling network associated with the cathode follower output. Similarly, resistor 1495 and capacitor 1496, resistor 1497 and capacitor 1498 comprise decoupling networks associated with the anodes of gate tubes 1444 and 1445 respectively. Resistors 1401 through 1403 and capacitors 1404 through 1407 comprise a decoupling network associated with the anodes of tubes 1446 through 1449.

It should be noted that one Memory Gate Generator is associated with 32 Core Memory Drivers to cause the particular Core Memory Driver, selected by the Diode Matrix Decoder to produce an output pulse. By means of the circuit herein described a constant current output on an order of 165 ma. is maintained within plus or minus 2% variation. The current may be manually set to any value within a 20% range of 165 ma. by varying the load impedance network in the manner described. The output from the Memory Gate Generator will maintain all 32 Core Memory Drivers including the selected driver at an amplitude of approximately 179 volts positive. When the Memory Gate Generator is pulsed On, the output potential level drops from 179 to 102 volts and the regulated current of 165 ma. is then applied to the selected core Memory Driver.

Referring to Figs. 55a through 55c, there is illustrated in block and schematic form a *Digit Plane Driver Circuit* of the type shown in block form labeled DPD in Fig. 35.

As noted previously, the Digit Plane Drivers are employed to transfer a Zero from the memory buffer into memory and operate by supplying inhibiting pulses to the digit plane winding of a magnetic core memory. The amplifier section of a DPD circuit is also utilized to amplify Post Write Disturb pulses, which constitute part of each memory cycle, before these pulses are applied to the digit plane winding of the magnetic core memory. No control is exercised over the Post Write Disturb pulse and each input pulse passes through the circuit, while the Inhibit pulse is passed only when a Zero is being written into memory. Each plane of the 32 plane magnetic core memory array has an associated Digit Plane Driver.

Referring now to Fig. 55a, the Digit Plane Driver is illustrated by block 1500 labeled DPD. The D.C. input 1501 is a conditioning potential supplied by the Zero output from the associated stage of the Memory Buffer Register which controls whether or not the Inhibit pulse, received on input conductor 1502, is gated through the circuit. The Post Write Disturb pulse is applied to input conductor 1503. As already noted, the Inhibit pulse is applied through output conductor 1504 to the digit plane winding. The Post Write Disturb pulse applied to input conductor 1503 is amplified by the DPD and passed to the digit plane winding by the output conductor 1504. As previously described, the digit plane winding is a third winding threaded through all the cores in each 32 x 32 plane of the Core Memory Array. The output signal from the Digit Plane Driver is substantially equal in amplitude and produces an M.M.F. in opposition to the M.M.F. produced by the X and Y currents, thereby preventing sufficient current being developed to switch the magnetic state of the selected core.

Referring now to Fig. 55b, there is illustrated in block schematic form the circuits comprising the Digit Plane Driver. Inhibit selection gate 1506 passes the Inhibit pulse on input conductor 1502 when conditioned by the D.C potential on input conductor 1501. The gate circuit output on conductor 1507 constitutes one input to Or circuit 1508, while the Post Write Disturb pulse constitutes the other input on input conductor 1503. Or circuit 1508 is employed in the Digit Plane Driver as an input device to permit the amplifier section of the Digit Plane Driver to be utilized by the Post Write Disturb pulse. The output 1509 of the Or circuit 1508 is applied through cathode follower 1510 and its associated output to differential amplifier 1512, which is employed as a constant current source to provide a steady current which is amplified prior to being applied to the digit plane winding of a magnetic core memory. The output of the differential amplifier 1512 is in turn connected through Pulse Amplifier 1514 and driver 1515 before being applied to the digit plane winding of the magnetic core memory through conductor 1504. A second output from driver 1515, shown as conductor 1516, constitutes a feedback loop to differential amplifier 1512, and is described in greater detail with reference to the schematic diagram of Fig. 55c.

Referring now to Fig. 55c, there is illustrated in schematic form the circuits comprising the Digit Plane Driver. The schematic circuits will be identified by reference to the corresponding circuits shown in block form in Fig. 55b. Gate tube 1521 having inputs 1501 and 1502 applied to the suppressor and control grids respectively, together with associated circuitry, comprises gate 1506. The output conductor 1507 of the circuit is coupled through capacitor 1523 to Or circuit 1508, which consists of diodes 1525, 1526 and 1527. The Post Write Disturb pulse input to the Or circuit is applied to diode 1526, while the output conductor 1507 of gate circuit 1506 is applied to the Or circuit diode 1525. The output or Or circuit 1508 is applied through conductor 1528 to the control grid 1530 of left section of tube 1531. Parallel connected resistors 1532, 1533 and capacitor 1534 in series with resistor 1535 comprise the load impedance of the cathode follower circuit. Differential amplifier 1512 includes the right section of tube 1531 and the left section of tube 1537 with their associated circuits. Output conductor 1511 from cathode follower 1510 is applied through resistor 1540 and potentiometer 1541 to control grid 1543 of the right section of tube 1531. The differential amplifier is employed to provide a substantially constant current output having a relative order of magnitude of 420 ma. Potentiometer 1541 is employed to adjust the initial output signal, which may vary due to variation of circuit parameters, to the desired level. Both the cathodes 1544 and 1545 and the anodes 1548 and 1549 are connected together, the latter being connected through resistor 1550. The output of the differential amplifier is connected through capacitor 1551 to control grid 1553 of the right section of tube 1537. The output of the Pulse Amplifier is applied from anode 1561 through capacitor 1562 to control grids 1563 and 1564 of the dual triode driver 1565. The driver output is connected from the common anode conductor 1566 through parallel resistors 1567 and 1568 to the digit plane winding output 1504, and to control grid 1543 of the right section of tube 1531. The output of driver tube 1565 is also connected through resistor 1570 to control grid 1546 of the left section of tube 1537. Thus the output from the differential amplifier circuit is a substantially constant current signal, the amplitude of which is determined by the potential difference between the inputs from cathode follower 1510 and driver 1515. The 47 ohm resistors shown at the control grid inputs to all of the tubes are conventional parasitic suppressors.

Referring now to Fig. 56a, there is shown in block form the Sense Amplifier shown in block form in Fig. 36. As shown, the circuit has three input conductors 1601, 1602 and 1603 and a single output shown as conductor 1604. A pulse on input conductor 1603 establishes a pulse on output conductor 1604 provided either input conductor 1601 or 1602 has a sufficiently positive signal level applied thereto.

Referring now to Fig. 56b, there is shown a simplified drawing in block form of the component circuits comprising the Sense Amplifier. The inputs are applied through conductors 1601 and 1602 to the first stage 1605 of a differential amplifier. Conductors 1606 and 1607 interconnect the first and second stages of the differential amplifier, while conductors 1608 and 1609 similarly interconnect the second and third stages of the amplifier, the second and third stages being shown as blocks 1610 and 1611 respectively. Output conductors 1612 and 1613 function to feed back the output from the third stage 1611 to the first stage 1605 of the differential amplifier for automatic gain control and supply the input signals to the final stage 1614 of the differential amplifier. Positive feedback from the third stage 1611 to the first stage 1605 is employed both to improve the stability of the circuit and to widen the frequency response of the differential amplifier, which tends to narrow as the number of stages employed is increased. A frequency response between 400–600 kc. is employed in the Sense Amplifier herein described. Differential amplifier 1614 is employed as a gain control circuit to control the gain of the circuit at the desired level. The output of stage 1614 is applied through conductors 1615 and 1616 to cathode follower 1617, which functions as a mixer to combine the inputs and produce a resultant output on conductor 1618 which is then applied to gate 1619. Cathode follower stage 1617 produces a positive output signal provided one input signal from the differential amplifier is positive.

The cathode follower stage employs a two-section tube, each section having an individual input, the circuit having a common cathode impedance. When positive, the output from the cathode follower stage 1617 conditions gate 1619 which, if sampled by a Sample pulse on conductor 1620, passes a pulse to the associated stage of the Memory Buffer Register through output conductor 1604.

Referring now to Fig. 56c, there is illustrated in schematic form the Sense Amplifier. Input signals are applied through terminals 1601 and 1602 to control grids 1621 and 1622 respectively of twin triode 1623. Tube 1623 and its associated circuit comprise the first stage of the differential amplifier shown in Fig. 56b as block 1605. Output conductors 1606 and 1607 from anodes 1624 and 1625 of tube 1623 are applied to the control grids 1626 and 1627 of tube 1631 respectively, tube 1631 being utilized in the second stage of the differential amplifier, shown as block 10 in Fig. 56b. Output conductors 1608 and 1609 from anodes 1632 and 1633 are applied to control grids 1634 and 1635 of tube 1636, respectively. Tube 1636 together with its associated circuit comprise the third stage of the differential amplifier shown in Fig. 56b as block 11. Anodes 1637 and 1638 of tube 1636 are coupled back through conductors 1612 and 1613 to control grids 1621 and 1622 of tube 1623 respectively, and through conductors 1612 and 1613 to control grids 1647 and 1648 respectively of the gain control differential amplifier comprising tube 1649 and associated circuit. Gain control is accomplished by means of variable resistor 1650, connected between cathodes 1651 and 1652 of tube 1649. The gain of the Sense Amplifier may be varied from 200 to 700 times the input signal. For a nominal input signal of 100 mv., the gain will be set at approximately 450.

Anodes 1653 and 1654 of tube 1649 are connected through conductors 1615 and 1616 to control grids 1657 and 1658 respectively of tube 1659. Tube 1659 together with its associated circuit comprises a cathode follower mixing circuit shown in Fig. 56b as block 1617. The signal level developed across cathode resistors 1662 and 1663 and applied to output conductor 1618 of cathode follower circuit 1617 follows the more positive of the input signals applied to control grids 1657 or 1658. When a positive signal is applied to either control grid 1657 or 1658, a positive output signal is established on conductor 1618 which is connected to the suppressor grid of gate circuit 1619. If this positive signal is approximately 10 volts, gate circuit 1619 is conditioned to produce a pulse on output conductor 1604 in response to a Sample pulse on input conductor 1620. Gate circuit 1619 is of the type illustrated in and described with reference to Fig. 46.

Referring now to Fig. 57, there is illustrated in block and schematic form the Power Cathode Follower Model A shown in block form throughout Figures 1 through 44. As shown in block form, the Model A Power Cathode Follower 1700 has a D.C. level input 1701 and a D.C. level output 1702.

Referring now to the schematic diagram of Fig. 57, input conductor 1701 is connected to control grid 1704 of twin triode tube 1703. Cathodes 1705 and 1706 of tube 1703 are connected through a resistance network comprising resistors 1707, 1708 and 1709 to a negative source of 150 volts. For purposes of the ensuing description, the input signal will be assumed to vary between levels of +10 and −30 volts. Assuming that the input signal applied to control grid 1704 drops from its upper to its lower level, a corresponding potential drop occurs at cathodes 1705 and 1706 due to cathode follower action. The output potential at cathodes 1705 and 1706 causes a positive potential difference to be impressed between control grid 1710 and cathode 1706, resulting in increased conduction between cathode 1706 and anode 1711 of tube 1703. This increased current conduction results in a lower potential at anode 1711, which is coupled through a network comprising capacitor 1714 and resistor 1715 to control grid 1716 of tube 1718. Tube 1718 having an anode 1719 and a cathode 1720 together with cathode resistor 1721 comprises a cathode follower circuit which forms the output stage of the model A power cathode follower. The lowered potential at anode 1711 of tube 1703, when applied to control grid 1716 of tube 1718, results in a lower potential at cathode 1720, which is in turn coupled back to control grid 1710 of tube 1703. Resistors 1722, 1723 and 1724, together with capacitor 1725, comprise a voltage divider network which is used to feed back a part of the output from cathode 1720 of tube 1718 to control grid 1710 of tube 1703 with negligible delay. Capacitor 1725 also tends to prevent negative overshoot of the output signal at cathode 1720. Similarly, resistors 1715 and 1726 together with capacitor 1714 comprise a voltage divider network to enable the output signal at anode 1711 of tube 1703 to be coupled to control grid 1716 of tube 1718 with negligible delay. Diodes 1727, 1728 and 1729, together with associated resistors 1730, 1731 and 1732 respectively, comprise a network which is used to limit the negative excursion of the signal on output conductor 1702 to —30 volts. Resistors 1733, 1734 and 1735, connected to anode 1711 of tube 1703, constitute the anode load resistor of tube 1703, while resistor 1736 and capacitor 1737 comprise a decoupling network.

Referring now to Fig. 58, there is illustrated in block and schematic form the *Power Cathode Follower Model C*, shown in block form throughout Figs. 1 through 44. As shown in block form, the Model C Power Cathode Follower 1740 has a D.C. input 1741 consisting of the output of the high speed flip-flop illustrated and described with respect to Fig. 45. The output of the circuit on conductor 1742 is a D.C. level of +10 or —30 volts used to drive the memory diode selection matrix.

Referring now to the schematic diagram of Fig. 58, the input stage of the present circuit is a cathode follower of the type shown and described with reference to Fig. 49, differing only in having a cathode impedance of 21.2K ohms. The output of this cathode follower circuit is applied through resistor 1743 to the control grids of 8 parallel connected cathode follower circuits. Since these parallel connected cathode follower circuits are identical, only one will be described in detail.

In order for a cathode follower to provide a relatively high power output at a specified output level and still provide a relatively small fall time, a small cathode impedance is required. A small cathode impedance in turn requires a large number of stages to maintain a specified output level. The present circuit therefore requires 8 parallel connected stages having a common cathode impedance, this impedance being of a relative order of magnitude of 3.9K ohms. Cathode follower tube 1745 has a control grid 1746 and an associated input resistor 1747. Anode 1748 of tube 1745 is connected to a positive anode supply potential through associated resistor 1749. Capacitor 1750 is a decoupling capacitor associated with anode 1748 in the cathode follower circuit. Cathode 1751 is connected to the remaining 7 cathodes, and to the cathode impedance 1752 through a choke 1753. Choke 1753 is employed to speed up the fall time under a capacitive load. A diode 1754 is interconnected between output conductor 1742 and a source of negative potential of 30 volts, and functions as a protective device to prevent the circuit output from dropping below this level in the event of circuit failure. Diodes 1755 and 1756 and associated resistors 1757 and 1758 are interconnected between output conductor 1702 and a source of +10 volts potential and function as clipping circuits to prevent the output signal from exceeding a level of +10 volts.

Referring now to Fig. 59, there is illustrated in block and schematic form the *Power Cathode Follower Model D* shown in block form in Figs. 1 through 44. As shown in block form the Model D power cathode follower 1800 has a D.C. level applied to input conductor 1801 and a D.C. output on output conductor 1802.

Referring now to the schematic diagram of Fig. 59, input conductor 1801 is connected through resistors 1805 through 1808 inclusive to control grids 1809 through 1812 of cathode follower tubes 1813 through 1816 respectively. The common output conductor of the cathode followers, conductor 1817, is connected through resistor 1818 and capacitor 1819 to cathode 1821 through 1824 of an intermediate amplifier stage comprising vacuum tubes 1825 through 1828 and associated circuits. The value of resistor 1818 is such that at an output level of +10 volts on conductor 1817, the level applied to cathodes 1821 through 1824 is approximately —20 volts. Grids 1831 through 1834 of tubes 1825 through 1828 are connected through associated resistors 1836 through 1839 and common resistor 1840 to a —30 volts potential source. The effect of the positive input signal applied to cathode follower circuits including tubes 1813 through 1816 is to cause control grids 1831 through 1834 of tubes 1825 through 1828 to be 10 volts negative with respect to cathodes 1821 through 1824, thereby causing tubes 1825 through 1828 to be cut off. This in turn produces a rise in potential at anodes 1845 through 1848 of tubes 1825 through 1828, respectively. This rise in potential is then applied through associated resistors 1849 through 1852 and coupling resistor 1853 through to control grids 1854 and 1855 of cathode follower tubes 1856 and 1857 respectively. Resistor 1853 and diodes 1863 through 1865 ensure that the output conductor 1802 does not stay at its lowest level for such a length of time that it would damage load circuit elements driven by the cathode follower. Such protection is necessary since the input waveform to the cathode follower of Fig. 59, may, due to driving circuit failure, remain at its lowest level.

Capacitor 1860 is employed to provide A.C. coupling and hence rapid transition of the output signals from anodes 1845 through 1848 to control grids 1854 and 1855 of cathode follower tubes 1856 and 1857 respectively. Capacitor 1819 functions in a similar manner to couple the output from cathode follower tubes 1813 through 1816 to cathodes 1821 through 1824 of tubes 1825 through 1828 respectively. Diodes 1863, 1864 and 1865 are interconnected between a source of +10 volts potential and the input to control grids 1854 and 1855 of cathode follower tubes 1856 and 1857 respectively. These diode circuits, in addition to their above noted function, are employed as clipping diodes to prevent the input level to cathode follower tubes 1856 and 1857 from exceeding the +10 volt level. Similarly, diodes 1867, 1868 and 1869 prevent the input signal from falling below the level necessary to obtain the desired output lower level. This lower potential is determined by the potential at terminal 1870 of the voltage divider network comprising resistors 1871 and 1872 respectively. The cathode impedance of this circuit including tubes 1856, 1857 comprises resistor 1873 in series with two parallel networks, the first network comprising choke 1874 and resistor 1875, the second network comprising resistors 1871 and 1872. Choke 1874 is employed for peaking the output waveform, decreasing the fall time and to a limited extent decreasing the rise time. Similarly, choke 1876 is employed for peaking, thereby decreasing the rise time for the input signal applied to cathode follower tubes 1856 and 1857 and to a limited extent decreasing the fall time. Resistor 1877, connected between the common terminal of resistors 1849 through 1852 and choke 1876, comprises the anode load impedance of tubes 1825 through 1828, while resistor 1879 and capacitor 1880 comprise a decoupling network. Diodes 1881, 1882 and 1883 connected through resistors 1884, 1885 and 1886 to a source of −30 volts serve as protection of the load circuit and further serve to prevent the output level at output conductor 1802 from going so far negative that the rise time would be excessive.

For an input signal having an upper level of +10 volts, the output level will be +10 volts, while for an input signal having a level of −30 volts, an output level of −40 volts is provided by the circuit.

Figure 60:
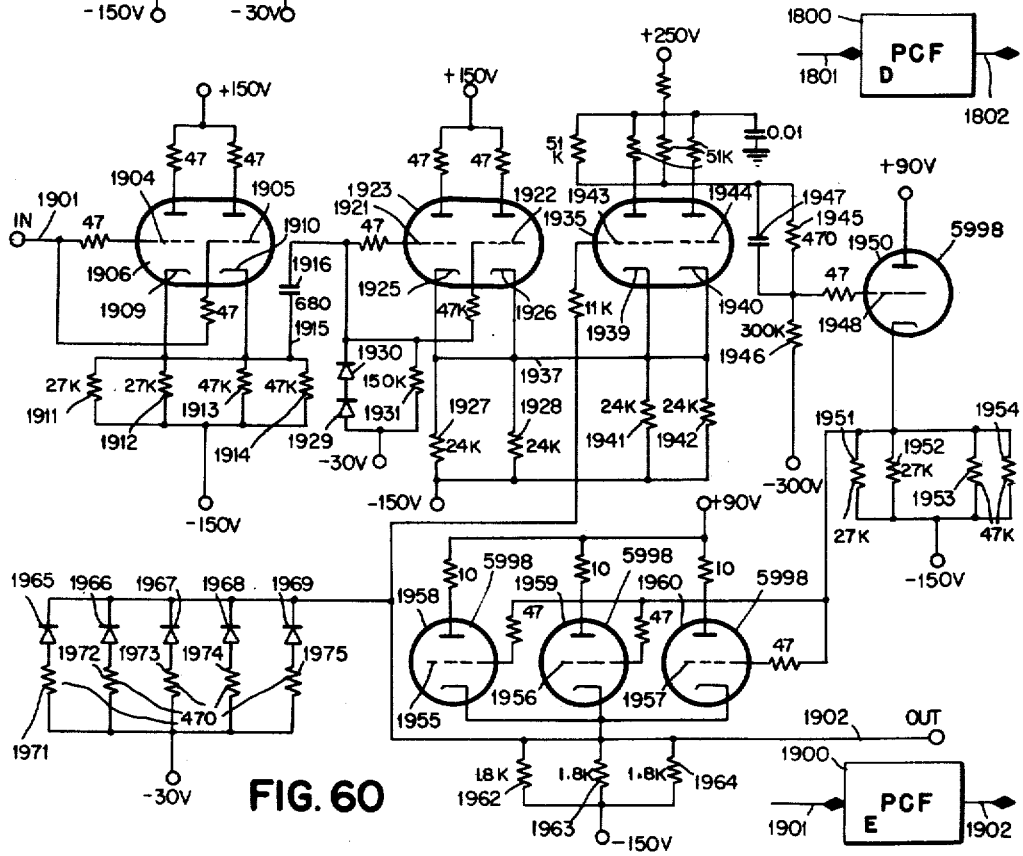

Referring now to Fig. 60, there is illustrated in block and schematic form the *Power Cathode Follower Model E* shown in block form throughout Figs. 1 through 44.

As shown in block form, the Model E Power Cathode Follower 1900 has a D.C. level input applied to input conductor 1901 and a D.C. output on conductor 1902.

Referring now to the schematic diagram of Fig. 60, input conductor 1901 is connected to control grids 1904 and 1905 of twin triode vacuum tube 1906. Cathodes 1909 and 1910 of tube 1906 are connected to a cathode impedance network comprising resistors 1911, 1912, 1913 and 1914. The cathode follower output conductor 1915 is A.C. coupled through capacitor 1916 to control grids 1921 and 1922, each being a section of twin triode vacuum tube 1923. Cathodes 1925 and 1926 of tube 1923 are connected to a common cathode impedance comprising resistors 1927 and 1928, 1941 and 1942. A network consisting of diodes 1929, 1930 and resistor 1931, connected to a −30 volt source, is used to limit the duration during which the upper level of the input signal is applied to tube 1923 and clamps the lower level of the input signal at −30 volts.

The next stage of the circuit comprising dual triode vacuum tube 1935 and associated circuitry is a differential amplifier used to stabilize the output signal and adjust the D.C. level of the output stage to approximately the same level as the input of the differential amplifier. One input to the differential amplifier is applied to cathodes 1939 and 1940 from the output of the previous cathode follower stage, since cathode resistors 1941 and 1942 are in a common impedance network with cathode resistors 1927 and 1928 of vacuum tube 1923 and have the same potential developed thereacross. The second input to the differential amplifier is applied from output conductor 1902 to control grids 1943 and 1944 of differential amplifier tube 1935. The differential amplifier circuit output is coupled through a voltage divider network comprising resistors 1945 and 1946 and capacitor 1947 to control grids 1948 and 1949 of an intermediate cathode follower stage comprising dual triode 1950 and associated circuits. Intermediate cathode follower tube 1950 is employed to improve the response time of the circuit. The cathode follower output developed across the network comprising cathode resistors 1951, 1952, 1953 and 1954 is applied to control grids 1955, 1956 and 1957 of cathode follower tubes 1958, 1959 and 1960 respectively. These three cathode followers having a cathode impedance network comprising resistors 1962, 1963 and 1964 are connected to a common output conductor 1902. Parallel connected diodes 1965 through 1969 and associated resistors 1971 through 1975 comprise a protective network which limits the maximum negative level to approximately −30 volts.

While there have been shown and described and pointed out the fundamental novel features of the invention as applied to a preferred embodiment, it will be understood that various omissions and substitutions and changes in the form and details of the device illustrated and in its operation may be made by those skilled in the art without departing from the spirit of the invention. It is the intention therefore, to be limited only as indicated by the scope of the following claims.

What is claimed is:

1. In a data processing machine operable in a sequence of instruction cycles which may be repeated as a loop of instructions including means for cycling said machine through a series of such instruction cycles, one cycle at a time, branching means for causing said machine to repeat a loop of said instructions and means for controlling the operation of said loop repeating means a chosen number of times, said last named means comprising: index registers each having a sign indicating element, means for storing numbers in said index registers, register means for storing an instruction manifestation comprising, one portion identifying a branch and index operation, another portion representing an interval number, another portion identifying a desired index register and still another portion indicating the address of a first instruction of a loop of instructions to which the operation is to be branched, said first instruction containing an address, means controlled by said portion identifying a desired index register for selecting an index register and means, including said selected index register, for altering said address contained in said first instruction by the amount stored in said desired index register, means controllable by the sign indicating element of said selected index register during one cycle for selectively producing or not producing a branch operation to said address of said first instruction of said loop dependent upon the sign of said chosen index register, means cooperating during said cycle with said portion identifying a desired index register for testing the sign of said register to ascertain whether said sign is a chosen sign or a different sign, means operative during said cycle in response to said sign testing means upon ascertainment of a said chosen sign in said index register for rendering said producing means operative to produce said branch operation to thereby return said machine to said first instruction of said loop and means operative during said cycle and controlled by said testing means for performing an arithmetical operation upon said interval number and the number in said index register upon said ascertainment of said chosen sign.

2. A device as in claim 1, wherein said producing means include a program counter, means cooperating with said counter for initiating a repetition of said loop of instructions and means transferring said portion indicating the address of said first instruction of said loop to said program counter to thus initiate a repetition of said loop of instructions.

3. A device as in claim 1, said last named means controlled by said testing means including means producing a subtraction of said interval number from the number in said chosen index register.

4. A device as in claim 2, and including means to add a one to said program counter, said ascertaining means rendering said selectively producing means inoperative to produce said branch operation upon ascertainment of a different sign and said ascertaining means rendering effective said means to add a one to said program counter.

5. In a data processing machine operable in a sequence of instruction cycles including means for cycling said machine through a series of such instruction cycles, one cycle at a time, and including index registers each having a sign indicating element, means for storing numbers in said index registers, a register means for storing an instruction manifestation comprising one portion identifying a branch and index operation, another portion representing an interval number, another portion identifying a desired index register and still another portion indicating the address to which the operation is to be branched, means controllable during one cycle by said one portion of said manifestation for selectively producing or not producing a branch operation to said address dependent upon the sign of a desired index register, means cooperating during said cycle with said portion identifying a desired index register for selecting a desired index register and testing the sign of said register for ascertaining whether said sign is a chosen sign or a different sign, means operative during said cycle and cooperating with said testing means for rendering said producing means operative to produce said branch operation upon ascertainment of a chosen sign in said index register and means operative during said cycle and controlled by said testing means for performing an arithmetical operation upon said interval number and the number in said index register upon ascertainment of said chosen sign.

References Cited in the file of this patent

UNITED STATES PATENTS

| | | |
|---|---|---|
| 2,777,634 | Williams et al. | Jan. 15, 1957 |
| 2,800,277 | Williams | July 23, 1957 |

FOREIGN PATENTS

| | | |
|---|---|---|
| 496,110 | Belgium | June 30, 1950 |
| 503,357 | Belgium | June 15, 1951 |
| 1,099,467 | France | Mar. 23, 1955 |